(12) United States Patent
Zhao et al.

(10) Patent No.: US 11,588,505 B2
(45) Date of Patent: Feb. 21, 2023

(54) USER TERMINAL EQUIPMENT AND METHOD FOR ANTENNA SELECTION

(71) Applicant: GUANGDONG OPPO MOBILE TELECOMMUNICATIONS CORP., LTD., Guangdong (CN)

(72) Inventors: Bin Zhao, Guangdong (CN); Zhi Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 202 days.

(21) Appl. No.: 17/151,537

(22) Filed: Jan. 18, 2021

(65) Prior Publication Data

US 2021/0226650 A1 Jul. 22, 2021

(30) Foreign Application Priority Data

Jan. 21, 2020 (CN) .......................... 202010073880.0
Jan. 21, 2020 (CN) .......................... 202020141581.1

(51) Int. Cl.
*H01Q 1/24* (2006.01)
*H04B 1/00* (2006.01)
(Continued)

(52) U.S. Cl.
CPC ........... *H04B 1/0053* (2013.01); *H01Q 1/243* (2013.01); *H01Q 21/28* (2013.01); *H01Q 21/30* (2013.01); *H04B 3/52* (2013.01); *H04B 3/56* (2013.01)

(58) Field of Classification Search
CPC ......... H01Q 21/30; H01Q 21/28; H01Q 1/243
See application file for complete search history.

(56) References Cited

U.S. PATENT DOCUMENTS 10,014,892 B1 7/2018 Leyh et al.
10,098,018 B2 10/2018 Lysejko et al.
(Continued)

FOREIGN PATENT DOCUMENTS

CN 2392268 Y 8/2000
CN 101689711 A 3/2010
(Continued)

OTHER PUBLICATIONS

The first OA with English Translation issued in corresponding CN application No. 202010073880.0 dated Dec. 30, 2020.
(Continued)

*Primary Examiner* — Graham P Smith
(74) *Attorney, Agent, or Firm* — Young Basile Hanlon & MacFarlane, P.C.

(57) ABSTRACT

A user terminal equipment and a method for antenna selection are provided according to the disclosure. The user terminal equipment includes a first signal transceiving antenna, K second signal transceiving antennas, and a rotating assembly. The first signal transceiving antenna and the K second signal transceiving antennas are disposed on the rotating assembly and configured to be driven to rotate by the rotating assembly, where K is a positive integer. The first signal transceiving antenna is configured to operate in a first frequency band, the K second signal transceiving antennas are configured to operate in a second frequency band, and the first frequency band is different from the second frequency band. The first signal transceiving antenna and the K second signal transceiving antennas are carried on a same rotating assembly to realize simultaneous rotation of two antennas operating in different frequency bands.

20 Claims, 33 Drawing Sheets

(51) Int. Cl.
*H01Q 21/28* (2006.01)
*H01Q 21/30* (2006.01)
*H04B 3/52* (2006.01)
*H04B 3/56* (2006.01)

(56) References Cited

U.S. PATENT DOCUMENTS

| | | | |
|---|---|---|---|
| 2011/0143673 A1* | 6/2011 | Landesman | H01Q 1/1257 |
| | | | 455/63.1 |
| 2016/0269132 A1 | 9/2016 | Clark et al. | |
| 2016/0380355 A1 | 12/2016 | Lysejko et al. | |
| 2016/0380363 A1 | 12/2016 | Logothetis | |
| 2019/0052346 A1 | 2/2019 | Yu | |
| 2019/0253901 A1 | 8/2019 | Desclos et al. | |

FOREIGN PATENT DOCUMENTS

| | | |
|---|---|---|
| CN | 102594376 A | 7/2012 |
| CN | 103079268 A | 5/2013 |
| CN | 204167483 U | 2/2015 |
| CN | 104917542 A | 9/2015 |
| CN | 105826660 A | 8/2016 |
| CN | 107438918 A | 12/2017 |
| CN | 107634351 A | 1/2018 |
| CN | 107851896 A | 3/2018 |
| CN | 107949989 A | 4/2018 |
| CN | 207743939 U | 8/2018 |
| CN | 108886193 A | 11/2018 |
| CN | 109904626 A | 6/2019 |
| CN | 209184819 U | 7/2019 |
| JP | 2006165628 A | 6/2006 |

OTHER PUBLICATIONS

International Search Report for International Application PCT/CN2021/072681 dated Apr. 16, 2021. (11 pages).
Extended European Search Report for EP Application No. 21152446.7 dated Jun. 4, 2021. (15 pages).
Chinese Notice of Allowance with English Translation for CN Application 202010073880.0 dated May 21, 2021. (6 pages).

* cited by examiner

| Position of user terminal equipment | Direction in which signal has the strongest signal strength |
|---|---|
| L1 | P1 |
| L2 | P2 |
| L3 | P3 |
| ⋮ | ⋮ |
| Lx | Px |

USER TERMINAL EQUIPMENT AND METHOD FOR ANTENNA SELECTION

CROSS-REFERENCE TO RELATED APPLICATION(S)

This application claims priority to Chinese Patent Application Serial No. 202010073880.0, filed on Jan. 21, 2020 and Chinese Patent Application Serial No. 202020141581.1, filed on Jan. 21, 2020, the entire disclosures of both of which are hereby incorporated by reference.

TECHNICAL FIELD

This disclosure relates to the technical field of communications, and more particularly, to a user terminal equipment and a method for antenna selection.

BACKGROUND

Customer premises equipment (CPE) is a terminal equipment for wireless broadband access. Generally, the CPE converts a network signal sent by a base station into a wireless-fidelity (Wi-Fi) signal. Since the CPE is capable of transceiving wireless network signals, cost for construing a wired network can be saved. Thus, the CPE can be widely applied to occasions where there is no wired network, such as rural areas, towns, hospitals, factories, districts, and the like. The fifth generation (5G) mobile communication technology is favored by users due to its high communication speed. For example, a transmission speed of 5G mobile communication is hundreds of times faster than that of 4G mobile communication in data transmission. Millimeter wave signal is a prevalent means to realize 5G mobile communication. However, when the millimeter wave antenna is applied to a user terminal equipment, a signal received is weak because it is easily blocked by objects, which in turn makes the communication effect of the user terminal equipment poor.

With the rapid development of mobile communication technology, requirements such as higher data transmission rate and lower communication delay have been proposed. It has become an industry trend to apply fifth generation (5G) communications to a customer premises equipment (CPE). The 5G spectrum mainly includes the sub-6 GHz spectrum and the millimeter wave spectrum. A CPE supporting millimeter wave communications usually requires millimeter wave antennas to be arranged in multiple directions, resulting in increased cost of the CPE.

SUMMARY

A user terminal equipment is provided. The user terminal equipment includes a first signal transceiving antenna, K second signal transceiving antennas, and a rotating assembly. The first signal transceiving antenna and the K second signal transceiving antennas are disposed on the rotating assembly. The first signal transceiving antenna and the K second signal transceiving antennas are configured to be driven to rotate by the rotating assembly, where K is a positive integer. The first signal transceiving antenna is configured to operate in a first frequency band. K second signal transceiving antennas are configured to operate in a second frequency band. The first frequency band is different from the second frequency band.

In the user terminal equipment of the disclosure, the first signal transceiving antenna and the K second signal transceiving antennas are carried on the same rotating assembly, simultaneous rotation of two kinds of antennas operating in different frequency bands can be realized, which is beneficial to improve communication quality of the user terminal equipment.

A user terminal equipment is further provided. The user terminal equipment includes a rotating assembly, a first signal transceiving antenna, K second signal transceiving antennas, L third signal transceiving antennas, multiple radio frequency (RF) front-end modules, multiple switching modules, multiple interfaces, and a processor. The first signal transceiving antenna is disposed on the rotating assembly and configured to operate in a first frequency band. The K second signal transceiving antennas are disposed on the rotating assembly and configured to operate in a second frequency band. The L third signal transceiving antennas are fixed to and surround a periphery of the user terminal equipment and configured to operate in the second frequency band. The multiple radio frequency (RF) front-end modules are configured to transmit and receive radio frequency signals through the first signal transceiving antenna and at least one of the K second signal transceiving antennas or the L third signal transceiving antennas. One switching module is electrically coupled to one RF front-end module. Each switching module is electrically coupled to one distinct RF front-end module. Multiple interfaces are electrically coupled to the multiple switching modules. The K second signal transceiving antennas and the L third signal transceiving antennas are divided into multiple antenna groups. One antenna group is electrically coupled to one switching module and each antenna group electrically is coupled to one distinct switching module. Each of the multiple antenna groups includes J second signal transceiving antennas and P third signal transceiving antennas. In each of the multiple antenna groups, each of the J second signal transceiving antennas is electrically coupled to one of the multiple interfaces, and each of the P third signal transceiving antennas is electrically coupled to one of the multiple interfaces. For each of the multiple antenna groups, each of the multiple switching modules is configured to electrically couple a corresponding one of the J second signal transceiving antennas to a corresponding one of the multiple RF front-end modules to form a conductive path and a corresponding one of the P third signal transceiving antennas to the corresponding one of the multiple RF front-end modules to form another conductive path, and to switch between the conductive paths.

The processor is configured to control rotation of the rotating assembly to allow the first signal transceiving antenna and the K second signal transceiving antennas to receive signals from different directions, and to control the user terminal equipment to operate in at least one of the first frequency band or the second frequency band according to at least one of signal quality of the first frequency band supported by the first signal transceiving antenna, signal quality of the second frequency band supported by the K second signal transceiving antennas, or signal quality of the second frequency band supported by the L third signal transceiving antennas.

Compared with the prior art, according to technical schemes provided herein, in each antenna group, each second signal transceiving antenna is electrically coupled to one corresponding RF front-end module through one corresponding switching module to form a path, each third signal transceiving antenna is electrically coupled to the one corresponding RF front-end module through the one corresponding switching module to form another path. As such, the RF front-end module can transmit and/or receive RF signals to/from the second signal transceiving antenna and the third signal transceiving antenna which each form a different respective path with the RF front-end module, thereby ensuring independence of the different respective path when the RF front-end module transmits and/or receives RF signals to/from the second signal transceiving antenna and the third signal transceiving antenna. Compared with RF signal transmission and reception where the second signal transceiving antenna and the third signal transceiving antenna are combined into one path, the signal attenuation is small during the RF signal transmission and reception, which is beneficial to improve communication quality of the user terminal equipment. Furthermore, in each antenna group, each second signal transceiving antenna and each third signal transceiving antenna are operable to be electrically connected to the same RF front-end module through the same switching module, such that each second signal transceiving antenna and each third signal transceiving antenna in the same antenna group cannot be electrically coupled to the same RF front-end module at the same time. Since the second signal transceiving antenna and the third signal transceiving antenna are arranged at different positions, when the switching module switches between the second signal transceiving antenna and the third signal transceiving antenna under control of the processor, there is a great variation in signal quality of the second frequency band supported by the second signal transceiving antenna and the third signal transceiving antenna. As such, it is possible to quickly adjust the signal quality of the second frequency band supported by the second signal transceiving antenna and the third signal transceiving antenna by selecting the second signal transceiving antenna or the third signal transceiving antenna in the same antenna group, thereby facilitating adjustment in operations of the user terminal equipment in the second frequency band.

A method for antenna selection is further provided. The method is applicable to a user terminal equipment. The user terminal equipment includes a first signal transceiving antenna, K second signal transceiving antennas, and L third signal transceiving antennas. The first signal transceiving antenna and the K second signal transceiving antennas are arranged on the same rotating assembly and are rotatable. The first signal transceiving antenna operates in a first frequency band. The K second signal transceiving antennas and the L third signal transceiving antennas operate in a second frequency band. The method includes the following.

The rotating assembly is driven to rotate to allow the first signal transceiving antenna to receive signals supporting communication in the first frequency band from various directions and to allow the K second signal transceiving antennas to receive signals supporting communication in the second frequency band from various directions.

The user terminal equipment is controlled to operate in at least one of the first frequency band and the second frequency band according to quality of the signals supporting the first frequency band received by the first signal transceiving antenna, quality of the signals supporting the second frequency band received by the K second signal transceiving antennas, or quality of signals supporting the second frequency band received by the L third signal transceiving antennas.

The method for antenna selection according to the disclosure can select at least one of the first signal transceiving antenna, the second signal transceiving antenna, or the third signal transceiving antenna to operate, which is beneficial to improve the communication quality of the user terminal equipment.

BRIEF DESCRIPTION OF DRAWINGS

To describe technical solutions in the implementations of the disclosure more clearly, the following briefly introduces the accompanying drawings required for describing the implementations. Apparently, the accompanying drawings in the following description merely illustrate some implementations of the disclosure. Those of ordinary skill in the art may also obtain other accompanying drawings based on these provided herein without creative efforts.

DETAILED DESCRIPTION

Figure 1:
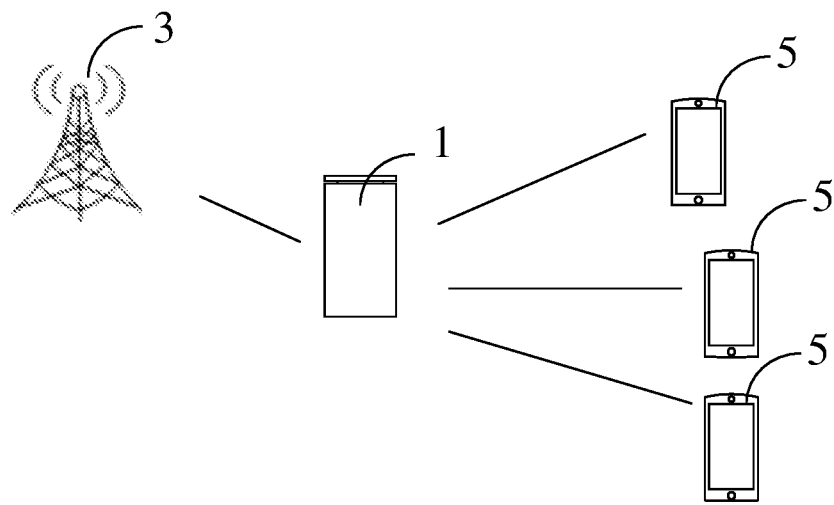
FIG. 1 is a schematic diagram illustrating an application environment of a user terminal equipment according to at least one implementation of the disclosure.

Technical solutions in implementations of the disclosure will be described clearly and completely hereinafter with reference to the accompanying drawings of the disclosure. Apparently, the described implementations are merely some rather than all implementations of the disclosure. All other implementations obtained by those of ordinary skill in the art based on the implementations of the disclosure without creative efforts shall fall within the protection scope of the disclosure.

The terms such as "first" and "second" used in the specification, the claims, and the accompany drawings of the disclosure are used to distinguish different objects rather than describe a particular order. In addition, the terms "include", "comprise", and "have" as well as variations thereof are intended to cover non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either. For example, without departing from the scope of the disclosure, a base station named "first base station" may be renamed as "second base station". Similarly, a base station named "second base station" may be renamed as "first base station". Both the first base station and the second base station are base stations, but they are not the same base station.

The term "implementation" referred to herein means that a particular feature, structure, or feature described in connection with the implementation may be contained in at least one implementation of the disclosure. The phrase appearing in various places in the specification does not necessarily refer to the same implementation, nor does it refer to an independent or alternative implementation that is mutually exclusive with other implementations. It is expressly and implicitly understood by those skilled in the art that at least one implementation described herein may be combined with other implementations.

A user terminal equipment involved in the implementations of the disclosure may be a user terminal equipment with communication capabilities. The user terminal equipment may include a device with wireless communication function, such as a handheld device, a vehicle-mounted device, a wearable device, a computing device, or other processing devices coupled to a wireless modem, as well as various forms of a user equipment (UE), a mobile station (MS), a terminal device, and the like.

A user terminal equipment is provided, which can reduce the cost of the user terminal equipment.

The user terminal equipment includes a first signal transceiving antenna, a driver, and a detection module.

The driver is connected to the first signal transceiving antenna and is configured to drive the first signal transceiving antenna to rotate to change signal transmission and reception directions of the first signal transceiving antenna.

The detection module is connected to the driver and is configured to detect a rotation angle of the first signal transceiving antenna.

In the user terminal equipment, the driver is configured to drive the first signal transceiving antenna to rotate to change the signal transmission and reception directions of the first signal transceiving antenna. The detection module is configured to detect the rotation angle of the first signal transceiving antenna. When the first signal transceiving antenna is rotated and strengths of millimeter wave signals received by the first signal transceiving antenna within a rotation angle range are obtained, the user terminal equipment can determine a direction in which a millimeter wave signal has the strongest signal strength, and then a driver drives the first signal transceiving antenna to rotate to the direction in which the millimeter wave signal has the strongest signal strength. Since the first signal transceiving antenna can be driven to rotate, it is not necessary for the user terminal equipment to arrange multiple millimeter wave antennas in multiple directions, thereby reducing the cost of components. In addition, a relatively high control accuracy can be achieved with aid of the detection module.

In at least one implementation, the detection module is a magnetic encoder or an optical encoder.

In at least one implementation, the user terminal equipment further includes a circuit board and a third signal transceiving antenna. The third signal transceiving antenna, the first signal transceiving antenna, and the driver are each electrically coupled to the circuit board.

In at least one implementation, the first signal transceiving antenna is disposed at one end of the circuit board. The third signal transceiving antenna includes more than two third signal transceiving antennas. The more than two third signal transceiving antennas are disposed at the other end of the circuit board, and at least one third signal transceiving antenna is disposed at each of two opposite sides of the circuit board.

In at least one implementation, the third signal transceiving antenna includes a first antenna structure, a second antenna structure, a third antenna structure, and a fourth antenna structure. The first antenna structure and the third antenna structure are spaced apart and disposed at one side of the circuit board. The second antenna structure and the fourth antenna structure are spaced apart and disposed at the other side of the circuit board. The first antenna structure, the second antenna structure, the third antenna structure, and the fourth antenna structure are each provided with an antenna that is electrically coupled to the circuit board.

In at least one implementation, any two adjacent ones of a signal transceiving surface of the first antenna structure, a signal transceiving surface of the third antenna structure, a signal transceiving surface of the second antenna structure, and a signal transceiving surface of the fourth antenna structure define an angle therebetween.

In at least one implementation, the first antenna structure includes a panel, a supporting portion, and a reflecting plate. The panel is spaced apart from and in parallel with the reflecting plate. The supporting portion is connected between the panel and the reflecting plate. The panel is disposed on one side of the reflecting plate away from the circuit board. The antenna is disposed on the panel.

In at least one implementation, a distance between the panel and the reflecting plate of the first antenna structure is equal to a distance between a panel and a reflecting plate of the third antenna structure. A distance between a panel and a reflecting plate of the second antenna structure is equal to a distance between a panel and a reflecting plate of the fourth antenna structure. The distance between the panel and the reflecting plate of the first antenna structure is less than the distance between the panel and the reflecting plate of the fourth antenna structure.

In at least one implementation, the first antenna structure includes a first antenna and a sixth antenna. The second antenna structure includes a second antenna and a fifth antenna. The third antenna structure includes a third antenna and a seventh antenna. The fourth antenna structure includes a fourth antenna and an eighth antenna. The first antenna, the second antenna, the third antenna, and the fourth antenna are each a plus 45-degree polarized antenna. The fifth antenna, the sixth antenna, the seventh antenna, and the eighth antenna are each a minus 45-degree polarized antenna. The user terminal equipment is capable of selecting four antennas from the first antenna, the second antenna, the third antenna, the fourth antenna, the fifth antenna, the sixth antenna, the seventh antenna, and the eighth antenna to use together.

In at least one implementation, the first signal transceiving antenna is disposed at one end of the circuit board. The third signal transceiving antenna includes a third signal transceiving antenna and a second signal transceiving antenna which are electrically coupled to the circuit board. The third signal transceiving antenna and the circuit board are in relatively fixed positions. The third signal transceiving antenna is disposed close to the other end of the circuit board. The second signal transceiving antenna is connected to and rotatable with the first signal transceiving antenna, to change signal transmission and reception directions of the second signal transceiving antenna.

In at least one implementation, the third signal transceiving antenna includes more than two sub-6 GHz omnidirectional antennas. At least one sub-6 GHz omnidirectional antenna is disposed at each of two opposite sides of the circuit board.

In at least one implementation, the second signal transceiving antenna includes a first plate assembly and a second plate assembly which are spaced apart and disposed at one side of the first signal transceiving antenna that is opposite to a signal transceiving surface of the first signal transceiving antenna. The first plate assembly and the second plate assembly define an angle therebetween. The first plate assembly and the second plate assembly each include an antenna electrically coupled to the circuit board.

In at least one implementation, the third signal transceiving antenna includes a first antenna, a second antenna, a third antenna, and a fourth antenna. The first plate assembly includes a fifth antenna and a sixth antenna isolated from the fifth antenna. The second plate assembly includes a seventh antenna and an eighth antenna isolated from the seventh antenna. The user terminal equipment is capable of selecting two antennas from the fifth antenna, the sixth antenna, the seventh antenna, and the eighth antenna to use together with the first antenna, the second antenna, the third antenna, and the fourth antenna.

In at least one implementation, the driver includes a base, a motor, and a reducer. The reducer and the motor are connected to the base. The first signal transceiving antenna is connected to the reducer. The motor is configured to drive the first signal transceiving antenna to rotate via the reducer. The detection module is connected to the base and the reducer.

In at least one implementation, the reducer includes an output gear, a first-stage gear set, a second-stage gear set, a third-stage gear set, and a drive gear. The first-stage gear is connected to an output shaft of the motor. The first-stage gear set includes a first-stage large gear and a first-stage small gear coaxially fixed with the first-stage large gear. The first-stage large gear and the first-stage small gear are rotatably connected to the base. The first-stage large gear meshes with the output gear. The second-stage gear set includes a second-stage large gear and a second-stage small gear coaxially fixed with the second-stage large gear. The second-stage large gear and the second-stage small gear are rotatably connected with the base. The second-stage large gear meshes with the first-stage small gear. The third-stage gear set includes a three-stage large gear and a three-stage small gear coaxially fixed with the three-stage large gear. The three-stage large gear and the three-stage small gear are rotatably connected to the base. The third-stage large gear meshes with the two-stage small gear. The third-stage small gear meshes with the drive gear. The drive gear is connected to the first signal transceiving antenna. The detection module includes a magnet and a magnetic encoding chip. The magnet is disposed on the drive gear and rotatable with the drive gear. The magnetic encoding chip is fixedly connected to the base.

It is noted that in the implementations of the present disclosure, a signal transceiving antenna refers to an antenna capable of transmitting and/or receiving signals.

FIG. 1 is a schematic diagram illustrating an application environment of a user terminal equipment according to at least one implementation of the disclosure. As illustrated in FIG. 1, the user terminal equipment 1 is a customer premises equipment (CPE). The user terminal equipment 1 is configured to communicate with a base station 3. The user terminal equipment 1 is configured to receive a first network signal transmitted by the base station 3 and to convert the first network signal into a second network signal. The second network signal can be applied to a terminal device 5 such as a tablet computer, a smart phone, a notebook computer, and the like. In this implementation, the first network signal may be, but is not limited to, a fifth generation (5G) mobile communication technology signal. The second network signal may be, but is not limited to, a wireless-fidelity (Wi-Fi) signal. The CPE can be widely applied to rural areas, towns, hospitals, factories, districts, and the like. The first network signals which can be accessed by the CPE can be wireless network signals, such that cost for building a wired network can be saved.

Figure 2:
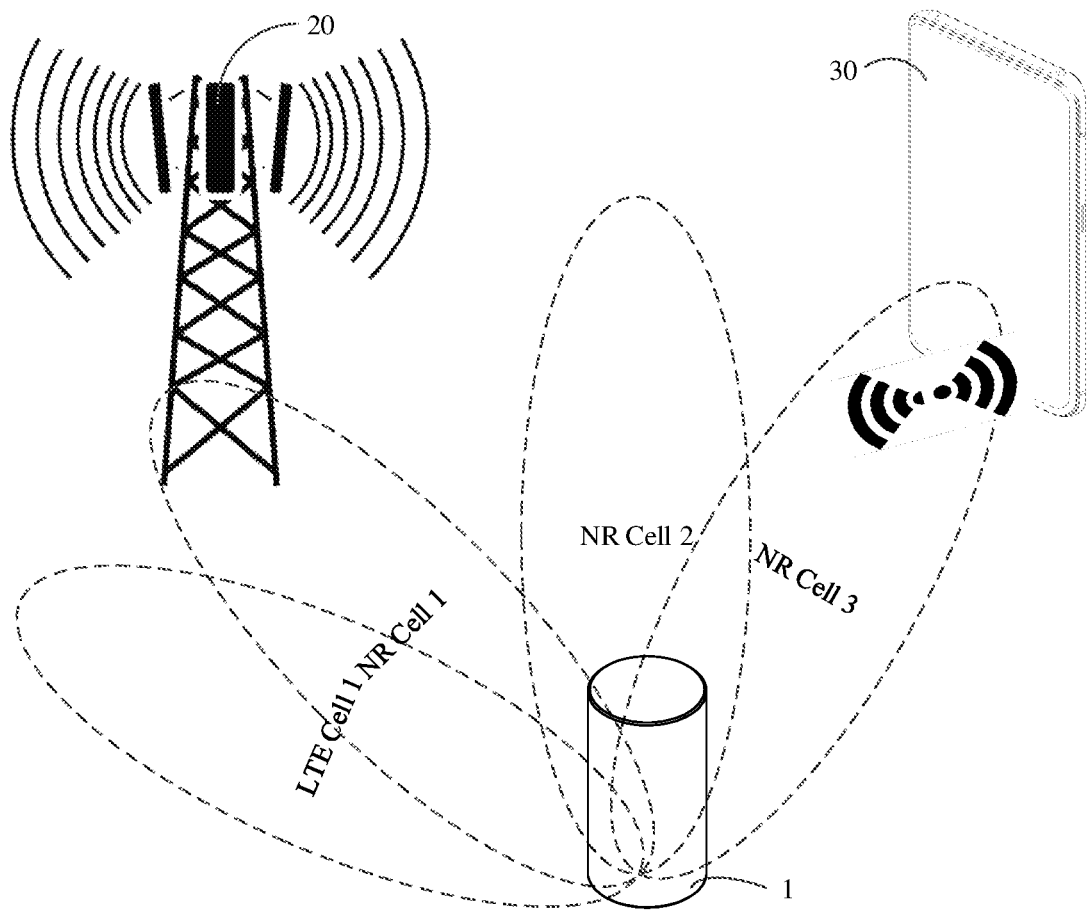
FIG. 2 is a schematic structural diagram of a wireless communication system architecture according to at least one implementation.

FIG. 2 is a schematic structural diagram of a network system architecture according to at least one implementation of the disclosure. In the system architecture illustrated in FIG. 1, a user terminal equipment 1 can be connected with a first base station 20 in a first network system, and access a core network via the first base station 20. The user terminal equipment 1 is configured to implement network access function, convert an operator's public wide area network (WAN) to a user's home local area network (LAN), and allow multiple mobile user terminal equipment 1 to access a network at the same time. In addition, in a vicinity of the user terminal equipment 1, cells and second base stations of a second network system may be or may not be deployed. The first network system is different from the second network system. For example, the first network system may be a 4G system, and the second network system may be a 5G system. Alternatively, the first network system may be a 5G system, and the second network system may be a future public land mobile network (PLMN) system evolved after 5G. The implementations of the disclosure do not particularly limit what kind of RF system the first network system or the second network system is. In the implementations of the present disclosure, the user terminal equipment 1 can be a customer premises equipment (CPE).

When the user terminal equipment 1 is connected to a 5G communication system, the user terminal equipment 1 can transmit and receive data with the corresponding first base station 20 through wave beams formed by 5G millimeter wave antenna modules, and the wave beams need to be aligned with antenna beams of the first base station 20, so as to facilitate the user terminal equipment 1 to transmit uplink data to the first base station 20 or receive downlink data from the first base station 20.

The user terminal equipment 1 is configured to implement the network access function and convert the operator's public WAN to the user's home LAN. The internet broadband access mode can be classified into fiber-to-the-home (FTTH) access, digital subscriber line (DSL) access, cable access, and mobile access (i.e., wireless user terminal equipment). The user terminal equipment is a mobile signal access device which receives a mobile signal and converts the mobile signal into a wireless-fidelity (Wi-Fi) signal for forwarding. The user terminal equipment is a device which can convert a high-speed 4G or 5G signal into a Wi-Fi signal and allow multiple mobile terminals 30 to access network at the same time.

Figure 3:
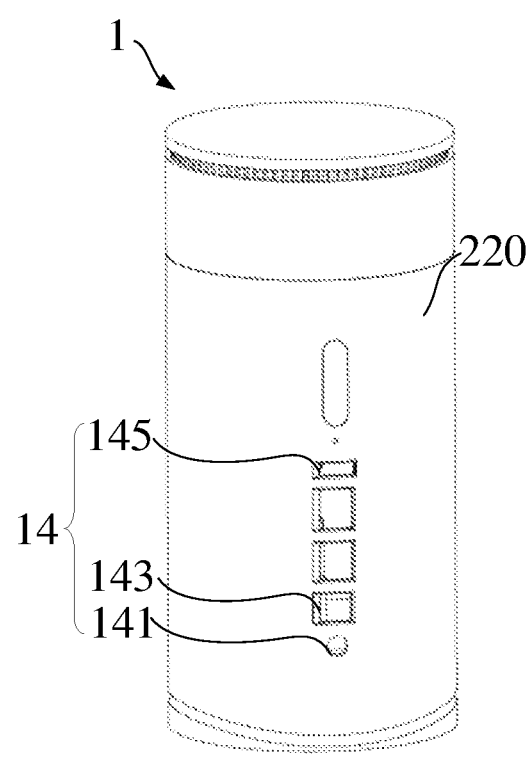
FIG. 3 is a schematic structural view of a user terminal equipment according to at least one implementation of the disclosure.
Figure 4:
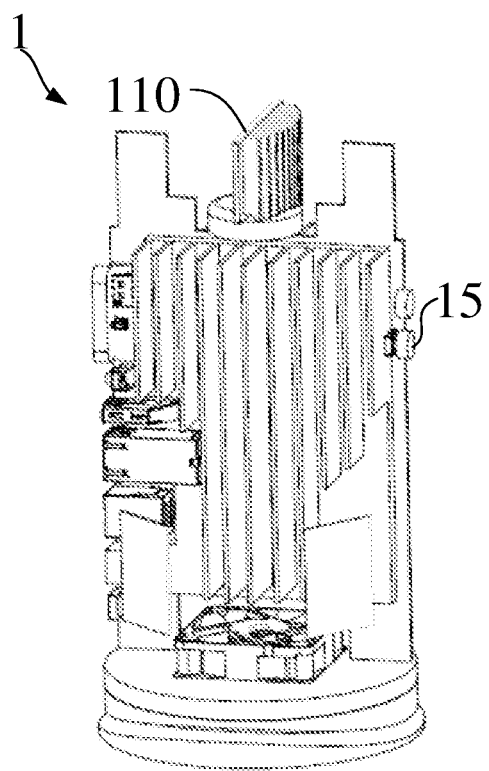
FIG. 4 is a schematic structural view of a user terminal equipment with a housing removed according to at least one implementation of the disclosure.
Figure 5:
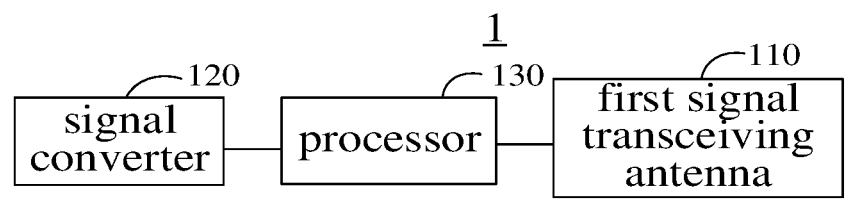
FIG. 5 is a circuit block diagram of a user terminal equipment according to implementations of the disclosure.

FIG. 3 is a schematic structural view of the user terminal equipment 1 according to at least one implementation of the disclosure. FIG. 4 is a schematic structural view of the user terminal equipment 1 with a housing 220 removed according to at least one implementation of the disclosure. FIG. 5 is a circuit block diagram of the user terminal equipment 1 according to implementations of the disclosure. Referring to FIGS. 2 to 4, the user terminal equipment 1 includes the housing 220. The housing 220 may be in a shape of a multi-surface cylindrical cylinder or a cylindrical cylinder. The housing 220 may be made of, but is not limited to, an insulating material such as plastic. It is noted that, in other implementations, the user terminal equipment 1 may not include the housing 220.

Figure 6:
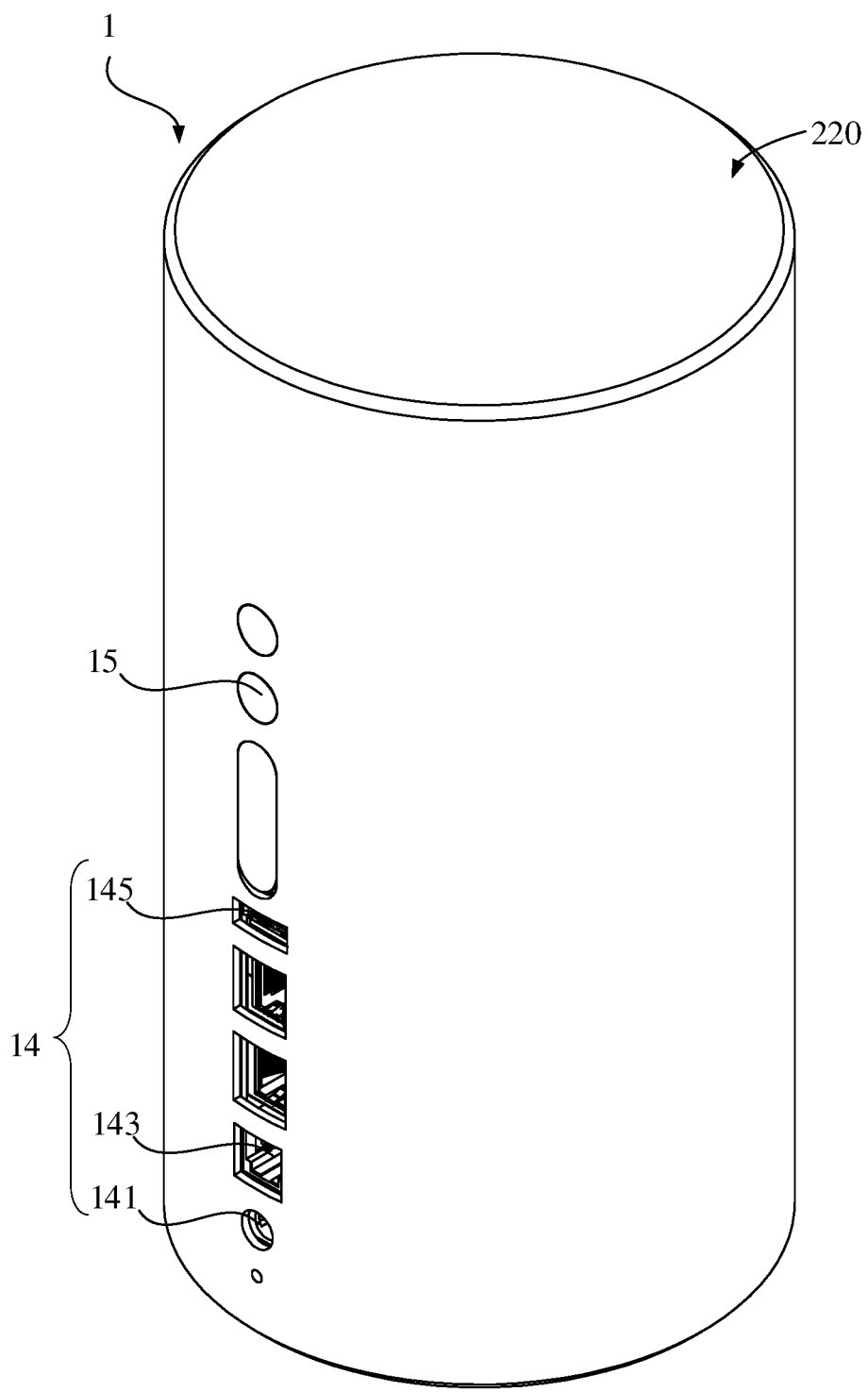
FIG. 6 is a schematic view of a user terminal equipment according to at least one implementation.
Figure 7:
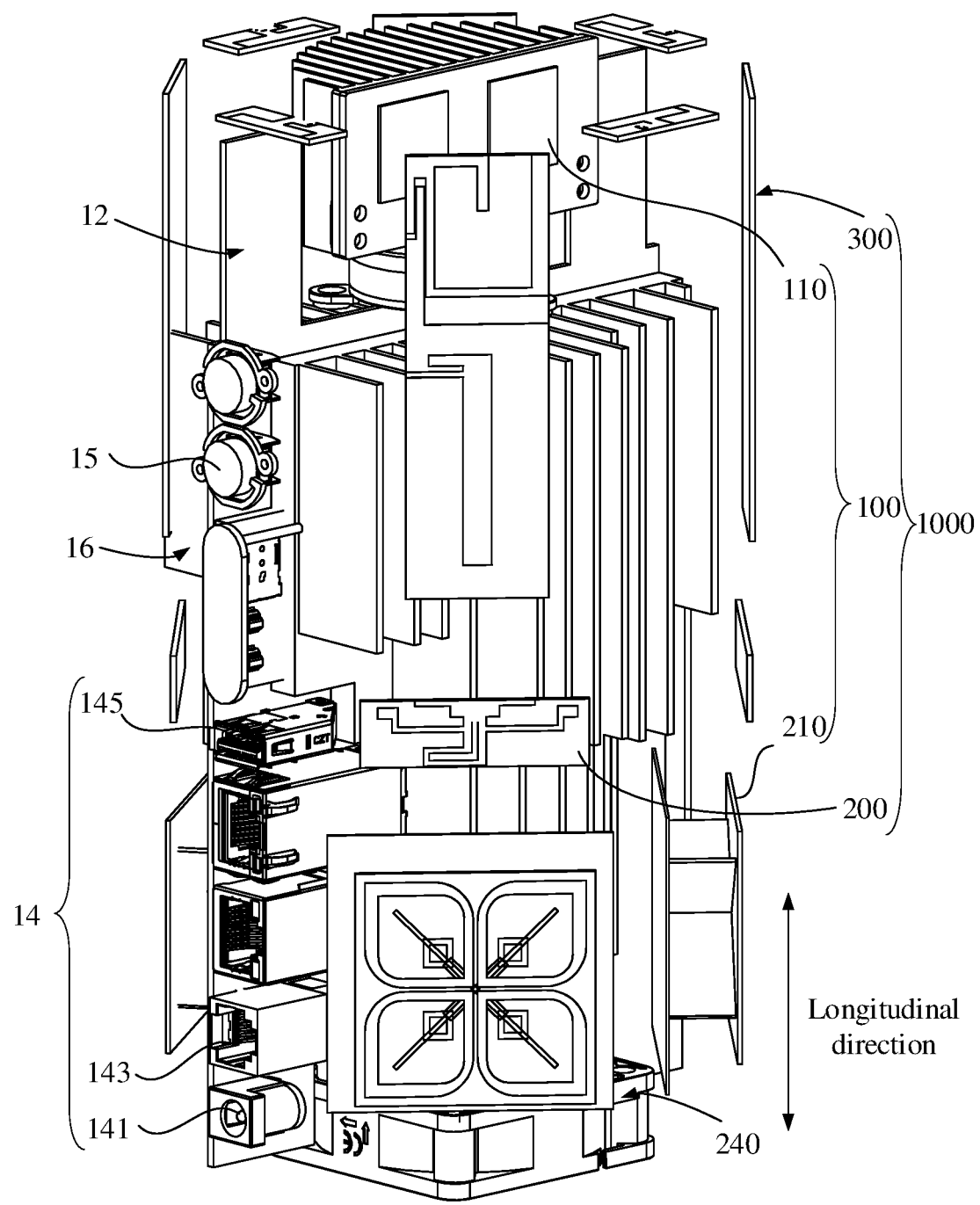
FIG. 7 is a schematic view of the user terminal equipment illustrated in FIG. 6 with a housing removed.
Figure 30:
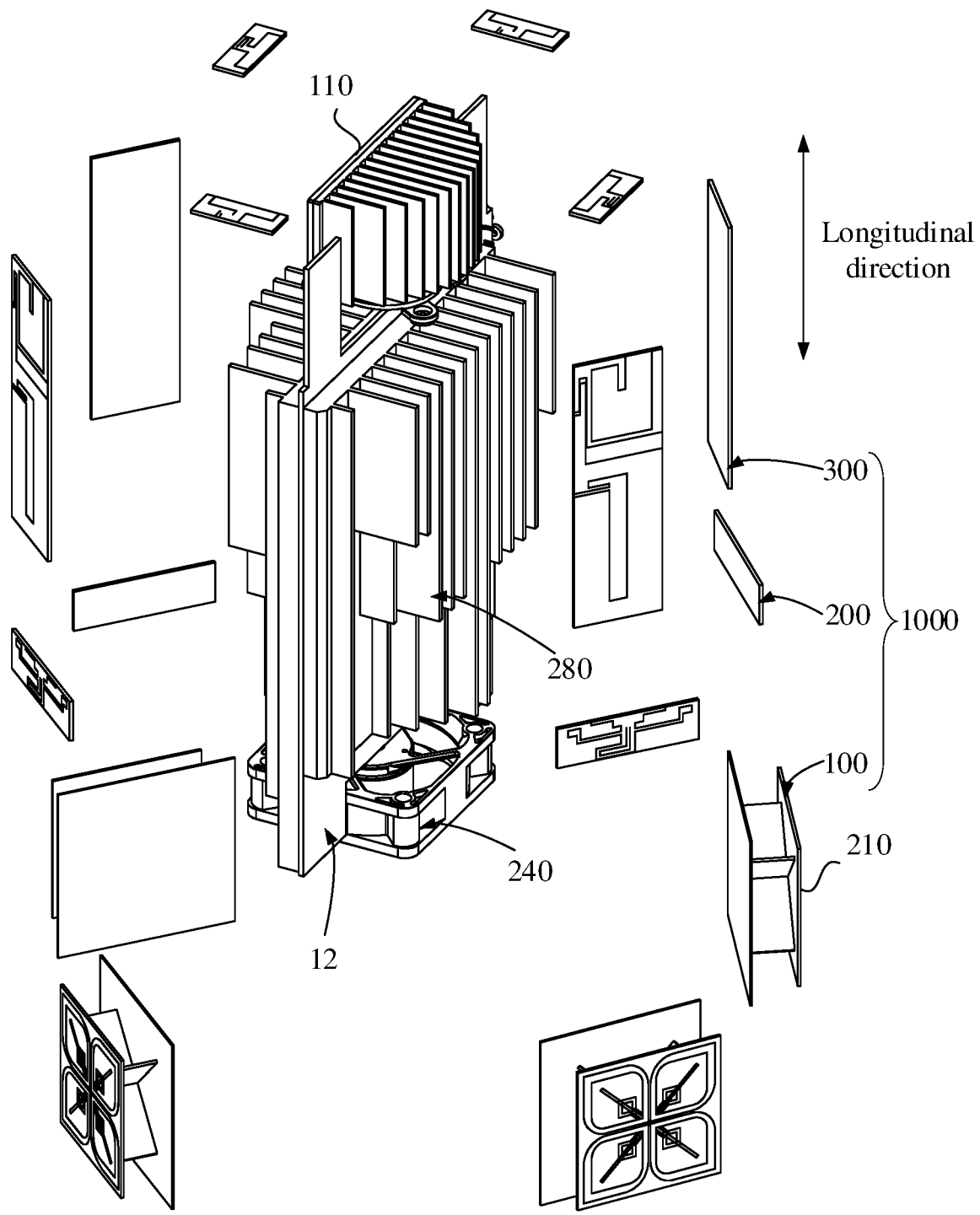
FIG. 30 is an exploded view of the user terminal equipment illustrated in FIG. 7 with the housing removed.

Referring to FIG. 6 and FIG. 7, in some implementations, the user terminal equipment 1 includes a housing 220, a circuit board 12, and a radio frequency (RF) system 1000. It is noted that, the housing 220 illustrated in FIG. 6 is substantially identical to the housing 220 illustrated in FIG. 3 and FIG. 4. The housing 220 defines a mounting cavity. The circuit board 12 and the RF system 1000 are mounted in the mounting cavity. The housing 220 provides supporting, positioning, and protection for the circuit board 12 and the RF system 1000. In at least one implementation illustrated in FIG. 6, the housing 220 is in a substantially cylindrical shape. The appearance of the user terminal equipment 1 is mainly presented by the housing 220. In other implementations, the housing 220 may be in other shapes such as a prismatic shape. With reference to FIG. 30, the circuit board 12 extends in a longitudinal direction of the housing 220. The RF system 1000 is electrically coupled to the circuit board 12. The circuit board 12 is provided with multiple interfaces 14 exposed to the housing 220, and the multiple interfaces 14 are electrically coupled to the circuit board 12. In at least one implementation illustrated in FIG. 7, the multiple interfaces 14 include a power interface 141, a network cable interface 143, a universal serial bus (USB) interface 145, and the like. The power interface 141 is configured to be connected to an external power source to power the user terminal equipment 1. The USB interface 145 can be used for data transmission between the user terminal equipment 1 and an external device. Alternatively, the USB interface 145 and the power interface 141 can be integrated together to simplify the interfaces 14 of the user terminal equipment 1. The network cable interface 143 may further include a wired network access terminal and a wired network output terminal. The user terminal equipment 1 can access network through the wired network access terminal, and then connect to other devices through one or more wired network output terminals. Alternatively, in some implementations, the wired network output terminal can be omitted, that is, after the user terminal equipment 1 accesses network through the wired network input terminal, the RF system 1000 converts a wired network into a wireless network (such as a Wi-Fi network) for access of the external devices. Alternatively, both the wired network access terminal and the wired network output terminal can be omitted. In this implementation, the user terminal equipment 1 can access a cellular network (also known as a mobile network) via the RF system 1000, and then convert signals received from the cellular network into Wi-Fi signals for network access of the external devices.

Referring to FIG. 6 and FIG. 7, the housing 220 may also be provided with a component such as a button 15. The button 15 is used to control an operating status of the user terminal equipment 1. For example, the user can start or close the user terminal equipment 1 by pressing the button 15. The housing 220 can also be provided with other components such as an indicator light for indicating the operating status of the user terminal equipment 1. In some implementations, the button 15 and the multiple interfaces 14 are arranged at the same side of the circuit board 12 and exposed to the same side of the housing 220. This arrangement facilitates the assembly of the button 15, the multiple interfaces 14, and the circuit board 12, thereby improving aesthetics and convenience of the user terminal equipment 1. This arrangement can be replaced with other arrangements, for example, the interfaces 14 and the button 15 can be individually exposed to different sides of the housing 220. That is, as illustrated in FIG. 6, the interfaces 14 and the button 15 are exposed to the same side of the housing 220, while as illustrated in FIG. 3 and FIG. 4, the interfaces 14 and the button 15 are exposed to different sides of the housing 220.

The user terminal equipment 1 further includes a first signal transceiving antenna 110 and a signal converter 120. The first signal transceiving antenna 110 is configured to be rotated to receive first network signals from different directions. The signal converter 120 is configured to convert a first network signal, which has a strongest signal strength among the first network signals received by the first signal transceiving antenna 110 from different directions, into a second network signal.

When the user terminal equipment 1 includes the housing 220, the first signal transceiving antenna 110 and the signal converter 120 may be received in the housing 220.

The first signal transceiving antenna 110 may be, but is not limited to, a transceiving antenna for millimeter wave signal or terahertz signal. Accordingly, the first network signal may be, but is not limited to, a millimeter wave signal or a terahertz signal. Currently, in the 5G wireless system, according to the specification of the 3GPP TS 38.101, two frequency ranges (FRs) are mainly used in 5G new radio (NR): FR1 and FR2. The frequency range corresponding to FR1 is 450 MHz-6 GHz, also known as the sub-6 GHz; the frequency range corresponding to FR2 is 24.25 GHz-52.6 GHz, which belongs to a millimeter wave (mm Wave) frequency band. 3GPP (Release 15) specifies the present 5G millimeter wave as follows: n257 (26.5-29.5 GHz), n258 (24.25-27.5 GHz), n261 (27.5-28.35 GHz), and n260 (37-40 GHz). Millimeter wave signal or terahertz signal has advantages such as fast transmission speed. However, millimeter wave signal or terahertz signal is easily to be blocked by an external object. When there is an object between the first signal transceiving antenna 110 and the base station 3, the first network signal received by the first signal transceiving antenna 110 has a weak signal strength. In this case, if the first network signal with weak signal strength is converted into the second network signal, the obtained second network signal may also have a weak signal strength.

For the user terminal equipment 1 located in a certain position, signal strengths of the first network signals received by the first signal transceiving antenna 110 from various directions are different. The first signal transceiving antenna 110 of the user terminal equipment 1 in this implementation is rotatable. When the first signal transceiving antenna 110 is aligned with a direction in which the first network signal has the strongest signal strength, the first signal transceiving antenna 110 remains in such direction. The signal converter 120 is configured to convert the first network signal with the strongest signal strength received by the first signal transceiving antenna 110 into the second network signal. The signal converter 120 of the user terminal equipment 1 in this implementation is configured to convert the first network signal with the strongest signal strength into the second network signal, thereby ensuring the signal strength of the second network signal, and in turn ensuring communication quality of the second network signal.

In at least one implementation, as long as the first signal transceiving antenna 110 is rotatable, the first signal transceiving antenna 110 can be rotated manually or automatically. In the disclosure, an example in which the first signal transceiving antenna 110 can be rotated automatically is described, and components that drive the first signal transceiving antenna 110 to rotate automatically will be described later.

Optionally, in at least one implementation, the user terminal equipment 1 further includes a processor 130. The processor 130 is configured to determine, according to the signal strengths of the first network signals, a direction in which the first network signal has the strongest signal strength, and to control the first signal transceiving antenna 110 to rotate to be aligned with the direction in which the first network signal has the strongest signal strength.

In at least one implementation, the processor 130 is electrically coupled to the first signal transceiving antenna 110. When the first signal transceiving antenna 110 rotates, the first signal transceiving antenna 110 can receive the first network signals from various directions. The processor 130 is configured to determine the direction in which the first network signal has the strongest signal strength by comparing the signal strengths of the first network signals which are received from various directions. In this implementation, the processor 130 is configured to control the first signal transceiving antenna 110 to rotate to face the direction in which the first network signal has the strongest signal strength, which can realize an automatic control of rotation of the first signal transceiving antenna 110.

Figure 8:
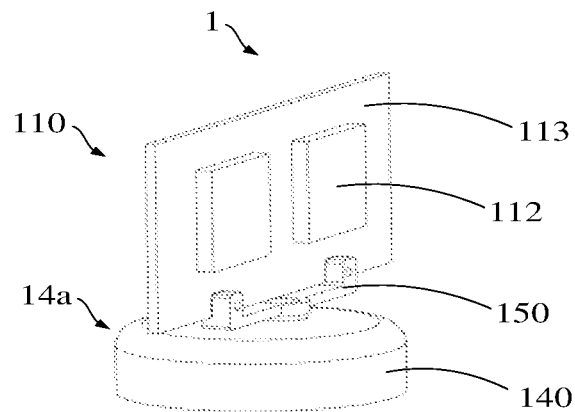
FIG. 8 is a schematic perspective view of some components in a user terminal equipment according to at least one implementation of the disclosure.
Figure 9:
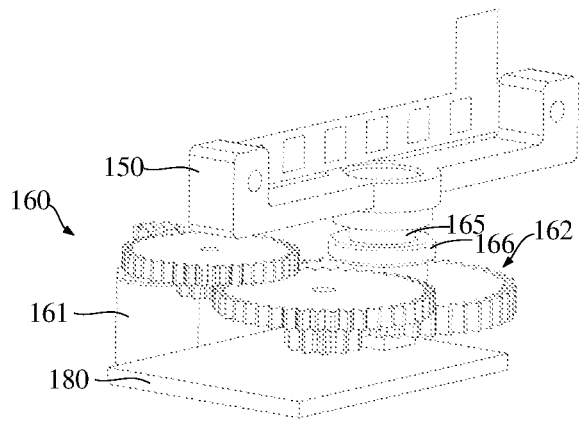
FIG. 9 is a schematic structural view of a driver according to at least one implementation of the disclosure.

FIG. 8 is a schematic perspective view of some components in the user terminal equipment 1 according to implementations of the disclosure. FIG. 9 is a schematic structural view of a driver 160 according to at least one implementation of the disclosure. FIG. 8 merely illustrates the first signal transceiving antenna 110 and components in the user terminal equipment 1 related to driving the first signal transceiving antenna 110, and other components in the user terminal equipment 1 are omitted. The user terminal equipment 1 further includes a base 140, a holder 150, and the driver 160. The base 140 is rotatably connected to the holder 150. The first signal transceiving antenna 110 is disposed on the holder 150. The driver 160 is configured to receive a control signal from the processor 130 and drive, under control of the control signal, the holder 150 to rotate relative to the base 140 to the direction in which the first network signal has the strongest signal strength. It is noted that, the base 140, the holder 150, and the driver 160 cooperate to form a rotating assembly 14a. In other words, the user terminal device 1 includes the rotating assembly 14a. The rotating assembly 14a includes the base 140, the holder 150, and the driver 160.

The base 140 is stationary. For example, the base 140 may be directly or indirectly fixed to the housing 220 of the user terminal equipment 1 (see FIG. 2). The holder 150 is rotatably connected with the base 140. The first signal transceiving antenna 110 is disposed on the holder 150. When the driver 160 drives the holder 150 to rotate, the holder 150 drives the first signal transceiving antenna 110 to rotate. The driver 160 may include, but is not limited to, a motor. The base 140 forms an outer covering, and the driver 160 is received in the outer covering formed by the base 140.

In at least one implementation, referring to FIG. 9, the driver 160 includes a motor 161 and a reducer 162. The motor 161 is fixed to the base 140. The motor 161 is configured to rotate under control of the control signal. The motor 161 has a step angle of first angle. The reducer 162 is engaged with an output shaft of the motor 161 and is rotatably connected to the holder 150. The reducer 162 is used to convert the first angle into a second angle, and the second angle is smaller than the first angle.

The driver 160 further includes a drive shaft 165. The drive shaft 165 is fixedly connected to a drive gear 164. The drive shaft 165 is also fixedly connected to the holder 150. When the drive gear 164 rotates, the drive shaft 165 rotates to drive the holder 150 to rotate. When the holder 150 rotates, the first signal transceiving antenna 110 disposed on the holder 150 is also driven to rotate.

Further, the driver 160 further includes a bearing 166. The bearing 166 is sleeved on the drive shaft 165, and the drive gear 164 is connected to the drive shaft 165 via the bearing 166.

The user terminal equipment 1 also includes a circuit board 180. The signal converter 120 and the processor 130 in the user terminal equipment 1 are both disposed on the circuit board 180. The circuit board 180 is also called a small board. Components for driving the first signal transceiving antenna 110 are mainly disposed on the circuit board 180. As an example, the circuit board 180 may also be provided with a power supply circuit, a protection circuit, and the like, so as to assist the signal converter 120 to convert the first network signal into a Wi-Fi signal.

The so-called "step angle" refers to a mechanical angle at which the output shaft of the motor 161 rotates with respect to one pulse of control signal. The step angle of the motor 161 may be, but is not limited to, 3°, 1.5°, 0.75°, 3.6°, or 1.8°. A larger step angle leads to a larger angle that the output shaft of the motor 161 is driven to rotate by one pulse of control signal and a larger angle that the first signal transceiving antenna 110 is driven to rotate. On the other hand, a smaller step angle leads to a smaller angle that the output shaft of the motor 161 is driven to rotate by one pulse of control signal and a smaller angle that the first signal transceiving antenna 110 is driven to rotate. A larger step angle leads to a larger angle that the output shaft of the motor 161 is driven to rotate by one pulse of control signal, and therefore less pulses are required for driving the output shaft of the motor 161 to rotate one revolution. On the other hand, a smaller step angle leads to a smaller angle that the output shaft of the motor 161 is driven to rotate by one pulse of control signal, and therefore more pulses are required for driving the output shaft of the motor 161 to rotate one revolution. For example, for the motor 161 with the step angle of 1.8°, the number of pulses required for driving the output shaft of the motor 161 to rotate one revolution is 360/1.8=200. Generally, when the step angle of the motor 161 is large, if the motor 161 is configured to drive the holder 150 directly without the reducer 162, an angle that the holder 150 rotates under drive of each pulse is large, which results in that the first signal transceiving antenna 110 arranged on the holder 150 rotates a large angle under drive of each pulse and in turn causes less first network signals to be received by the first signal transceiving antenna 110 when it rotates one revolution, and therefore, determination of the first network signal with the strongest signal strength based on the signal strength of each first network signal collected may be inaccurate. For example, when the step angle of the motor 161 is a first angle and the reducer 162 is not used, the holder 150 is driven to rotate from orientation A to orientation B by one pulse of control signal, while the first network signal with the strongest signal strength is at orientation C which is between orientation A and orientation B. As such, since the step angle is too large to allow the motor 161 to drive the first signal transceiving antenna 110 to rotate to orientation C, determination of the first network signal with the strongest signal strength based on the signal strength of each first network signal collected is therefore inaccurate.

The user terminal equipment 1 of the disclosure is provided with the reducer 162, and the first angle is changed into a second angle smaller than the first angle. When the motor 161 drives the holder 150 via the reducer 162, it needs more pulses of control signal to drive the holder 150 to rotate one revolution compared with directly driving the holder 150 without the reducer 162. In other words, compared to a user terminal equipment without the reducer 162, the user terminal equipment 1 with the reducer 162 allows the first signal transceiving antenna 110 to receive first network signals from more directions, which further improves accuracy of determining the first network signal with the strongest signal strength according to the signal strength of each of the first network signals collected.

In at least one implementation, the reducer 162 includes a P-stage gear set 163 and the drive gear 164. Each stage gear set of the P-stage gear set 163 includes a first gear 1631 and a second gear 1632 which is coaxially and fixedly connected with the first gear 1631. In each stage gear set of the P-stage gear set 163, the first gear 1631 has a radius greater than the second gear 1632. The first gear 1631 in a first-stage gear set 163a of the P-stage gear set 163 meshes with the output shaft of the motor 161, and the second gear 1632 in the first-stage gear set 163a meshes with the first gear 1631 in a second-stage gear set 163b of the P-stage gear set 163. The first gear 1631 in a $Q^{th}$-stage gear set of the P-stage gear set 163 meshes with the second gear 1632 in a $(Q-1)^{th}$-stage gear set of the P-stage gear set 163, and the second gear 1632 in the $Q^{th}$-stage gear set of the P-stage gear set 163 meshes with the first gear 1631 of the $(Q+1)^{th}$-stage gear set of the P-stage gear set 163. The second gear 1632 in the $P^{th}$-stage gear set of the P-stage gear set 163 meshes with the drive gear 164, and the drive gear 164 is fixedly connected to the holder 150. In an implement, Q and P are both positive integers, Q is greater than one and less than P. A radius of the first gear 1631 in the $Q^{th}$-stage gear set is smaller than that of the first gear 1631 in the $(Q+1)^{th}$-stage gear set, and a radius of the first gear 1631 in the $P^{th}$-stage gear set 163 is smaller than that of the drive gear 164.

In this implementation, an example in which the reducer 162 includes a two-stage gear set 163 is described. It is noted that, the reducer 162 may also be a single-stage gear set 163, a two-stage gear set 163, a three-stage gear set 163, or even a higher-stage gear set 163.

Figure 10:
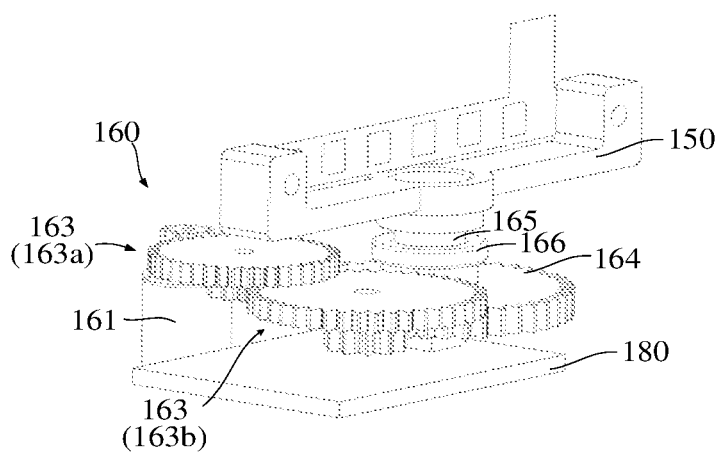
FIG. 10 is a schematic perspective view of a driver according to at least one implementation of the disclosure.
Figure 11:
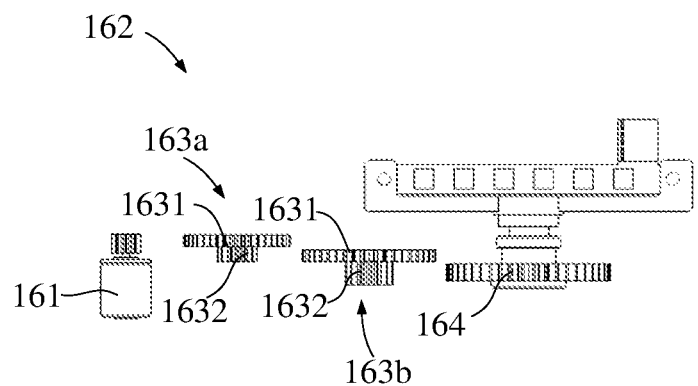
FIG. 11 is an exploded schematic view of a reducer according to at least one implementation of the disclosure.

FIG. 10 is a schematic perspective view of the driver 160 according to at least one implementation of the disclosure. FIG. 11 is an exploded schematic view of the driver 160 according to at least one implementation of the disclosure. In this implementation, the reducer 162 includes a two-stage gear set 163. Each stage gear set of the two-stage gear set 163 includes the first gear 1631 and the second gear 1632 which is coaxially and fixedly connected with the first gear 1631. In each stage gear set of the two-stage gear set 163, the first gear 1631 has a radius greater than that of the second gear 1632. For ease of description, two stages of gear sets in the two-stage gear set 163 are named a first-stage gear set 163a and a second-stage gear set 163b, respectively. The first gear 1631 in the first-stage gear set 163a meshes with the output shaft of the motor 161, and the second gear 1632 in the first-stage gear set 163a meshes with the first gear 1631 in the second-stage gear set 163b. The second gear 1632 in the second-stage gear set 163b meshes with the drive gear 164. A radius of the first gear 1631 in the first-stage gear set 163a is smaller than that of the first gear 1631 in the second-stage gear set 163b, and a radius of the first gear 1631 in the second-stage gear set 163b is smaller than that of the drive gear 164.

Figure 12:
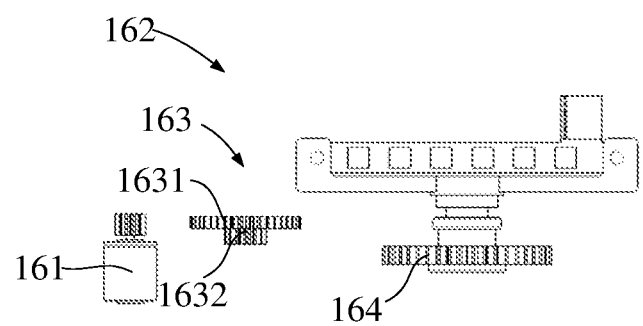
FIG. 12 is a schematic structural view of a reducer according to implementations of the disclosure.

FIG. 12 is a schematic structural view of the reducer 162 according to implementations of the disclosure. In this implementation, the reducer 162 includes a single-stage gear set 163. The single-stage gear set 163 includes a first gear 1631 and a second gear 1632 which is coaxially and fixedly connected with the first gear 1631. The first gear 1631 has a radius greater than the second gear 1632. The first gear 1631 meshes with the output shaft of the motor 161, and the second gear 1632 meshes with the drive gear 164.

Figure 13:
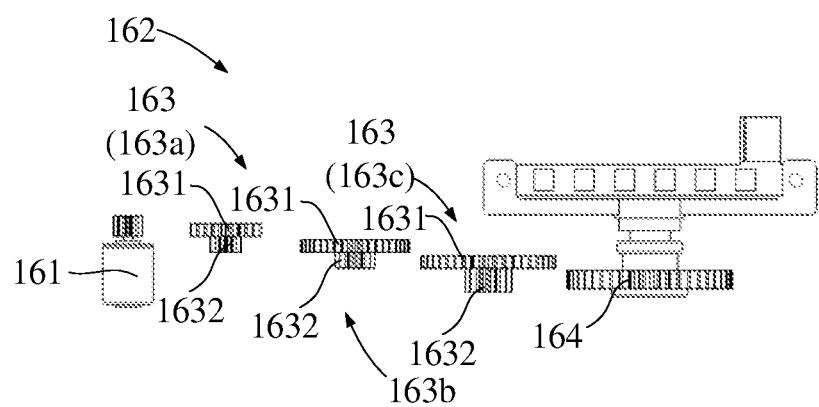
FIG. 13 is a schematic structural view of a reducer according to implementations of the disclosure.

FIG. 13 is a schematic structural view of the reducer 162 according to implementations of the disclosure. In this implementation, the reducer 162 includes a three-stage gear set 163, each stage gear set of the three-stage gear set 163 includes the first gear 1631 and the second gear 1632 which is coaxially and fixedly connected with the first gear 1631. In each stage gear set of the three-stage gear set 163, the first gear 1631 has a radius greater than the second gear 1632. For ease of description, three stages of gear sets in the three-stage gear set 163 are named a first-stage gear set 163a, a second-stage gear set 163b, and a third-stage gear set 163c, respectively. The first gear 1631 in the first-stage gear set 163a meshes with the output shaft of the motor 161, and the second gear 1632 in the first-stage gear set 163a meshes with the first gear 1631 in the second-stage gear set 163b. The second gear 1632 in the second gear set 163b meshes with the first gear 1631 in the third gear set 163, and the second gear 1632 in the third gear set 163 meshes with the drive gear 164. The drive gear 164 is fixedly connected to the holder 150. A radius of the first gear 1631 in the first-stage gear set 163a is smaller than that of the first gear 1631 in the second-stage gear set 163b, a radius of the first gear 1631 in the second-stage gear set 163b is smaller than that of the first gear 1631 in the third-stage gear set 163c, and a radius of the first gear 1631 in the third-stage gear set 163c is smaller than the radius of the drive gear 164.

The gear set 163 with more gear stages leads to a smaller second angle, which is beneficial to precisely control a rotation angle of the holder 150 and to receive the first network signals from more directions, thereby facilitating improvement in the accuracy of determining the first network signal with the strongest signal strength according to the signal strength of each of the first network signals collected. However, the gear set 163 with more gear stages results in more installation time of the gear set 163 and a larger space occupied by the gear set 163. Taking this into consideration, the number of gear stages of the gear set 163 can be determined according to an accuracy of controlling the rotation angle of the holder 150, installation time of the gear set 163, and a space occupied by the gear set 163.

In this implementation, the reducer 162 includes the three-stage gear set 163. The motor 161 is fixed to the base 140. P=3. The first gear 1631 in the first-stage gear set of the three-stage gear set 163 is disposed further away from the base 140 than the second gear 1632 in the first-stage gear set. The first gear 1631 in the second-stage gear set of the three-stage gear set 163 is disposed further away from the base 140 than the second gear 1632 in the second-stage gear set. The first gear 1631 in the third-stage gear set of the three-stage gear set 163 is disposed closer to the base 140 than the second gear 1632 in the third-stage gear set. The arrangement of the gear set 163 in this implementation makes the gear set 163 occupy a small space, which is beneficial to improve integration of the reducer 162.

In this implementation, the driver 160 drives the holder 150 to rotate, which in turn drives the first signal transceiving antenna 110 to rotate in a first plane. In other implementations, the driver 160 can drive the holder 150 to rotate, which in turn drives the first signal transceiving antenna 110 to rotate in the first plane, as well as a second plane, where the first plane is different from the second plane. For example, the first plane may be an X-Y plane, and the second plane may be a Y-Z plane.

When the driver 160 drives the holder 150 to rotate to drive the first signal transceiving antenna 110 to rotate in the first plane and the second plane, it allows the first signal transceiving antenna 110 to receive the first network signals from more directions, thereby improving the accuracy of determining the first network signal with the strongest signal strength according to the signal strength of each of the first network signals collected.

Figure 14:
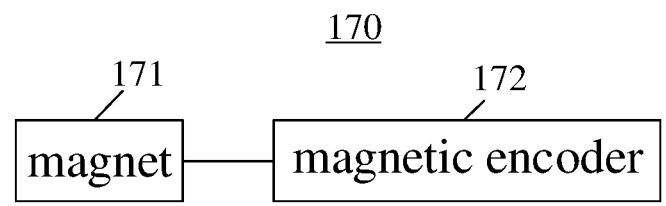
FIG. 14 is a circuit block diagram of a position monitor in a user terminal equipment according to implementations of the disclosure.

FIG. 14 is a circuit block diagram of a position monitor 170 in the user terminal equipment 1 according to implementations of the disclosure. The user terminal equipment 1 further includes the position monitor 170. The position monitor 170 is configured to monitor an angle that the holder 150 rotates relative to the base 140. The processor 130 is configured to adjust the control signal according to the angle that the holder 150 rotates relative to the base 140. In at least one implementation, the position monitor 170 includes a magnet 171 and a magnetic encoder 172. The magnet 171 is disposed on the drive shaft 165 (see FIG. 9 and FIG. 10) connected with the drive gear 164. The magnetic encoder 172 is disposed on the circuit board 180. Optionally, the magnet 171 is disposed on an end of the drive shaft 165 close to the circuit board 180. The magnet 171 can also be disposed on one side of the drive gear 164 facing the circuit board 180, so as to improve detection accuracy.

Figure 15:
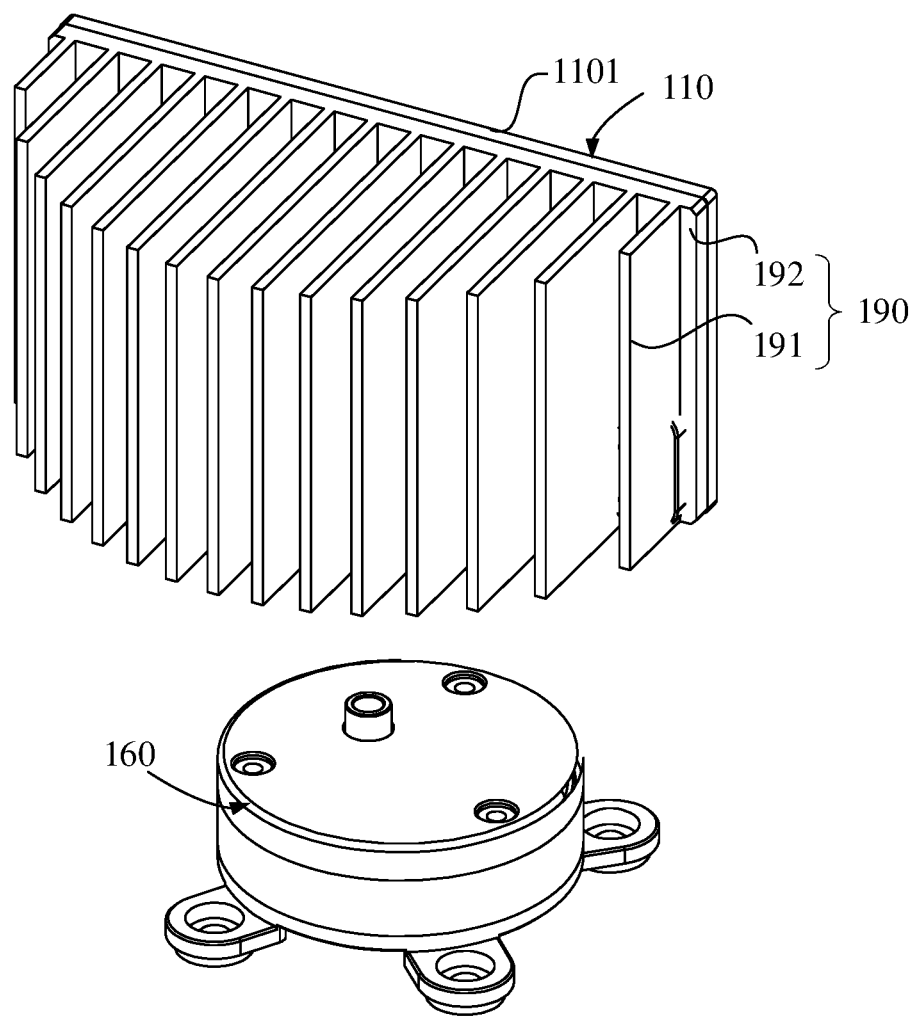
FIG. 15 is an exploded view of a driver and a first signal transceiving antenna of a user terminal equipment illustrated.
Figure 16:
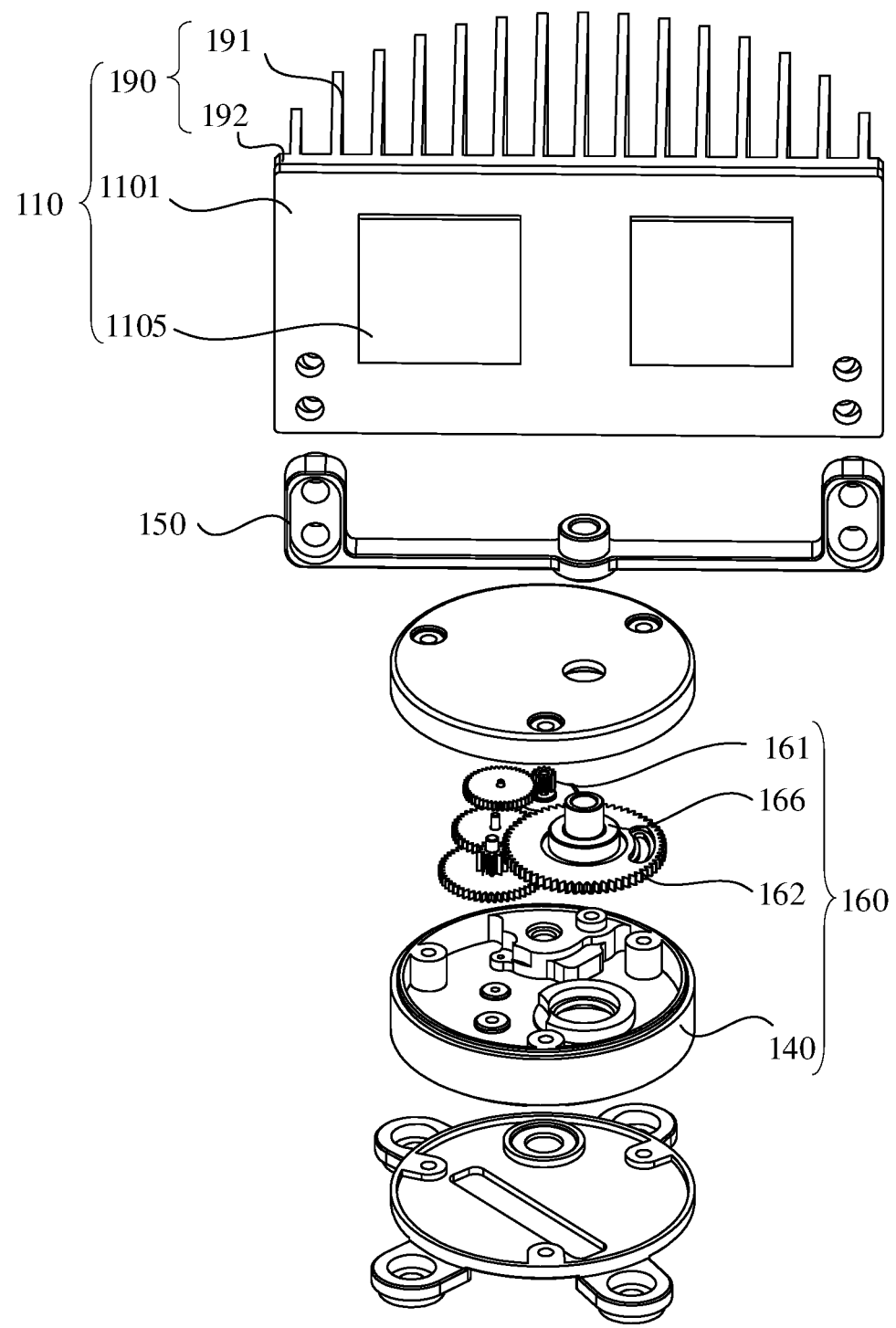
FIG. 16 is an exploded view of the driver and the first signal transceiving antenna of the user terminal equipment illustrated in FIG. 15.

Referring to FIG. 15 and FIG. 16, the driver 160 includes a base 140, a motor 161, and a reducer 162. The reducer 162 and the motor 161 are mounted on and supported by the base 140. The first signal transceiving antenna 110 is connected with the reducer 162. The motor 161 can drive the first signal transceiving antenna 110 to rotate via the reducer 162. In some implementations, the base 140 is mounted to and fixedly supported by the housing 220. In other implementations, the base 140 is mounted to and fixedly supported by the circuit board 12. In implementations of the disclosure, the motor 161 is a stepping motor, and the stepping motor is easy to obtain relatively high control accuracy. The base 140 defines a cavity. The motor 161 is mounted in the cavity of the base 140. An output shaft of the motor 161 is connected to the reducer 162. Most of components of the reducer 162 are received in the cavity of the base 140. An output end of the reducer 162 extends out of the base 140 and connects to first signal transceiving antenna 110. In other implementation, the output end of reducer 162 does not need to extend out of the base 140. For example, the first signal transceiving antenna 110 can be provided with a connecting shaft, the output end of the reducer 162 defines a connecting hole, and the first signal transceiving antenna 110 can be connected with the reducer 162 by inserted the connecting shaft into the connecting hole.

Figure 17:
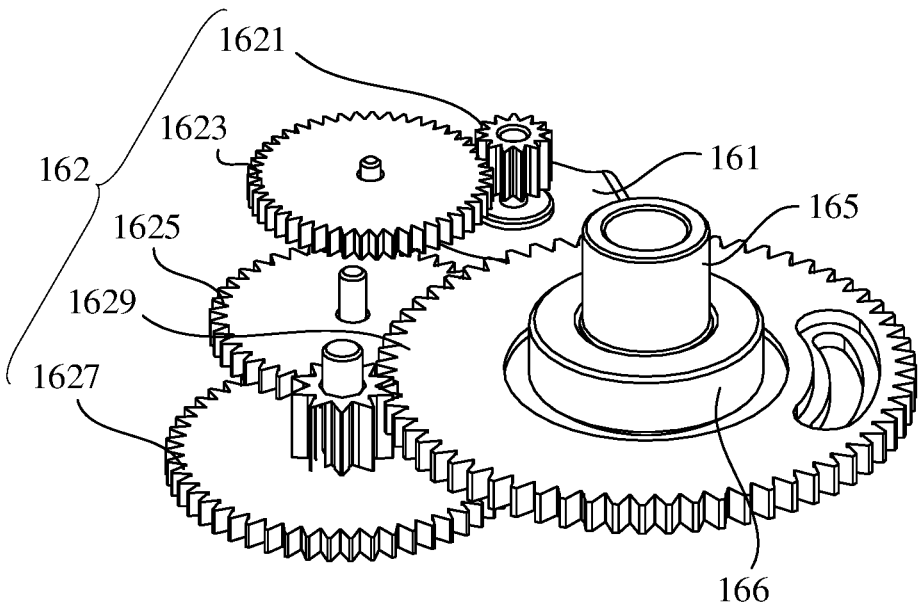
FIG. 17 is a schematic view of a reducer of the driver of the user terminal equipment illustrated in FIG. 16.
Figure 18:
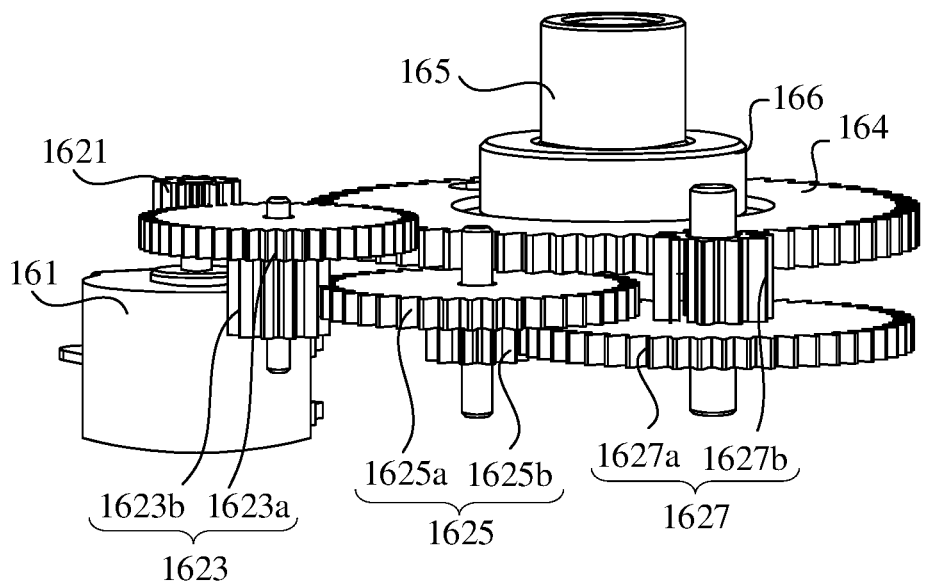
FIG. 18 is a schematic view of the reducer of the driver of the user terminal equipment illustrated in FIG. 17 from another perspective.

Further, referring to FIG. 17 and FIG. 18, in at least one implementation of the disclosure, the reducer 162 includes the output gear 1621, the first-stage gear set 1623, the second-stage gear set 1625, the third-stage gear set 1627, and the drive gear 164. It is noted that, the first-stage gear set 1623, the second-stage gear set 1625, and the third-stage gear set 1627 are the same as the first-stage gear set 163a, the second-stage gear set 163b, and the third-stage gear set 163c, respectively. The output gear 1621 is connected to the output shaft of the motor 161. The output gear 1621 can be integrated with the output shaft of the motor 161, so as to simplify a connection structure between the output gear 1621 and the motor 161. The first-stage gear set 1623 includes a first-stage large gear 1623a and a first-stage small gear 1623b coaxially fixed with the first-stage large gear 1623a. The first-stage large gear 1623a and the first-stage small gear 1623b are rotatably connected to the base 140. The first-stage large gear 1623a meshes with the output gear 1621. The second-stage gear set 1625 includes a second-stage large gear 1625a and a second-stage small gear 1625b coaxially fixed with the second-stage large gear 1625a. The second-stage large gear 1625a and the second-stage small gear 1625b are rotatably connected with the base 140. The second-stage large gear 1625a meshes with the first-stage small gear 1623b. The third-stage gear set 1627 includes a three-stage large gear 1627a and a three-stage small gear 1627b coaxially fixed with the three-stage large gear 1627a. The three-stage large gear 1627a and the three-stage small gear 1627b are rotatably connected to the base 140. The three-stage large gear 1627a meshes with the second-stage small gear 1625b. The three-stage small gear 1627b meshes with the drive gear 164. The drive gear 164 is provided with an output end for connecting the first signal transceiving antenna 110. When the motor 161 is operating, the output shaft of the motor 161 drives the output gear 1621 to rotate, and then the first signal transceiving antenna 110 is driven to rotate via the first-stage gear set 1623, the second-stage gear set 1625, the third-stage gear set 1627 and the drive gear 164. Further, in implementation of the disclosure, the motor 161 has a step angle of about 18 degrees, a total reduction ratio of the reducer 162 is equal to about 60, and the first signal transceiving antenna 110 have a step angle, which may have a minimum angle of 0.3 degrees. With above-mentioned configuration, an accuracy of positioning the first signal transceiving antenna 110 can be improved.

Further, the driver 160 includes a sliding bearing 166. The sliding bearing 166 has an outer ring fixedly connected to the base 140 and an inner ring sleeved on an output end of the drive gear 164. The output end of the drive gear 164 can rotate relative to the sliding bearing 166. The sliding bearing 166 can support the output end of the drive gear 164 to avoid a tilting of the output end of the drive gear 164 during rotation. The sliding bearing 166 can also reduce wear caused by rotation of the output end of the drive gear 164 relative to the base 140. Furthermore, each of two ends of the drive gear 164 in an axial direction thereof can be sleeved with one sliding bearing 166, such that the sliding bearings 166 can support the drive gear 164. Alternatively, it can be understood that the sliding bearing 166 is not essential. For example, a portion of the base 140 and a portion the output end of the drive gear 164 which are fitted with each other can be made of wear-resistant material, such that the base 140 itself can achieve a function equivalent to that of the sliding bearing 166, so as to simplify the driver 160.

Figure 19:
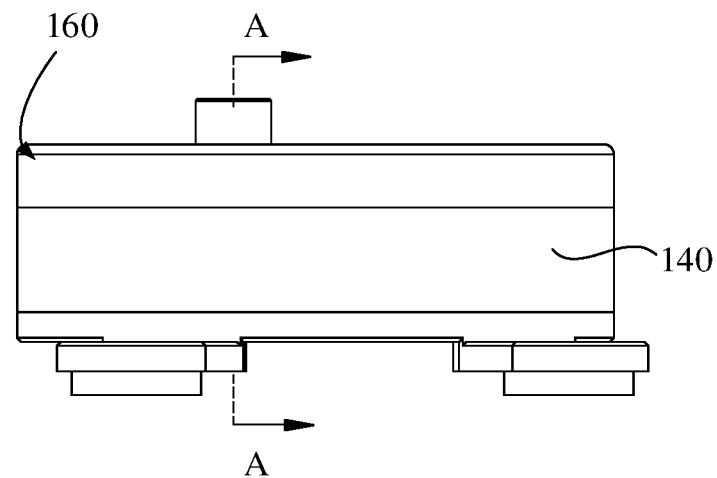
FIG. 19 is a front view of the driver of the user terminal equipment illustrated in FIG. 15.
Figure 20:
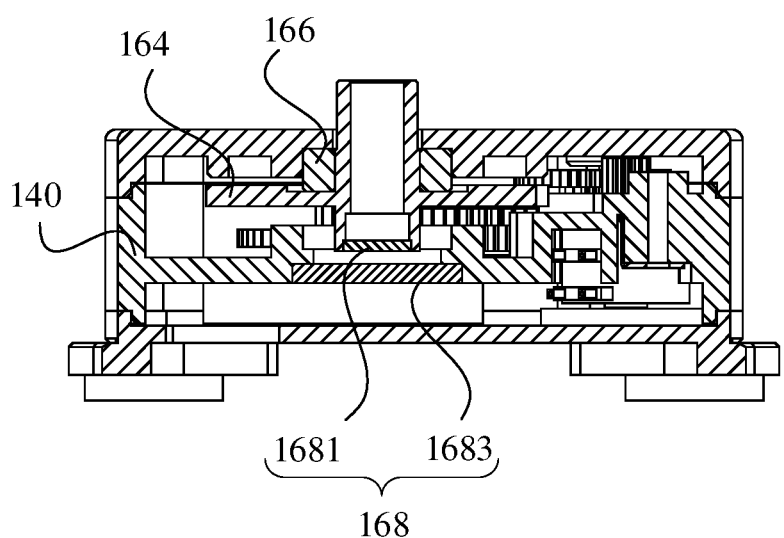
FIG. 20 is a cross-sectional view of the user terminal equipment illustrated in FIG. 19 along A-A.

Further, referring to FIG. 19 and FIG. 20, the user terminal equipment 1 includes a detection module 168. The detection module 168 is connected to the driver 160 and can be used to measure a rotation angle of the drive gear 164, so as to further determine the rotation angle of the first signal transceiving antenna 110. In some implementations, referring to FIG. 20, the detection module 168 is a magnetic encoder, which includes a magnet 1681 and a magnetic encoding chip 1683 disposed opposite to the magnet 1681. The magnet 1681 is disposed at the drive gear 164 and rotatable with the drive gear 164. The magnetic encoding chip 1683 is fixedly connected to the base 140 and can be electrically coupled to the circuit board 12. When the drive gear 164 rotates, the magnet 1681 can rotate with the drive gear 164, which in turn causes a change in magnetic field. The magnetic encoding chip 1683 can relatively accurately measure the change in magnetic field caused by the rotation of the magnet 1681, such that the rotation angle of the drive gear 164 can be accurately recorded. That is, the rotation angle of the first signal transceiving antenna 110 is accurately recorded, thereby forming a closed-loop control. After the first signal transceiving antenna 110 rotates one revolution and strengths of millimeter wave signals received by the first signal transceiving antenna 110 within a 360-degree angular range have been obtained, a direction in which the millimeter wave signal has the strongest signal strength can be determined based on information of the rotation angle recorded by the magnetic encoding chip 1683. The motor 161 can then drive the first signal transceiving antenna 110 to rotate to align with the direction in which the millimeter wave signal has the strongest signal strength. Specifically, in some implementations, an absolute zero point can be set by the magnetic encoding chip 1683, the absolute zero point serves as an initial position, and the rotation angle of the first signal transceiving antenna 110 relative to the initial position is recorded. In other implementations, a method for measuring a relative angle can also be used to record a rotation angle between a current position and a previous position of the first signal transceiving antenna 110.

In other implementations, the detection module 168 can be an optical encoder. The optical encoder can include a code wheel and a light source. The code wheel can be fixedly connected to the drive gear 164 and rotate with the drive gear 164. The light source can be fixedly connected to the base 140, and is configured to emit light to the code wheel. When the drive gear 164 rotates, the code wheel can rotate with the drive gear 164, such that a pulse signal is generated in a detection circuit. The optical encoder can relatively accurately measure the rotation angle of the drive gear 164, such that the rotation angle of the first signal transceiving antenna 110 is accurately recorded, thereby forming a closed-loop control.

It is noted that, in other implementations, the structure of the reducer 162 can be simplified. For example, a motor 161 with high precision and large torque allows the reducer 162 to have less gears, so as to simplify the structure of the driver 160. Further, in at least one implementation, the output shaft of the motor 161 is directly connected to the first signal transceiving antenna 110 and can directly drive the first signal transceiving antenna 110 to rotate. That is, in this implementation, the reducer 162 is omitted. Alternatively, for ease of assembly, the base 140 can be formed with more than two housings, the output end of the drive gear 164 can be provided with a bracket 150, and the first signal transceiving antenna 110 can be mounted on the bracket 189, thereby facilitating convenient assembly.

Figure 21:
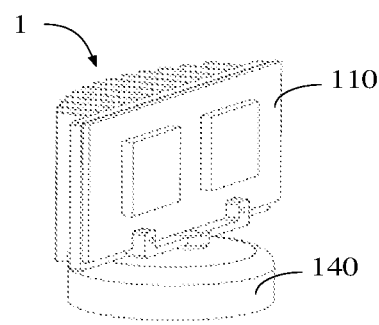
FIG. 21 is a perspective structural view of some components of a user terminal equipment according to implementations of the disclosure.
Figure 22:
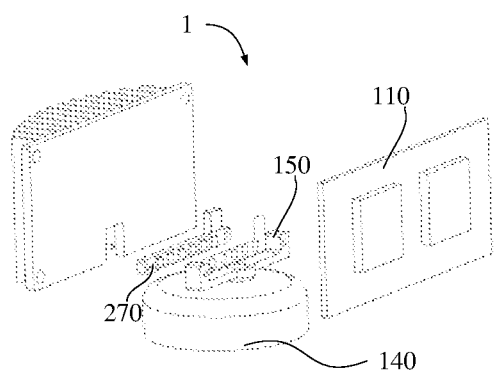
FIG. 22 is an exploded perspective view of some components of the user terminal equipment illustrated in FIG. 21.
Figure 23:
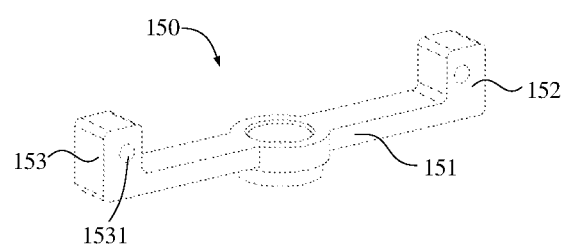
FIG. 23 is a schematic structural view of a holder according to at least one implementation of the disclosure.

FIG. 21 is a perspective structural view of some components of the user terminal equipment 1 according to implementations of the disclosure. FIG. 22 is an exploded perspective view of some components of the user terminal equipment 1 illustrated in FIG. 21. FIG. 23 is a schematic structural view of the holder 150 according to at least one implementation of the disclosure. Referring to FIGS. 12 to 14 in combination with FIG. 9 and FIG. 10, the user terminal equipment 1 in this implementation also includes an auxiliary holder 270. The auxiliary holder 270 can be integrated into the user terminal equipment 1 provided according to any of above identified implementations.

The auxiliary holder 270 is fixed on the holder 150. The auxiliary holder 270 is used to assist the holder 270 to fix the first signal transceiving antenna 110, such that the first signal transceiving antenna 110 is more firmly fixed to the holder 150.

In this implementation, the holder 150 includes a main body 151, a first extending portion 152, and a second extending portion 153. The first extending portion 152 bends and extends from one end of the main body 151, the second extension 153 bends and extends from the other end of the main body 151. The second extending portion 153 and the first extending portion 152 are on the same side of the main body 151 and extend away from the base 140. The first signal transceiving antenna 110 is fixed to the first extending portion 152 and the second extending portion 153 via fixing members, respectively. The first signal transceiving antenna 110 is disposed to one side of the circuit board 180 away from the base 140.

The first extending portion 152 and the second extending portion 153 are each provided with a positioning member 1531. The fixing members and the positioning members 1531 cooperate to fix the first signal transceiving antenna 110 to the first extending portion 152 and the second extending portion 153 respectively. In this implementation, the positioning member 1531 is a positioning hole, the positioning hole is provided with a thread in an inner wall thereof. Correspondingly, the fixing member is a bolt, and the circuit board 180 defines through holes. When assembling, the through holes are aligned with the positioning holes, and then the bolts (i.e., the fixing members) pass through the through holes and the positioning holes in sequence to fix the base plate 113 to the first extending portion 152 and the second extending portion 153 of the holder 150. It is noted that, in other implementations, the positioning member 1531 is a screw, and a length of the screw is generally greater than a thickness of the base plate 113. The fixing member is a nut, and the base plate 113 defines the through holes. When assembling, the through holes of the base plate 113 are aligned with and sleeved on the screws, and then the nuts are screwed on the screws, so as to fix the base plate 113 to the first extending portion 152 and the second extending portion 153 of the holder 150. A manner in which the base plate 113 is fixed to the first extending portion 152 and the second extending portion 153 is not limited to the two implementations described above, and can be any other manner as long as the base plate 113 can be fixed to the holder 150.

Figure 24:
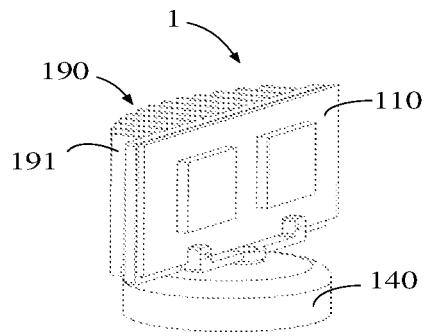
FIG. 24 is a schematic structural view of some components of a user terminal equipment according to implementations of the disclosure.
Figure 25:
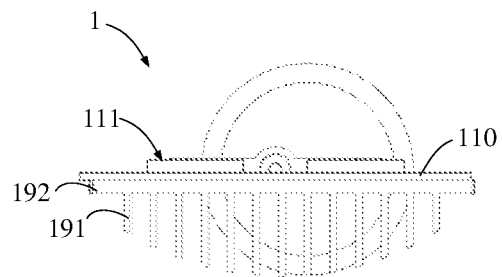
FIG. 25 is a top view of FIG. 24.

FIG. 24 is a schematic structural view of some components of the user terminal equipment 1 according to implementations of the disclosure. FIG. 25 is a top view of FIG. 24. The user terminal equipment 1 in this implementation further includes a heat sink 190. The heat sink 190 can be integrated into the user terminal equipment 1 provided according to any of the above identified implementations. The first signal transceiving antenna 110 has a surface 111 capable of receiving the first network signal. The heat sink 190 is directly or indirectly disposed on a surface of the first signal transceiving antenna 110 away from the surface 111.

The heat sink 190 may be made of, but is not limited to, a metal with good thermal conductivity. The heat sink 190 is used to dissipate heat when the first signal transceiving antenna 110 is in operation, so as to avoid unstable performance of the first signal transceiving antenna 110 due to overheating of the first signal transceiving antenna 110 during operation. In this implementation, the heat sink 190 further includes multiple fins 191. The multiple fins 191 are spaced apart from each other to improve heat dissipation effect. Further, the fin 191 close to a rotating shaft of the first signal transceiving antenna 110 has a size greater than the fin 191 away from the rotating shaft.

Since there is a gap between the housing 220 of the user terminal equipment 1 and two ends of the first signal transceiving antenna 110, heat dissipation of the two ends of the first signal transceiving antenna 110 is better than portions of the first signal transceiving antenna 110 close to the rotating shaft. In the user terminal equipment 1 of the disclosure, the size of the fin 191 close to the rotating shaft of the first signal transceiving antenna 110 is designed to be greater than that of the fin 191 away from the rotating shaft, and thus heat dissipation uniformity of each part of the first signal transceiving antenna 110 can be improved.

Further, in at least one implementation, lengths of the fins 191 sequentially increase along a direction from the two ends of the first signal transceiving antenna 110 to the portions of the first signal transceiving antenna 110 close to the rotating shaft. On one hand, the arrangement of the fins 191 can improve heat dissipation uniformity of each part of the first signal transceiving antenna 110, and on the other hand, the first signal transceiving antenna 110 is unlikely to collide with other components in the user terminal equipment 1 during rotation.

Further, the heat sink 190 further includes a heat dissipation body 192. The heat dissipation body 192 is attached to the surface of the first signal transceiving antenna 110 away from the surface 111. The multiple fins 191 are arranged on a surface of the heat dissipation body 192 away from the surface 111. The heat dissipation body 192 may be, but is not limited to, rectangle.

When the heat sink 190 further includes the heat dissipation body 192, the contact area between the heat dissipation body 192 and the first signal transceiving antenna 110 is large, such that the first signal transceiving antenna 110 can quickly dissipate heat.

Figure 26:
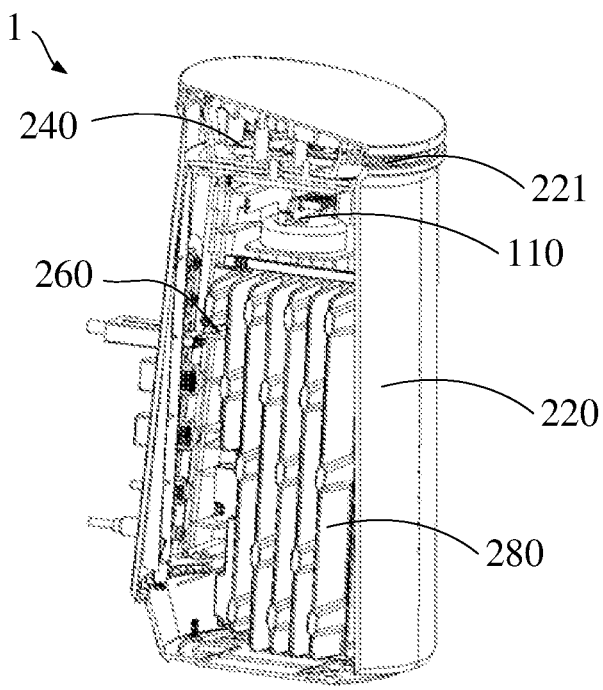
FIG. 26 is a schematic structural view of a user terminal equipment with a part of a housing removed according to implementations of the disclosure.

FIG. 26 is a schematic structural view of the user terminal equipment 1 with a part of the housing 220 removed according to implementations of the disclosure. In this implementation, the user terminal equipment 1 further includes a fan 240. The fan 240 can be integrated into the user terminal equipment 1 provided according to any of the above identified implementations. In this implementation, the fan 240 is integrated into the user terminal equipment 1 illustrated in FIG. 3 for illustration. The fan 240 is disposed corresponding to the first signal transceiving antenna 110 for heat dissipation. The fan 240 is used to accelerate air circulation around the first signal transceiving antenna 110 to further improve the heat dissipation effect.

Further, the housing 220 of the user terminal equipment 1 defines heat dissipation holes 221. The heat dissipation holes 221 communicate with a receiving space defined by the housing 220. When the fan 240 rotates, air within the housing 220 is driven to exchange with air outside the housing 220 through the heat dissipation holes 221 to achieve heat dissipation.

In some implementations, the user terminal equipment 1 further includes a circuit board 12. The circuit board 12 is installed within the user terminal equipment 1 and used to guarantee operation of the user terminal equipment 1. The circuit board 12 is also called a large board.

In some implementations, the user terminal equipment 1 further includes a heat sink 280. The heat sink 280 is disposed close to the circuit board 12 for heat dissipation.

Figure 27:
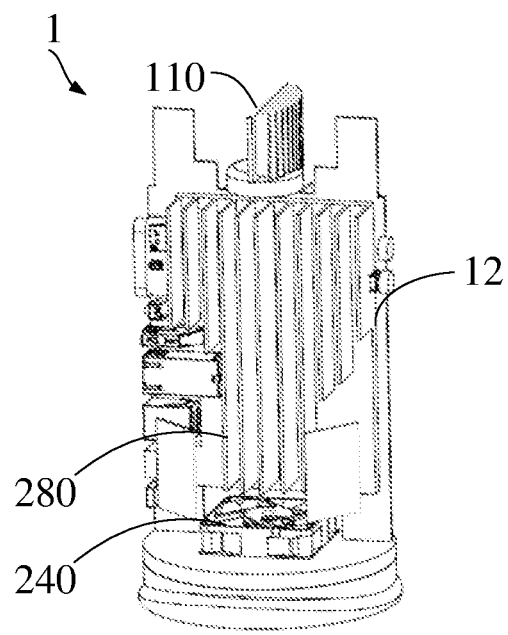
FIG. 27 is a schematic structural view of a user terminal equipment with a housing removed according to implementations of the disclosure.

FIG. 27 is a schematic structural view of the user terminal equipment 1 with the housing 220 removed according to implementations of the disclosure. In this implementation, the user terminal equipment 1 further includes a fan 240. The fan 240 can be integrated into the user terminal equipment 1 provided in any of implementations related to FIGS. 1 to 16.

The fan 240 is installed at the bottom of the user terminal equipment 1. When the fan 240 rotates, air within the housing 220 can exchange with the air outside the housing 220 to realize heat dissipation.

In some implementations, the user terminal equipment 1 further includes the circuit board 12. The circuit board 12 is installed at the bottom of the user terminal equipment 1 and used to guarantee the operation of the user terminal equipment 1. The circuit board 12 is also called the large board.

In some implementations, the user terminal equipment 1 further includes the heat sink 280. The heat sink 280 is disposed close to the circuit board 12 for heat dissipation.

Figure 31:
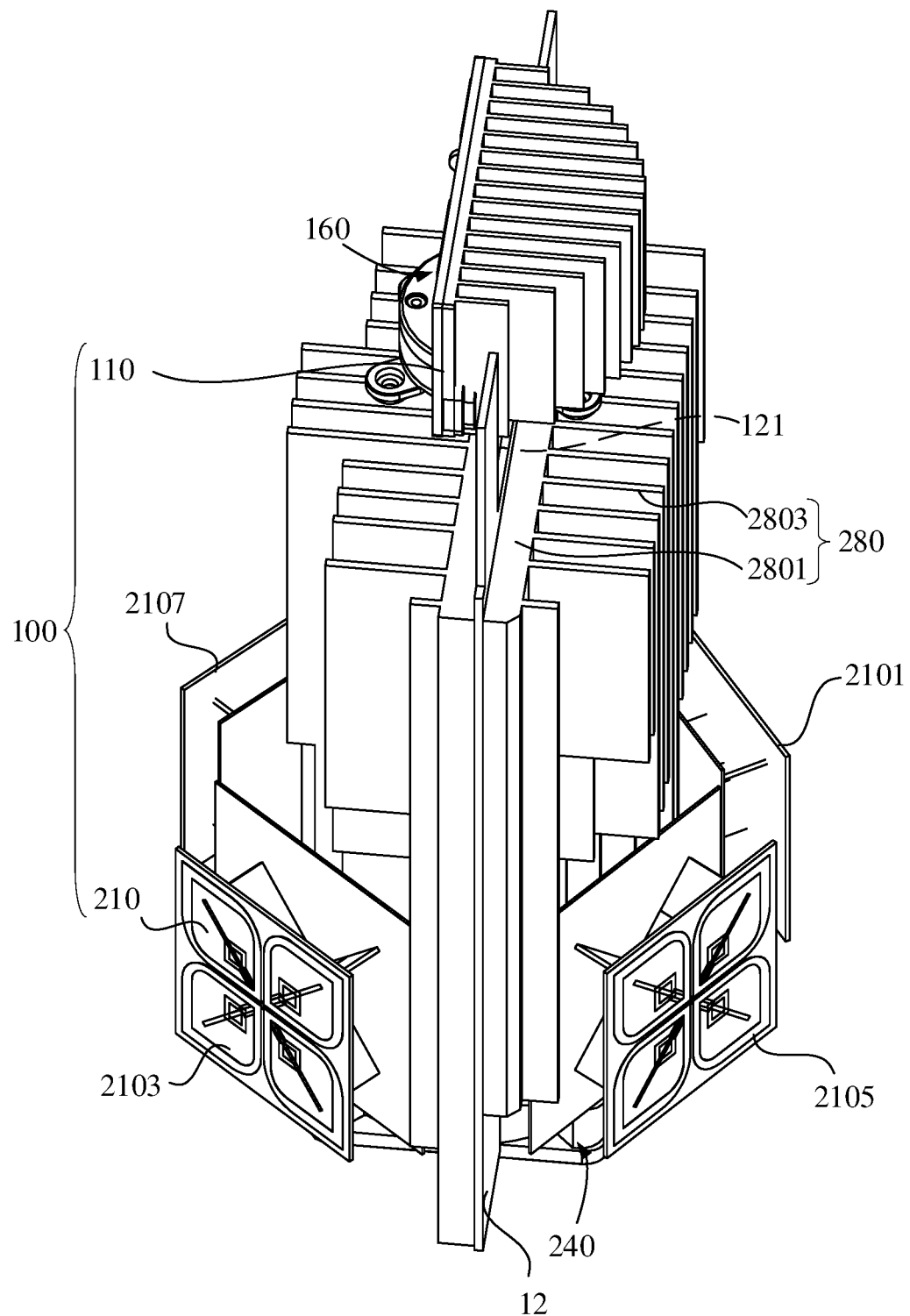
FIG. 31 is a schematic view of the user terminal equipment illustrated in FIG. 7 with some components removed.
Figure 32:
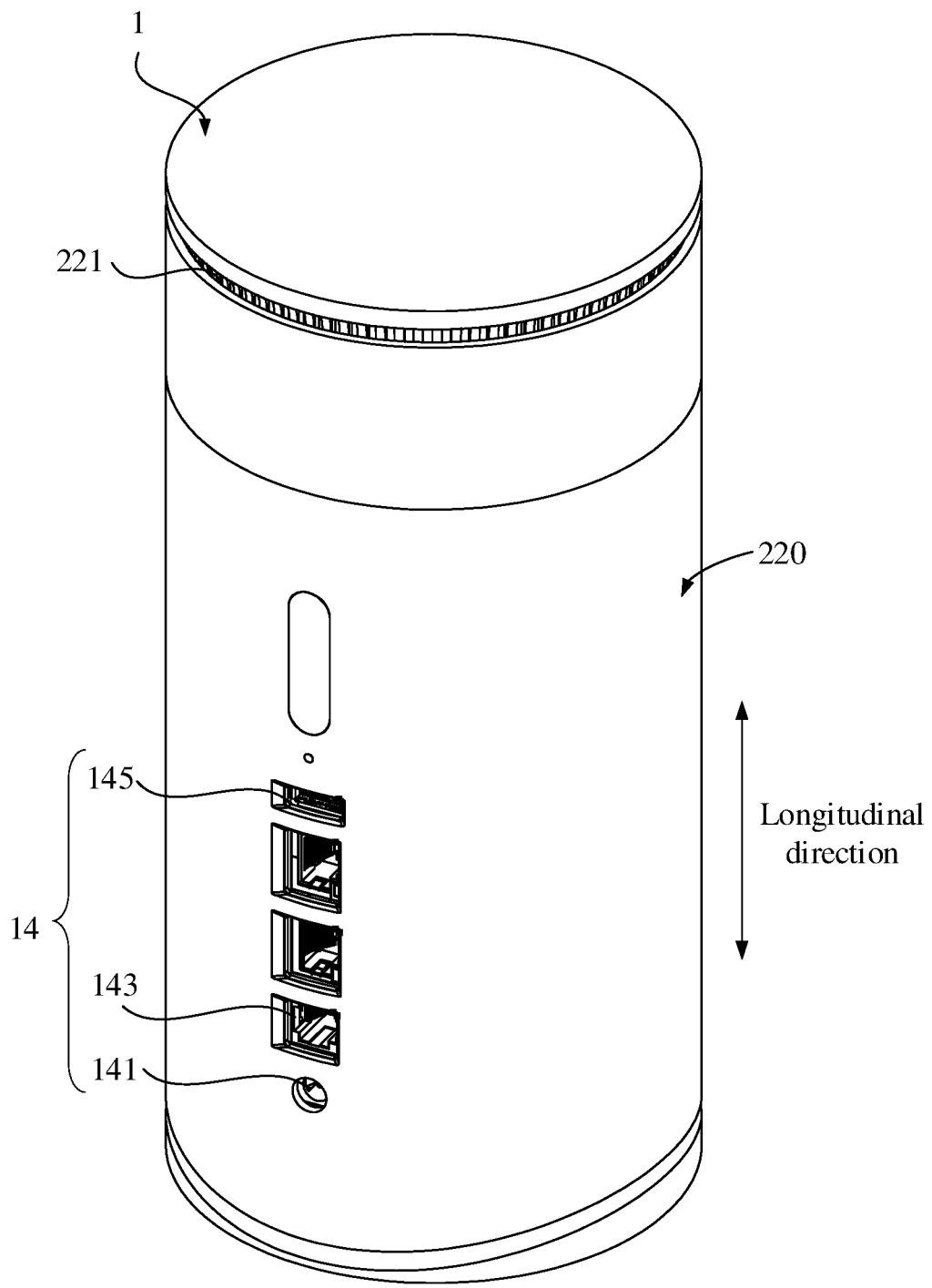
FIG. 32 is a schematic view of a user terminal equipment according to implementations.

Further, referring to FIG. 30, the user terminal equipment 1 includes a heat sink 280 and a fan 240. The heat sink 280 is made of a metal material (such as aluminum alloy) with good heat dissipation performance and is connected to the circuit board 12. The fan 240 is connected to the housing 220 and electrically coupled to the circuit board 12. The heat sink 280 has a relatively large heat dissipation surface, which is beneficial to dissipate heat generated by the circuit board 12 and electronic components disposed thereon into air quickly. In some implementations, the heat sink 280 is made of aluminum alloy. With reference to FIG. 31, the heat sink 280 includes a first supporting plate 2801 and multiple first heat dissipation fins 2803 arranged on one side of the first supporting plate 2801. The multiple first heat dissipation fins 2803 are spaced apart from each other. The first supporting plate 2801 is attached to the circuit board 12. With reference to FIG. 32, in some implementations, the housing 220 respectively define heat dissipation holes 221 on two ends thereof, the heat dissipation holes 221 are in communication with the mounting cavity. The fan 240 is disposed close to one end of the housing 220. As illustrated in FIG. 32, the heat dissipation holes 221 may be defined in end surfaces of the housing 220, or may be defined in a circumferential surface of the housing 220 and close to end portions of the housing 220. When operating, the fan 240 draws external air into the housing 220 from one end of the housing 220 and blows the air to flow through the circuit board 12 and the heat sink 280, and allows heat-carrying air to flow out from the other end of the housing 220. Further, with reference to FIG. 31, a gap defined by each two adjacent first heat dissipation fins 2803 extends in the longitudinal direction of the housing 220, so as to allow air flow blew by the fan 240 to flow through the gap between two adjacent first heat dissipation fins 2803 and then flow out from the end of the housing 220 away from the fan 240. In other implementations, the fan 240 can draw air from a side of the housing 220 where the circuit board 12 and the heat sink 280 are located, such that the heat-carrying air flows through the fan 240 and then flows out of the housing 220. Arrangements of the heat sink 280 and the fan 240 can improve heat dissipation performance of the user terminal equipment 1. Furthermore, in some implementations, the heat sink 280 includes two heat sinks 280. The two heat sinks 280 are each disposed on one of two opposite sides of the circuit board 12, such that the heat dissipation performance of the user terminal equipment 1 can be further improved.

Figure 28:
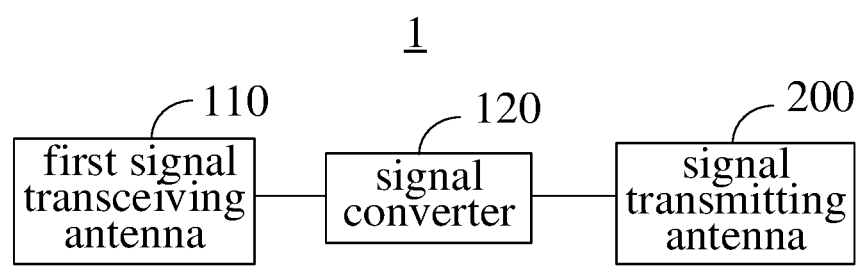
FIG. 28 is a circuit block diagram of a user terminal equipment according to implementations of the disclosure.

FIG. 28 is a circuit block diagram of the user terminal equipment 1 according to implementations of the disclosure. The user terminal equipment 1 further includes a signal transmitting antenna 200. The signal transmitting antenna 200 is electrically coupled to a signal converter 120 to radiate the second network signal. When the second network signal is a Wi-Fi signal, the signal transmitting antenna 200 is a Wi-Fi antenna.

Figure 29:
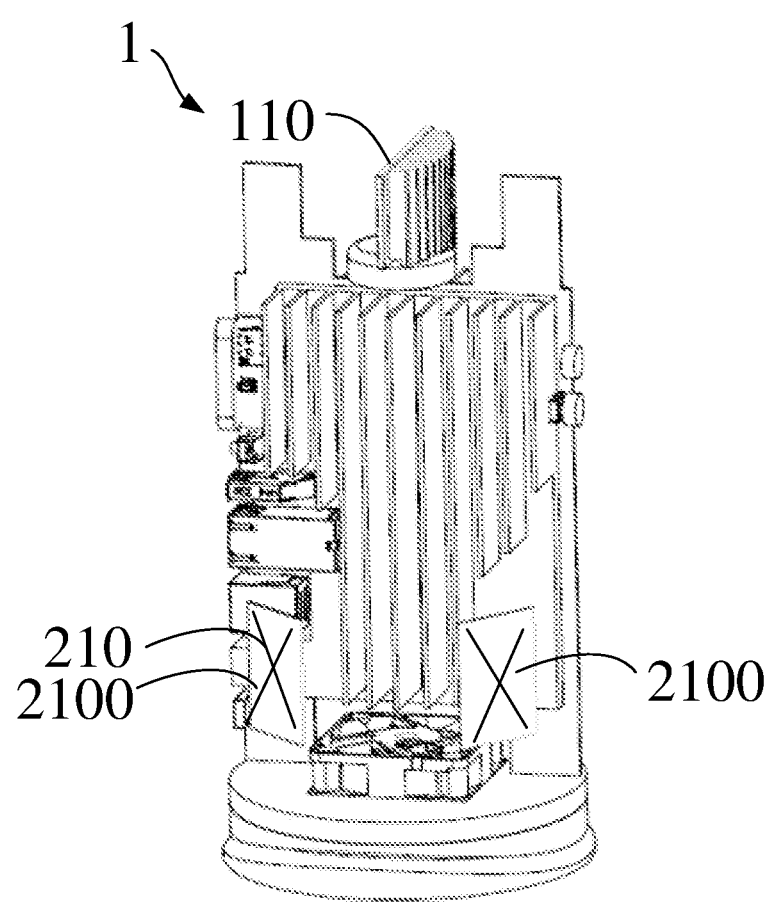
FIG. 29 is a schematic structural view of a user terminal equipment according to implementations of the disclosure.
Figure 37:
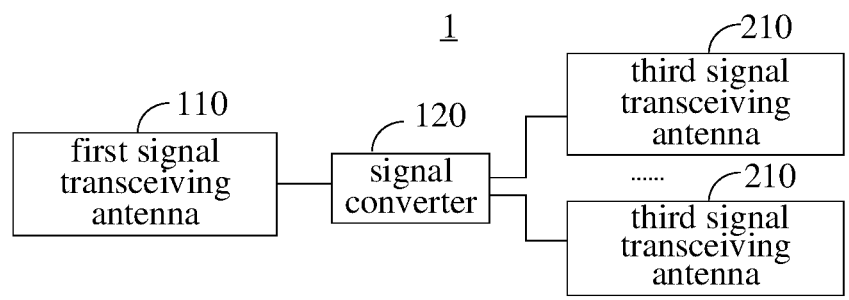
FIG. 37 is a circuit block diagram of a user terminal equipment according to implementations of the disclosure.

FIG. 29 is a schematic structural view of the user terminal equipment 1 according to implementations of the disclosure. FIG. 37 is a circuit block diagram of the user terminal equipment 1 according to implementations of the disclosure. Referring to FIG. 2, FIG. 29, and FIG. 37, in this implementation, for ease of illustration, the housing 220 of the user terminal equipment 1 is omitted. The user terminal equipment 1 further includes multiple third signal transceiving antennas 210. The multiple third signal transceiving antennas 210 are configured to receive third network signals. The signal converter 120 is also configured to convert the third network signals into fourth network signals. The first signal transceiving antenna 110 is disposed on the top of the user terminal equipment 1 relative to the third signal transceiving antennas 210. The multiple third signal transceiving antennas 210 are distributed around a periphery of the user terminal equipment 1. The user terminal equipment 1 may include, but is not limited to, eight third signal transceiving antennas 210. Optionally, two third signal transceiving antennas 210, which are disposed on the same base plate, may form an antenna group.

Due to uncertainty of the position of the base station 3 transmitting the third network signal, the transmission direction of the third network signal is uncertain. The multiple third signal transceiving antennas 210 are arranged at fixed positions and cannot be rotated. In the disclosure, the third signal transceiving antennas 210 are distributed around the periphery of the user terminal equipment 1, such that the third network signals can be detected from multiple directions, thereby improving accuracy of determining the third network signal with the strongest signal strength according to the signal strength of each of the collected third network signals.

The third signal transceiving antenna 210 may be, but not limited to, a sub-6G directional antenna. Correspondingly, the third network signal may be, but not limited to, a sub-6G signal, and the fourth network signal may be, but not limited to, a Wi-Fi signal.

Referring to FIG. 7 and FIG. 30, the RF system 1000 at least includes a 4G antenna RF module 300, a 5G antenna RF module 100, and a Wi-Fi antenna RF module 200. As an example, the 5G antenna RF module 100 may include a third signal transceiving antenna 210 and a first signal transceiving antenna 110. The third signal transceiving antenna 210 is configured to transmit and/or receive antenna signals in the sub-6 GHz frequency band. The first signal transceiving antenna 110 is configured to transmit and/or receive antenna signals in the millimeter wave frequency band. The first signal transceiving antenna 110 can provide a continuous frequency coverage with a bandwidth greater than 100 M and an extremely high data throughput, such that the user terminal equipment 1 has relatively high communication performance. Further, the third signal transceiving antenna 210 includes a RF transceiver, multiple RF front-end modules, and N antennas, where N is an integer greater than or equal to two. The N antennas may include directional antennas and/or omnidirectional antennas. The N antennas can transmit and/or receive RF signals in a preset frequency band. For example, the N antennas can be new radio (NR) directional antennas or NR omnidirectional antennas for transmitting and/or receiving 5G signals. The directional antenna refers to an antenna that has an extremely high capacity in electromagnetic wave radiation or interception in one or several specific directions, but has no or extremely low capacity in electromagnetic wave radiation or interception in other directions. The omnidirectional antenna radiates or intercepts RF electromagnetic fields equally well in all horizontal directions in a flat, two-dimensional (2D) geometric plane, and has a certain beam width in vertical directions. Generally, a smaller lobe width leads to a greater gain.

In implementations, the Wi-Fi antenna RF module 200 is serves as the signal transmitting antenna 200.

Referring to FIG. 7 and FIG. 30, in some implementations, the 4G antenna RF module 300, the Wi-Fi antenna RF module 200, and the third signal transceiving antenna 210 are arranged at intervals along the longitudinal direction of the housing 220 (that is, an axial direction in this implementation). The 4G antenna RF module 300 is further away from the fan 240 than the Wi-Fi antenna RF module 200. The first signal transceiving antenna 110 is mounted at an end of the mounting cavity away from the fan 240. The 4G antenna RF module 300, the Wi-Fi antenna RF module 200, the third signal transceiving antenna 210 can be mounted to and supported by the housing 220. Alternatively, the 4G antenna RF module 300, the Wi-Fi antenna RF module 200, and the third signal transceiving antenna 210 can also be mounted to and supported by the circuit board 12. For example, the circuit board 12 may be provided with a support frame, and the support frame is used to support the 4G antenna RF module 300, the Wi-Fi antenna RF module 200, and the third signal transceiving antenna 210. In other implementations, relative positions of the 4G antenna RF module 300, the Wi-Fi antenna RF module 200, and the third signal transceiving antenna 210 may be varied.

Furthermore, there are more than two 4G antenna RF modules 300. The more than two 4G antenna RF modules 300 are distributed at one end of the mounting cavity away from the fan 240. The 4G antenna RF modules 300 is able to provide a beam scanning range in all horizontal directions. With reference to FIG. 7 and FIG. 30, four 4G antenna RF modules 300 are provided. The centroids of the four 4G antenna RF modules 300 are approximately aligned with each other, that is, the geometric centers of the four 4G antenna RF modules 300 are approximately aligned with each other. Optionally, in at least one implementation of the disclosure, each of the four 4G antenna RF modules 300 is in a shape of rectangle, and the geometric centers of the four rectangular 4G antenna RF modules 300 are approximately aligned with each other. Of course, as an alternative, other arrangements may also be used instead of this arrangement. Furthermore, there are more than two Wi-Fi antenna RF modules 200, and the more than two Wi-Fi antenna RF modules 200 are distributed at the two opposite sides of the circuit board 12. The Wi-Fi antenna RF modules 200 is able to provide a beam scanning range in all horizontal directions. For example, in at least one implementation illustrated in FIG. 7 and FIG. 30, there are four Wi-Fi antenna RF modules 200, where two Wi-Fi antenna RF modules 200 are arranged at one side of the circuit board 12, the other two Wi-Fi antenna RF modules 200 are arranged at the other side of the circuit board 12, and the centroids of the four Wi-Fi antenna RF modules 200 are approximately aligned with each other. Furthermore, there are more than two third signal transceiving antennas 210 distributed at the two opposite sides of the circuit board 12. The third signal transceiving antennas 210 is able to provide a beam scanning range in all horizontal directions. For example, in the implementation illustrated in FIG. 7 and FIG. 30, there are four third signal transceiving antennas 210. Two third signal transceiving antennas 210 are arranged at one side of the circuit board 12, and the other two third signal transceiving antennas 210 are arranged at the other side of the circuit board 12. The centroids of the four third signal transceiving antennas 210 are approximately aligned with each other. Alternatively, the number of the Wi-Fi antenna RF modules 200 can be varied, the number of the third signal transceiving antennas 210 can be varied, and the number of the 4G antenna RF modules 300 can be varied.

Referring to FIG. 31, the user terminal equipment 1 further includes a driver 160. The driver 160 is electrically coupled to the circuit board 12. The first signal transceiving antenna 110 is mounted on the driver 160 and can be driven to rotate by the driver 160, so as to change signal transmission and reception directions of the first signal transceiving antenna 110. In some implementations, the driver 160 may be mounted to and fixedly supported by the housing 220. In other implementations, the driver 160 can be mounted on and fixedly supported by the circuit board 12. In at least one implementation, a rotation axis of the first signal transceiving antenna 110 extends in the longitudinal direction of the housing 220. The first signal transceiving antenna 110 can rotate 360-degree around the rotation axis to perform omnidirectional scanning. Furthermore, the circuit board 12 defines a cutout 121 at the end of the circuit board 12 away from the fan 240. The driver 160 extends through the cutout 121. The first signal transceiving antenna 110 is mounted on a side of the driver 160 away from the fan 240. At least part of structures of the first signal transceiving antenna 110 can be rotated to pass through the cutout 121. This structural arrangement allows an internal space of the user terminal equipment 1 to be sufficiently utilized by the circuit board 12, and compactness in arrangement of components inside the user terminal equipment 1 is improved. In other implementations, the circuit board 12 may not define the cutout 121, and the driver 160 may be disposed at the end of the circuit board 12 away from the fan 240.

Figure 33:
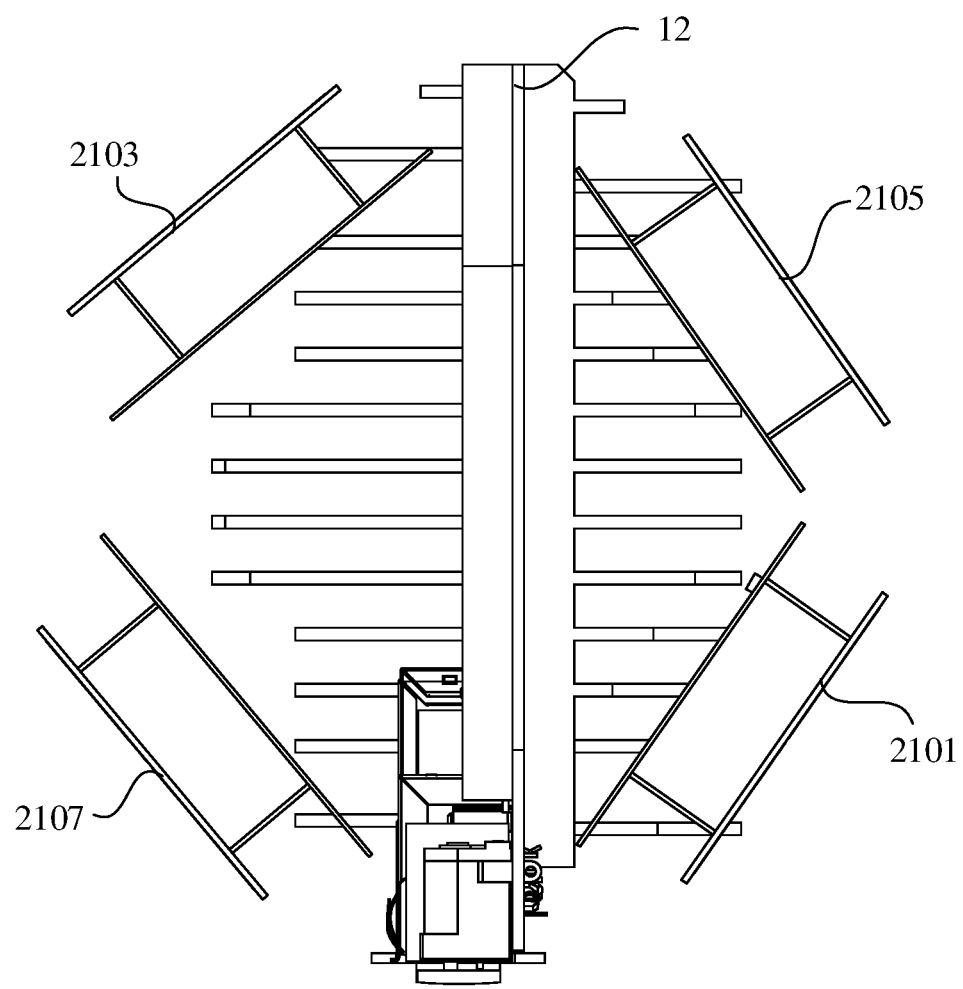
FIG. 33 is a bottom view of the user terminal equipment illustrated in FIG. 31 with some components removed.

Referring to FIG. 30 and FIG. 31, in at least one implementation, the third signal transceiving antennas 210 are mounted at one end of the mounting cavity close to the fan 240. The third signal transceiving antennas 210 include a first antenna structure 2101, a second antenna structure 2103, a third antenna structure 2105, and a fourth antenna structure 2107. Any one of the first antenna structure 2101, the second antenna structure 2103, the third antenna structure 2105, and the fourth antenna structure 2107 can be mounted to and supported by the housing 220 or the circuit board 12. With reference to FIG. 33, the first antenna structure 2101 and the third antenna structure 2105 can be spaced apart and arranged at one side of the circuit board 12, the second antenna structure 2103 and the fourth antenna structure 2107 can be spaced apart and arranged at the other side of the circuit board 12. In at least one implementation illustrated in FIG. 33, the first antenna structure 2101, the third antenna structure 2105, the second antenna structure 2103, and the fourth antenna structure 2107 are arranged sequentially in a clockwise direction. Each of the first antenna structure 2101, the second antenna structure 2103, the third antenna structure 2105, and the fourth antenna structure 2107 is provided with an antenna electrically coupled to the circuit board 12.

Furthermore, with reference to FIG. 33, in some implementations, any two adjacent ones of a signal transceiving surface of the first antenna structure 2101, a signal transceiving surface of the third antenna 2105, a signal transceiving surface of the second antenna structure 2103, and a signal transceiving surface of the fourth antenna structure 2107 define an angle therebetween. The signal transceiving surface may refer to a plane on which an outward-facing side of a radiation patch of an antenna is located, and the antenna is used to transmit and/or receive electromagnetic wave signals passing through the plane. As illustrated in FIG. 33, the signal transceiving surface of the first antenna structure 2101 and the signal transceiving surface of the third antenna 2105 define an angle therebetween, the signal transceiving surface of the third antenna 2105 and the signal transceiving surface of the second antenna structure 2103 define an angle therebetween, the signal transceiving surface of the second antenna structure 2103 and the signal transceiving surface of the fourth antenna structure 2107 define an angle therebetween, the signal transceiving surface of the fourth antenna structure 2107 and the signal transceiving surface of the first antenna structure 2101 define an angle therebetween, so as to allow the beam scanning range to achieve 360-degree omnidirectional coverage in the horizontal plane.

Figure 34:
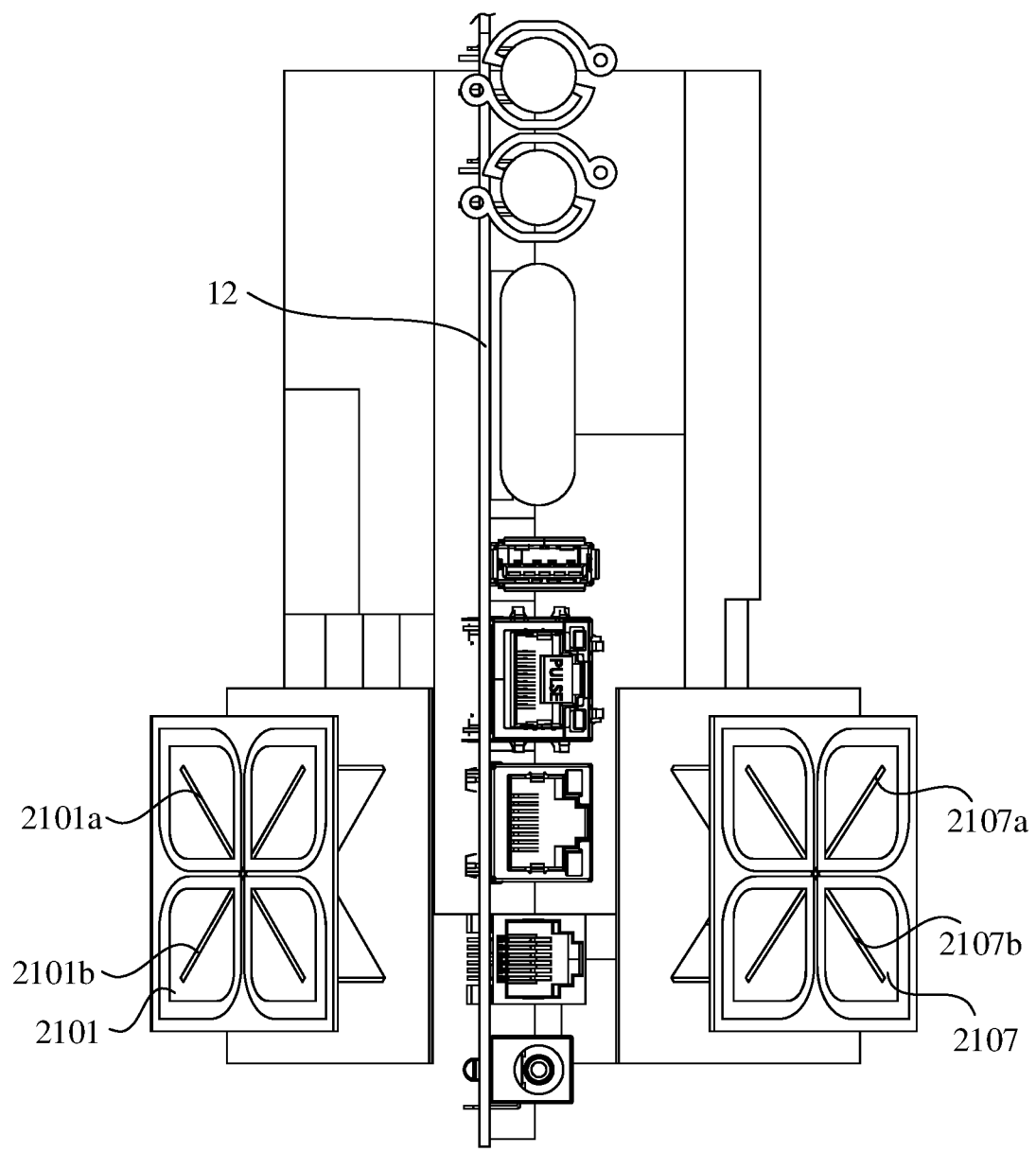
FIG. 34 is a rear view of the user terminal equipment illustrated in FIG. 33 with some components removed.
Figure 35:
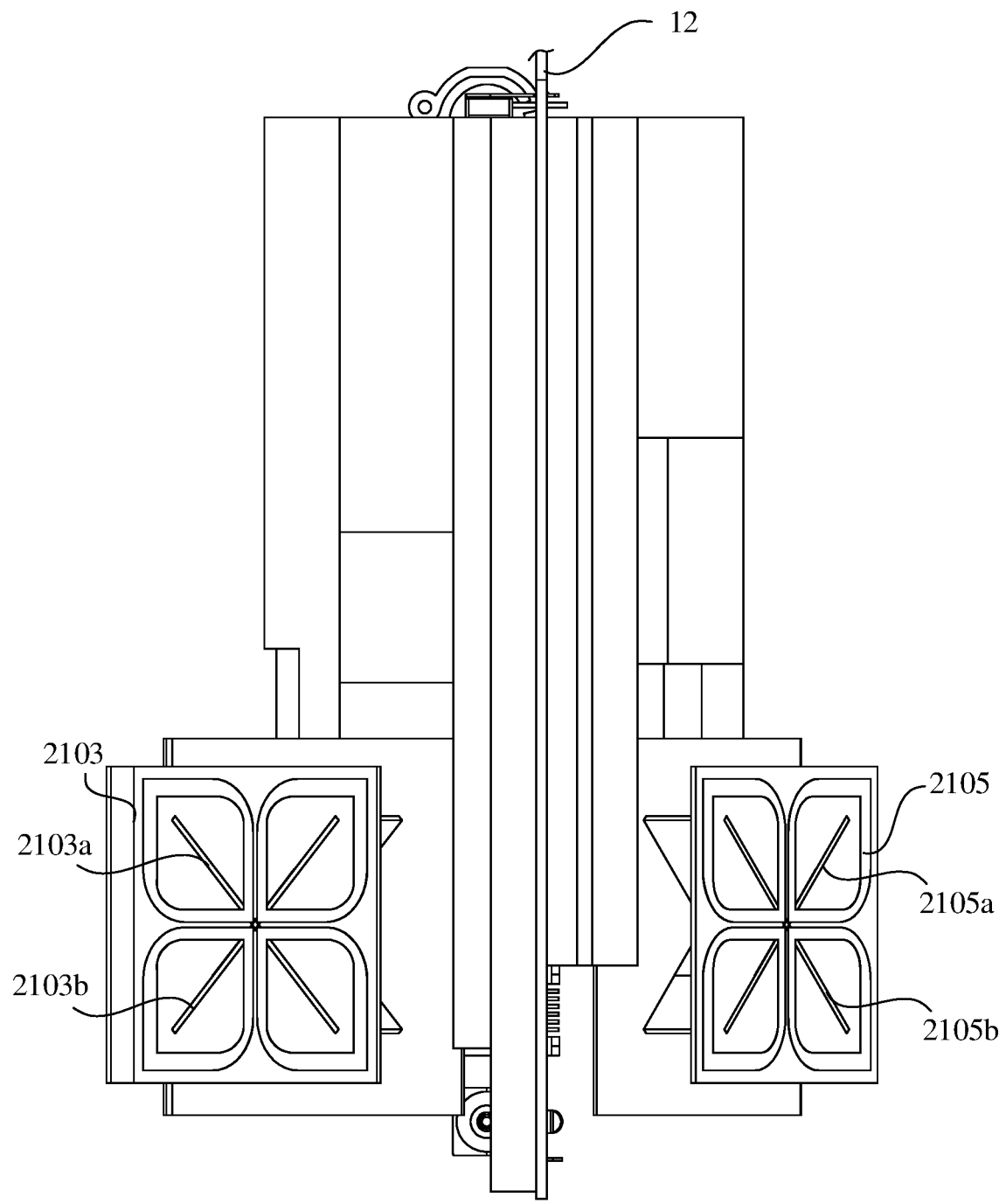
FIG. 35 is a front view of the user terminal equipment illustrated in FIG. 33 with some components removed.

Furthermore, referring to FIG. 34 and FIG. 35, the first antenna structure 2101 includes a first antenna 2101a and a sixth antenna 2101b. The second antenna structure 2103 includes a second antenna 2103a and a fifth antenna 2103b. The third antenna structure 2105 includes a third antenna 2105a and a seventh antenna 2105b. The fourth antenna structure 2107 includes a fourth antenna 2107a and an eighth antenna 2107b. As an example, the first antenna 2101a, the second antenna 2103a, the third antenna 2105a, and the fourth antenna 2107a are each a plus 45-degree polarization antenna. The fifth antenna 2103b, the sixth antenna 2101b, the seventh antenna 2105b, and the eighth antenna 2107b are each a minus 45-degree polarization antenna. The first antenna 2101a, the second antenna 2103a, the third antenna 2105a, the fourth antenna 2107a, the fifth antenna 2103b, the sixth antenna 2101b, the seventh antenna 2105b, and the eighth antenna 2107b are respectively electrically coupled to the circuit board 12.

In some implementations, the first antenna 2101a, the second antenna 2103a, the third antenna 2105a, the fourth antenna 2107a, the fifth antenna 2103b, the sixth antenna 2101b, the seventh antenna 2105b, and the eighth antenna 2107b are each an omnidirectional antenna. In other implementations, the first antenna 2101a, the second antenna 2103a, the third antenna 2105a, the fourth antenna 2107a, the fifth antenna 2103b, the sixth antenna 2101b, the seventh antenna 2105b, and the eighth antenna 2107b are each a directional antenna. Alternatively, the first antenna 2101a, the second antenna 2103a, the third antenna 2105a, the fourth antenna 2107a, the fifth antenna 2103b, the sixth antenna 2101b, the seventh antenna 2105b, and the eighth antenna 2107b may be combination of a directional antenna(s) and an omnidirectional antenna(s), for example, at least one of which is a directional antenna, and the others are omnidirectional antennas.

Figure 36:
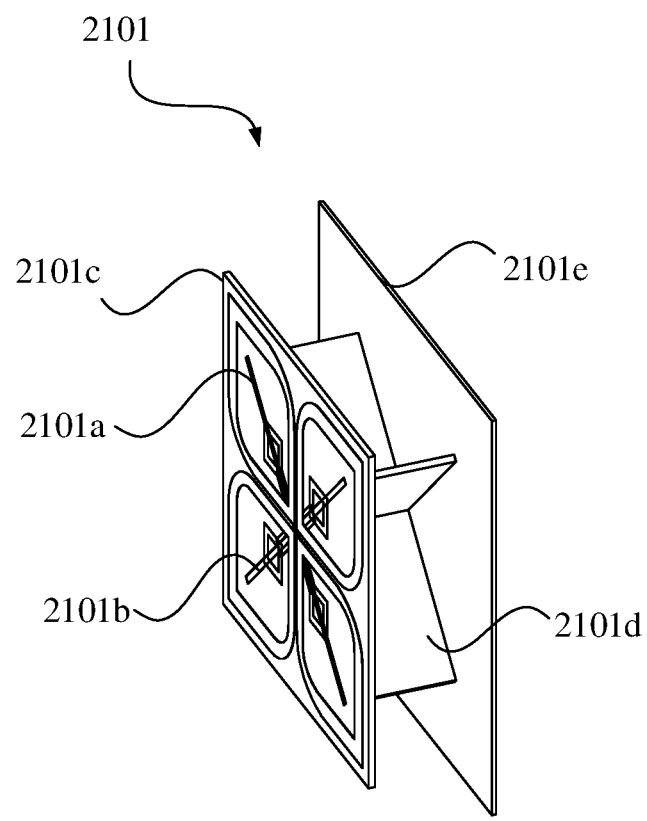
FIG. 36 is a schematic view of a first antenna structure of the user terminal equipment illustrated in FIG. 34.

In an example, referring to FIG. 36, the first antenna structure 2101 is described as an example. The first antenna structure 2101 includes a panel 2101c, a supporting portion 2101d, and a reflecting plate 2101e. Each of the panel 2101c and the reflecting plate 2101e is in a plate shape. The panel 2101c is spaced apart from and in parallel with the reflecting plate 2101e. The supporting portion 2101d is connected between the panel 2101c and the reflecting plate 2101e. The panel 2101c is disposed on one side of the reflecting plate 2101e away from the circuit board 12. Any one of the panel 2101c, the supporting portion 2101d, and the reflecting plate 2101e can be mounted and fixed to the housing 220 or the circuit board 12, which will not be repeated herein. There are two supporting portions 2101d which are each in a plate shape. The first antenna 2101a and the sixth antenna 2101b are disposed on the panel 2101c and are isolated from each other.

A projection of the first antenna 2101a on the reflecting plate 2101e extends in a longitudinal direction of one of the supporting portions 2101d. A projection of the sixth antenna 2101b on the reflecting plate 2101e extends in a longitudinal direction of the other of the supporting portions 2101d. The reflecting plate 2101e is made of metal such as aluminum alloy. The reflecting plate 2101e can reflect electromagnetic waves to increase gains of the first antenna 2101a and the sixth antenna 2101b. A greater distance between the panel 2101c and the reflecting plate 2101e corresponds to a greater bandwidth and a wider low frequency band of the antenna. The first antenna 2101a and the sixth antenna 2101b may each be a NR directional antenna (for example, an electromagnetic dipole antenna) or a NR omnidirectional antenna. Each of the second antenna structure 2103, the third antenna structure 2105, and the fourth antenna structure 2107 is similar to the first antenna structure 2101, which will not be repeated herein. In some implementations, the supporting portion 2101d is made of resin. The supporting portion 2101d can be welded with a feed point and allow the feed point to electrically couple with the first antenna 2101a and the sixth antenna 2101b. The feed point is used for feeding currents into the first antenna 2101a and the sixth antenna 2101b, which facilitates electrical couples of the first antenna 2101a and the sixth antenna 2101b to the circuit board 12. In other implementations, the supporting portion 2101d may be made of other materials such as plastic, and it is unnecessary to dispose the feed point on the supporting portion 2101d.

Further, in some implementations, the first antenna structure 2101 and the fourth antenna structure 2107 can be arranged asymmetrically at the two opposite sides of the circuit board 12. The third antenna structure 2105 and the second antenna structure 2103 can be arranged asymmetrically at the two opposite sides of the circuit board 12. A distance between the panel 2101c and the reflecting plate 2101e of the first antenna structure 2101 may be equal to a distance between the panel 2101c and the reflecting plate 2101e of the third antenna structure 2105. A distance between the panel 2101c of the second antenna structure 2103 and the reflecting plate 2101e may be equal to a distance between the panel 2101c of the fourth antenna structure 2107 and the reflecting plate 2101e. The distance between the panel 2101c and the reflecting plate 2101e of the first antenna structure 2101 may be less than the distance between the panel 2101c and the reflecting plate 2101e of the fourth antenna structure 2107. As an example, in the user terminal equipment 1 with this structural configuration, the second antenna 2103a, the fourth antenna 2107a, the fifth antenna 2103b, and the eighth antenna 2107b can support bands n41, n77, n78, n79, and B46, that is, can support a frequency coverage of 2.496 GHz-6 GHz. The first antenna 2101a, the third antenna 2105a, the sixth antenna 2101b, and the seventh antenna 2105b can support bands n77, n78, n79, and B46, that is, can support a frequency coverage of 3.3 GHz-6 GHz. In other implementations, the first antenna structure 2101, the second antenna structure 2103, the third antenna structure 2105, and the fourth antenna structure 2107 may be the same in structure. The first antenna structure 2101 and the fourth antenna structure 2107 may be symmetrically arranged at the two opposite sides of the circuit board 12. The third antenna structure 2105 and the second antenna structure 2103 may be symmetrically arranged at the two opposite sides of the circuit board 12.

Further, referring to FIG. 15 and FIG. 16, the first signal transceiving antenna 110 includes a circuit board 1101 and a millimeter wave antenna 1105 electrically connected to one side of the circuit board 1101. The first signal transceiving antenna 110 further includes a heat sink 190 connected to the other side of the circuit board 1101 away from the millimeter wave antenna 1105. The heat sink 190 may be made of aluminum alloy and include a heat dissipation body 192 and multiple fins 191 spaced apart. The heat dissipation body 192 is attached to the circuit board 1101. The multiple fins 191 are disposed on a side of the heat dissipation body 192 away from the circuit board 1101. A gap defined by each two adjacent fins 191 extends in the longitudinal direction of the housing 220, such that the air flow drawn by the fan 240 can flow through the gap between the two adjacent fins 191, and then flow out from the end of the housing 220 away from the fan 240. The heat sink 190 can improve heat dissipation performance of the first signal transceiving antenna 110, thereby improving the heat dissipation performance of the user terminal equipment 1.

The user terminal equipment 1 further includes the housing 220. The multiple third signal transceiving antenna 210 are distributed around the periphery of the user terminal equipment 1, which means, but is not limited to, that the multiple third signal transceiving antennas 210 are directly or indirectly attached to the housing 220. Alternatively, the third signal transceiving antennas 210 are arranged inside the housing 220 of the user terminal equipment 1, and the third signal transceiving antennas 210 are not in contact with the housing 220.

The housing 220 may be in a shape of a multi-surface cylindrical cylinder or a cylindrical cylinder, which are not limited herein. The first signal transceiving antenna 110, the signal converter 120, the processor 130, the multiple third signal transceiving antennas 210, and other components may all be received in the receiving space defined by the housing 220. The housing 220 may be made of, but is not limited to, an insulating material such as plastic.

In at least one implementation, the signal converter 120 is configured to convert one or more third network signals with the strongest signal strengths among the third network signals received by the multiple third signal transceiving antennas 210 into one or more fourth network signals.

For example, there are M third signal transceiving antennas 210. The signal converter 120 is configured to select one signal transceiving antenna 210 or N third signal transceiving antennas 210 from the M third signal transceiving antennas 210 according to the signal strength of each third network signal received by the M third signal transceiving antennas 210. When one signal transceiving antenna 210 is selected, the signal strength of the third network signal received by the third signal transceiving antenna 210 selected is greater than the signal strength of the third network signal individually received by each of the other third signal transceiving antennas 210. When N third signal transceiving antennas 210 are selected, the sum of signal strength of the N third signal transceiving antennas 210 selected is greater than a sum of signal strength of the third network signals received by any other N third signal transceiving antennas 210 in the M third signal transceiving antennas 210, where both M and N are positive integers. For example, M=8, N=4, but it can also be any other value.

Figure 38:
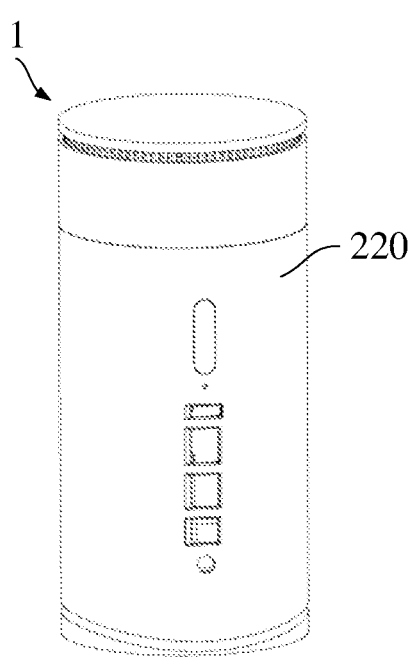
FIG. 38 is a schematic structural view of a user terminal equipment according to implementations of the disclosure.
Figure 39:
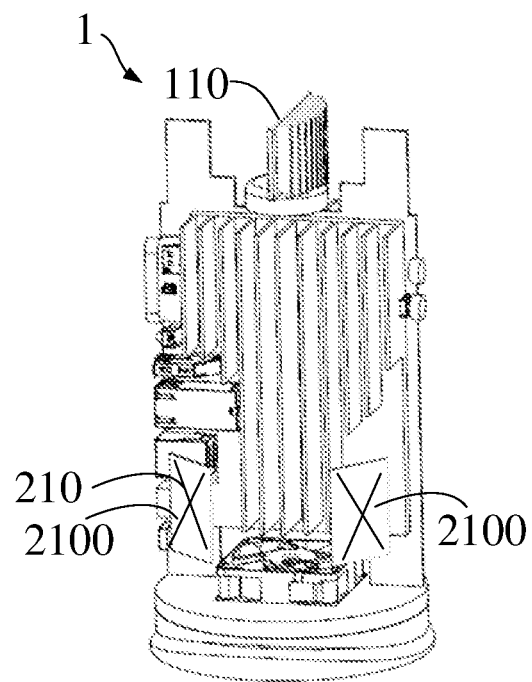
FIG. 39 is a schematic structural view of the user terminal equipment illustrated in FIG. 38 with a housing removed.
Figure 40:
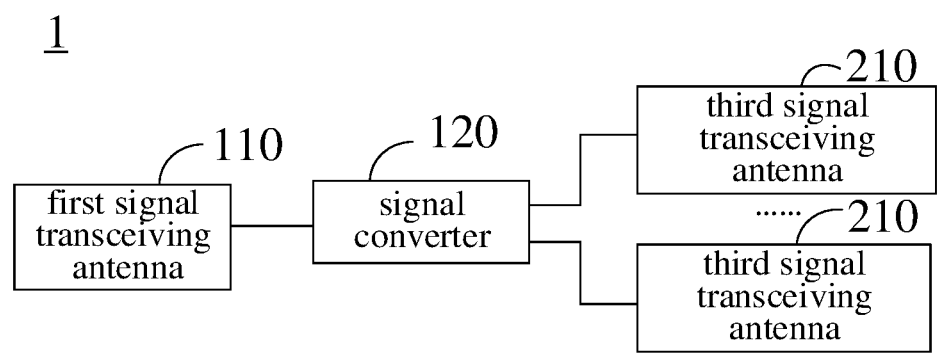
FIG. 40 is a circuit block diagram of a user terminal equipment according to implementations of the disclosure.

FIG. 38 is a schematic structural view of the user terminal equipment 1 according to implementations of the disclosure. FIG. 39 is a schematic structural view of the user terminal equipment 1 illustrated in FIG. 38 with the housing 220 removed. FIG. 40 is a circuit block diagram of the user terminal equipment 1 according to another implementation of the disclosure. The user terminal equipment 1 includes the housing 220, the first signal transceiving antenna 110, the multiple third signal transceiving antennas 210, and the signal converter 120. The housing 220 define the receiving space. The first signal transceiving antenna 110, the multiple third signal transceiving antennas 210, and the signal converter 120 are all accommodated in the accommodation space. The first signal transceiving antenna 110 is rotatable relative to the housing 220, so as to receive the first network signals from different directions. When the first signal transceiving antenna 110 faces a direction in which the first network signal has the strongest signal strength, the signal converter 120 is configured to convert the first network signal into the second network signal. The multiple third signal transceiving antennas 210 are fixed relative to the housing 220. The signal converter 120 is configured to convert one or more third network signals with the strongest signal strengths received by one or more third signal transceiving antennas 210 among the multiple third signal transceiving antennas 210 into one or more fourth network signals.

For the first signal transceiving antenna 110, the third signal transceiving antenna 210, the first network signal, the second network signal, the third network signal, and the fourth network signal, reference can be made to the foregoing description, which will not be repeated herein.

In at least one implementation, referring to FIG. 4, FIG. 22, and other related drawings, the user terminal equipment 1 further includes the base 140, the holder 150, the driver 160, and the processor 130. The base 140 is fixed to the housing 220. The holder 150 is rotatably connected to the base 140. The holder 150 is used to carry the first signal transceiving antenna 110. The driver 160 is configured to drive the holder 150 to move under control of the processor 130. For a structure of the driver 160, reference can be made to the forgoing description, which will not be repeated herein.

The user terminal equipment 1 includes the first signal transceiving antenna 110, the holder 150, the base 140, and the signal converter 120. The first signal transceiving antenna 110 is carried on the holder 150. The holder 150 is rotatably connected to the base 140. When the user terminal equipment 1 is in operation, the first signal transceiving antenna 110 is at a preset position relative to the base 140. When the first signal transceiving antenna 110 is at the preset position relative to the base 140, the signal strength of the first network signal received by the first signal transceiving antenna 110 at the preset position is greater than the signal strength of the first network signal received by the first signal transceiving antenna 110 at any other position, and the signal converter 120 is configured to convert the first network signal with the strongest signal strength received by the first signal transceiving antenna 110 into the second network signal.

For the first signal transceiving antenna 110, the holder 150, the base 140, the signal converter 120, the first network signal, and the second network signal, reference can be made to the forgoing description, which will not be repeated herein. In at least one implementation, the user terminal equipment 1 further includes the driver 160 and the processor 130. When the first signal transceiving antenna 110 receives a test instruction, the processor 130 controls the driver 160 to drive the holder 150 to rotate at least one revolution relative to the base 140, so as to acquire the signal strength of each of the first network signals from various directions. The processor 130 is configured to determine the direction in which the first network signal has the strongest signal strength according to the signal strength of each of the first network signals which are received from various directions, and in turn to control the driver 160 to drive the holder 150 to rotate to the direction in which the first network has the strongest signal strength.

The user terminal equipment 1 is operable in a test state and an operating state. Before entering the operating state, the user terminal equipment 1 is tested in the test state. When the user terminal equipment 1 is in the test state, the first signal transceiving antenna 110 of the user terminal equipment 1 receives test signals and determines the direction in which the first network signal has the strongest signal strength. The user terminal equipment 1 enters the operating state after the direction in which the first network signal has the strongest signal strength is determined by the user terminal equipment 1 in the test state. In other words, when the user terminal equipment 1 is in the operating state, the first signal transceiving antenna 110 is at the preset position relative to the base 140. The signal strength of the first network signal received by the first signal transceiving antenna 110 at the preset position is greater than the signal strength of the first network signal received by the first signal transceiving antenna 110 at any other position relative to the base 140.

In at least one implementation, the user terminal equipment 1 further includes the driver 160 and the processor 130. The first signal transceiving antenna 110 receives a test instruction when the first signal transceiving antenna 110 is in the test state, the processor 130 controls the driver 160 to drive the holder 150 to rotate at least one revolution relative to the base 140, so as to acquire the signal strength of each of the first network signals from various directions. The processor 130 is configured to determine a direction in which the first network signal has the strongest signal strength according to the signal strength of each of the first network signals received from various directions, and in turn to control the driver 160 to drive the holder 150 to rotate to the direction in which the first network signal has the strongest signal strength.

In at least one implementation, the user terminal equipment 1 has the test state and the operating state. Before entering the operating state, the user terminal equipment 1 is tested in the test state. The user terminal equipment 1 further includes a memory 230. The memory 230 stores a look-up table. The look-up table includes a correspondence between positions of the user terminal equipment 1 and corresponding directions in which the first network signals have the strongest signal strengths. When the user terminal equipment 1 is in the test state, the first signal transceiving antenna 110 receives the test instruction, the processor 130 compares a current position of the user terminal equipment 1 with positions in the look-up table. When the current position of the user terminal equipment 1 matches a position of the user terminal equipment 1 in the look-up table, the processor 130 controls the driver 160 to operate according to the look-up table, so as to drive the first signal transceiving antenna 110 to be in a direction that matches the position and in which the first network signal has the strongest signal strength.

Figures 41, 42:
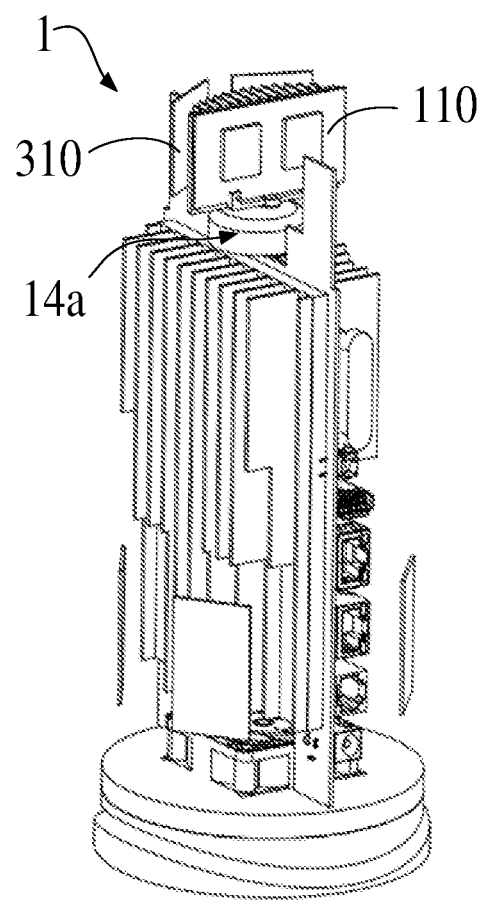
FIG. 41 is a look-up table between positions of a user terminal equipment and directions in which first network signals received by the user terminal equipment have the strongest signal strength.
FIG. 42 is a schematic structural view of a user terminal equipment from a perspective with a housing removed according to implementations of the disclosure.

FIG. 41 is the look-up table between the positions of the user terminal equipment 1 and corresponding directions in which the first network signals have the strongest signal strengths. In the look-up table, the positions of the user terminal equipment 1 are respectively represented by L1, L2, L3, . . . , Ln. When the user terminal equipment 1 is located at position L1, a corresponding direction in which the first network signal has the strongest signal strength is direction P1, when the user terminal equipment 1 is located at position L2, a corresponding direction in which the first network signal has the strongest signal strength is direction P2, when the position of the user terminal equipment 1 is located at position L3, a corresponding direction in which the first network signal has the strongest signal strength is direction P3, . . . , and when the position of the user terminal equipment 1 is located at position Ln, a corresponding direction in which the first network signal has the strongest signal strength is direction Pn. When the user terminal equipment 1 is in the test state, the current position of the user terminal equipment 1 is position Lx. When the current position Lx of the user terminal equipment 1 matches position L3 in the look-up table but the first signal transceiving antenna 110 is not in direction P3 corresponding to position L3, the processor 130 directly controls the driver 160 to drive the holder 150 to move to drive the first signal transceiving antenna 110 to direction P3. When the current position Lx of the user terminal equipment 1 matches position L3 in the look-up table and the first signal transceiving antenna 110 is in direction P3 corresponding to position L3, the processor 130 does not need to drive the driver 160 to rotate.

The user terminal equipment 1 provided according to this implementation can control operations of the driver 160 according to the current position of the user terminal equipment 1 and the look-up table, such that the first signal transceiving antenna 110 can be driven to rotate quickly to align with the direction in which the first network signal has the strongest signal strength.

Figure 43:
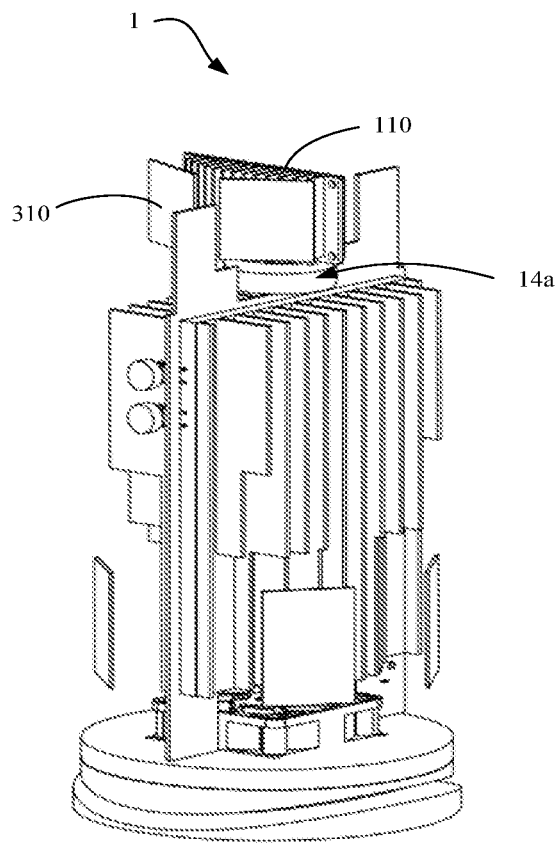
FIG. 43 is a schematic structural view of a user terminal equipment from another perspective with a housing removed according to implementations of the disclosure.

FIG. 42 is a schematic structural view of the user terminal equipment 1 from a perspective with the housing 220 removed according to implementations of the disclosure. FIG. 43 is a schematic structural view of the user terminal equipment 1 from another perspective with the housing 220 removed according to implementations of the disclosure. The user terminal equipment 1 in this implementation includes the first signal transceiving antenna 110, K second signal transceiving antennas 310, and the rotating assembly 14a. The first signal transceiving antenna 110 and the K second signal transceiving antennas 310 are disposed on the rotating assembly 14a and configured to be driven to rotate by the rotating assembly 14a, where K is a positive integer. The first signal transceiving antenna 110 is operable in a first frequency band. The K second signal transceiving antennas 310 are operable in a second frequency band. The first frequency band is different from the second frequency band.

The first signal transceiving antenna 110 may be, but is not limited to, a transceiving antenna for millimeter wave signal or terahertz signal. The second signal transceiving antenna 310 may be, but is not limited to, a sub-6G directional antenna. Correspondingly, when the first signal transceiving antenna 110 is a transceiving antenna for millimeter wave signal, the first frequency band is a millimeter wave frequency band. When the second signal transceiving antenna 310 is a sub-6G directional antenna, the second frequency band is a sub-6G frequency band.

It is noted that there are one or more second signal transceiving antennas 310. In other words, K is a positive integer greater than or equal to one. Optionally, when K is a positive integer greater than 1, K is even. For example, K can be, but is not limited to, four. At this point, the second signal transceiving antenna 310 may serve as a K*K multiple input multiple output (MIMO) antenna.

Figure 44:
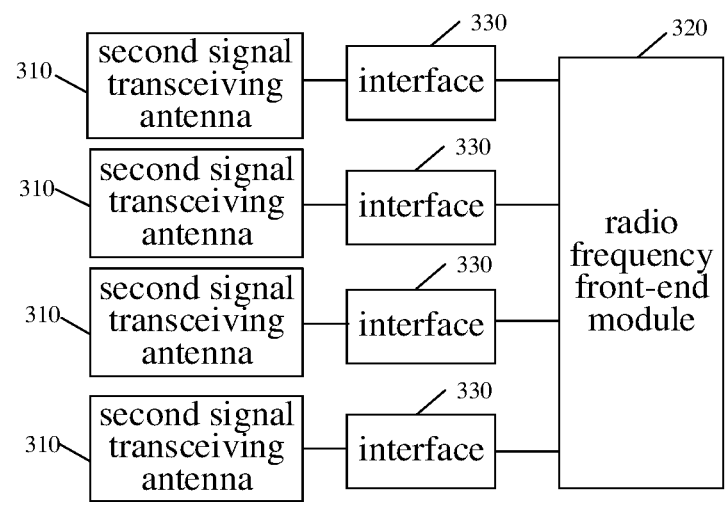
FIG. 44 is a circuit block diagram of a user terminal equipment according to at least one implementation of the disclosure.

FIG. 44 is a circuit block diagram of the user terminal equipment 1 according to implementations of the disclosure. The user terminal equipment 1 further includes a RF front-end module 320. Each of the multiple second signal transceiving antennas 310 is electrically coupled with the RF front-end module 320 via a different respective one of the multiple interfaces 330. K is even, so as to form K*K MIMO antennas. In this implementation, for example, four second signal transceiving antennas 310 are used.

For the user terminal equipment 1 located at a certain position, due to uncertainty of a position of a base station, a transmission direction of a network signal transmitted from the base station is uncertain, and thus the first network signals from various directions received by the first signal transceiving antenna 110 have different signal strengths. In this implementation, the first signal transceiving antenna 110 in the user terminal equipment 1 is rotatable, and K second signal transceiving antennas 310 are also rotatable, thereby improving communication quality of the user terminal equipment 1 through the first signal transceiving antenna 110 and the K second signal transceiving antennas 310.

In at least one implementation, referring to FIG. 9 and related descriptions, the user terminal equipment 1 further includes the base 140, the holder 150, and the driver 160. The rotating assembly 14a includes the base 140, the holder 150 rotatably connected with the base 140, and the driver 160. The driver 160 is configured to receive a control signal and drive the holder 150 to rotate relative to the base 140 under control of the control signal. The first signal transceiving antenna 110 and the K second signal transceiving antennas 310 are connected to the holder 150. The first signal transceiving antenna 110 is spaced apart from the K second signal transceiving antennas 310.

Generally, the base 140 is fixed (i.e., stationary). For example, the base 140 may be directly or indirectly fixed to the housing 220 of the user terminal equipment 1 (see FIG. 2). The holder 150 is rotatably connected with the base 140. Both the first signal transceiving antenna 110 and the K second signal transceiving antennas 310 are connected to the holder 150. When the driver 160 drives the holder 150 to rotate relative to the base 140 under control of the control signal, the holder 150 drives the first signal transceiving antenna 110 and the K second signal transceiving antennas 310 to rotate, such that the first signal transceiving antenna 110 and the K second signal transceiving antennas 310 can be rotated at the same time. The driver 160 may include, but is not limited to, a motor. The base 140 forms a case, and the driver 160 is disposed in the case formed by the base 140. For the structure of the driver 160, reference can be made to the foregoing description, which will not be repeated herein.

Figure 45:
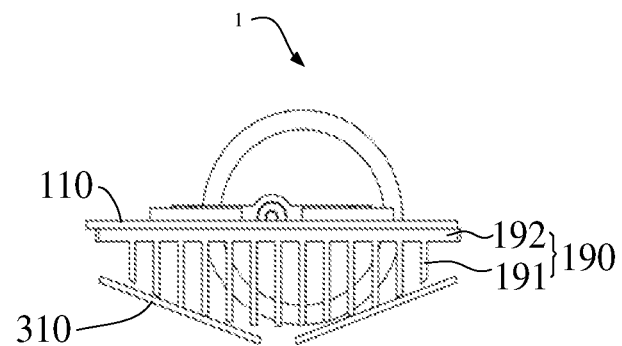
FIG. 45 is a schematic structural view of some components in a user terminal equipment according to at least one implementation of the disclosure.

In at least one implementation, FIG. 45 is a schematic structural view of some components in the user terminal equipment 1 according to at least one implementation of the disclosure. The user terminal equipment 1 further includes the heat sink 190. The heat sink 190 can be integrated into the user terminal equipment 1 according to any of the above identified implementations. The heat sink 190 is disposed on one side of the first signal transceiving antenna 110. The K second signal transceiving antennas 310 are disposed on a side of the heat sink 190 away from the first signal transceiving antenna 110.

The heat sink 190 may be made of, but not limited to, a metal with good thermal conductivity. The heat sink 190 is used for heat dissipation when the first signal transceiving antenna 110 and the second signal transceiving antenna 310 are in operation, so as to avoid unstable performance of the first signal transceiving antenna 110 due to overheating of the first signal transceiving antenna 110 and at least one second signal transceiving antenna 310 during their operation.

The heat sink 190 disposed on one side of the first signal transceiving antenna 110 means that the heat sink 190 is directly or indirectly disposed on the first signal transceiving antenna 110. The K second signal transceiving antennas 310 disposed on one side of the heat sink 190 away from the first signal transceiving antenna 110 means that, the K second signal transceiving antennas 310 are directly or indirectly disposed on one side of the heat sink 190 away from the first signal transceiving antenna 110. It is noted that, the heat sink 190 can be directly or indirectly fixed to the holder 150 and rotate with a rotation of the holder 150.

Further, the heat sink 190 includes the heat dissipation body 192 and the multiple fins 191. The heat dissipation body 192 is disposed on the one side of the first signal transceiving antenna 110. The multiple fins 191 are arranged apart from each other on the surface of the heat dissipation body 192 away from the first signal transceiving antenna 110. In a direction away from the heat dissipation body 192, one of the multiple fins 191 close to the rotating shaft of the first signal transceiving antenna 110 has a size greater than another one of the multiple fins 191 away from the rotating shaft. The K second signal transceiving antennas 310 are fixed on a side of the fins 191 away from the heat dissipation body 192.

Since the heat sink 190 needs to rotate in the housing 220 of the user terminal equipment 1, a gap is defined between the heat sink 190 and the housing 220 of the user terminal equipment 1, which facilitates heat dissipation of fins of the heat sink 190 away from the rotating shaft. According to the disclosure, in the direction away from the heat dissipation body 192, one of the fins 191 of the heat sink 190 close to the rotating shaft has a size greater than another one of the fins 191 of the heat sink 190 away from the rotating shaft, such that heat dissipation uniformity of each part of the heat sink 190 can be improved. Further, such structure design of the fins 191 can prevent the first signal transceiving antenna 110 and the second signal transceiving antenna 310 from colliding with other components in the user terminal equipment 1 during rotation.

Figure 46:
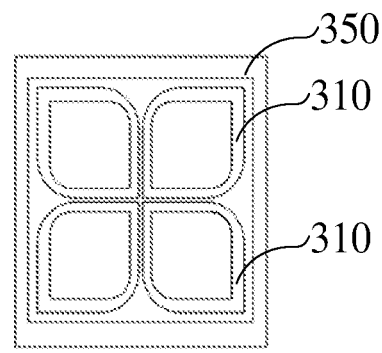
FIG. 46 is a schematic view illustrating two second signal transceiving antennas carried on the same base plate in a user terminal equipment according to at least one implementation of the disclosure.

In at least one implementation, FIG. 46 is a schematic view of two second signal transceiving antennas 310 carried on the same base plate 350 in the user terminal equipment 1 according to at least one implementation of the disclosure. The user terminal equipment 1 includes one or more base plates 350. The one or more base plates 350 are used to carry the second signal transceiving antennas 310. In this implementation, there are two base plates 350. The two base plates 350 are arranged around the periphery of the user terminal equipment 1. In this implementation, an example in which each of two second signal transceiving antennas 310 carried on the same base plate 350 is in a butterfly shape is described. The two second signal transceiving antennas 310 carried on the same base plate 350 are arranged at diagonals of the base plate 350. It is noted that, in other implementations, each of the two second signal transceiving antennas 310 may also have other shapes, and the two second signal transceiving antennas 310 carried on the same base plate 350 may also be arranged at any other position of the base plate 350 besides the diagonals.

In this implementation, for illustrative purpose, the user terminal equipment 1 includes two antenna groups 310a. It is noted that, in other implementations, the user terminal equipment 1 may include one more base plates 350.

In at least one implementation, the base plates 350 are bonded to the fins 191 via adhesives. In this implementation, when the base plates 350 are bonded to the fins 191 via the adhesives, each base plate 350 can be flexibly positioned.

Figure 47:
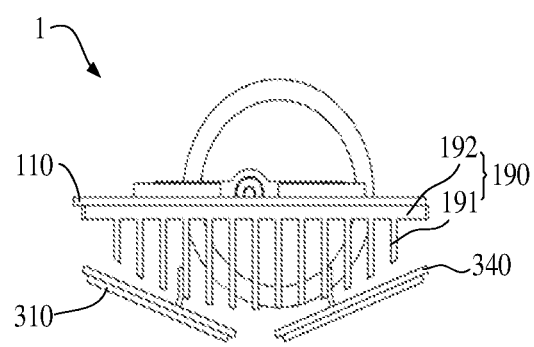
FIG. 47 is a schematic structural view of some components in a user terminal equipment according to at least one implementation of the disclosure.
Figure 48:
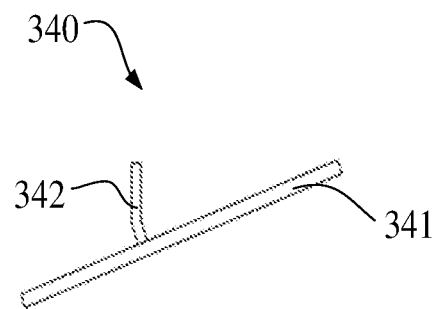
FIG. 48 is a schematic structural view of a carrying part in a user terminal equipment according to the disclosure.

In at least one implementation, FIG. 47 is a schematic structural view of some components in the user terminal equipment 1 according to at least one implementation of the disclosure. FIG. 48 is a schematic structural view of a carrying part 340 in the user terminal equipment 1 according to the disclosure. The user terminal equipment 1 further includes multiple carrying parts 340. Each carrying part 340 includes a carrying body 341 and a fixing portion 342. The multiple base plates 350 are carried by the multiple carrying parts 340. The fixing portion 342 is connected with the carrying body 341 and fixed to the fin 191.

The fixing portion 342 is fixed to the fin 191 via, but not limited to, the adhesive. Alternatively, the fixing portion 342 is fixed to the fin 191 via a screw, or the like.

Figure 49:
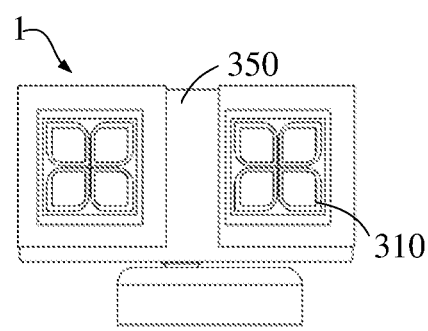
FIG. 49 is a schematic structural view of some components in a user terminal equipment according to at least one implementation of the disclosure.
Figure 50:
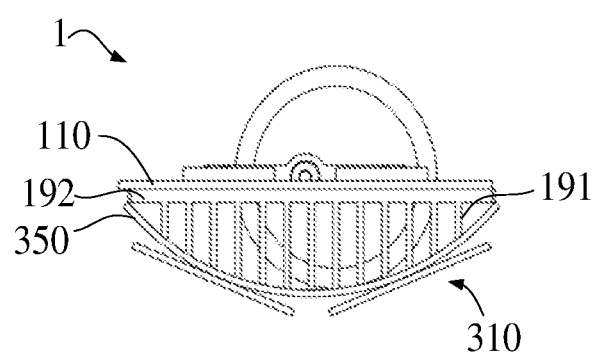
FIG. 50 is a schematic view of the components illustrated in FIG. 49 from another perspective according to at least one implementation of the disclosure.

In at least one implementation, FIG. 49 is a schematic structural view of some components in the user terminal equipment 1 according to at least one implementation of the disclosure. FIG. 50 is a schematic view of the components illustrated in FIG. 49 from another perspective according to at least one implementation of the disclosure. The user terminal equipment 1 further includes the base plate 350. The K second signal transceiving antennas 310 are carried by the base plate 350 and the base plate 350 is fixed to the fins 191.

In this implementation, all of the K second signal transceiving antennas 310 are carried on the same base plate 350. All of the K second signal transceiving antennas 310 can be fixed via one base plate 350, such that the K second signal transceiving antennas 310 can be installed conveniently.

Figure 51:
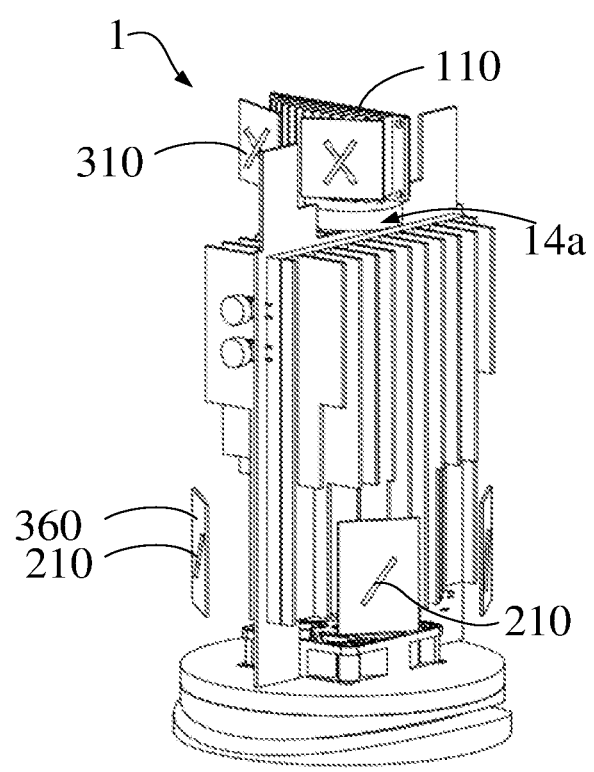
FIG. 51 is a schematic structural view of a user terminal equipment according to implementations of the disclosure.
Figure 52:
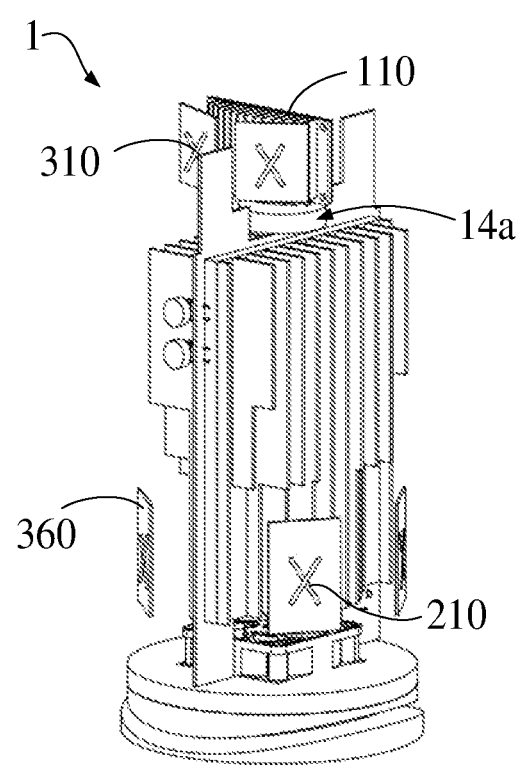
FIG. 52 is a schematic structural view of a user terminal equipment according to implementations of the disclosure.

FIG. 51 is a schematic structural view of the user terminal equipment 1 according to at least one implementation of the disclosure. FIG. 52 is a schematic structural view of the user terminal equipment 1 according to implementations of the disclosure. The user terminal equipment 1 further includes L third signal transceiving antennas 210. The L third signal transceiving antennas 210 are distributed around the periphery of the user terminal equipment 1. The first signal transceiving antenna 110 is disposed on a top of the user terminal equipment 1 relative to the L third signal transceiving antennas 210, where L is a positive integer and greater than or equal to K. The L third signal transceiving antennas 210 are configured to receive network signals that are in the same frequency band as network signals received by the K second signal transceiving antennas 310. In this implementation, the L third signal transceiving antennas 210 can be fixed on the housing 220.

As illustrated in FIG. 51, L=4. One third signal transceiving antennas 210 is carried on one distinct base plate 360, and four base plates 360 are arranged around the periphery of the user terminal equipment 1. As illustrated in FIG. 52, L=8. Each two third signal transceiving antennas 210 are carried on one distinct base plate 360, and four base plates 360 are arranged around the periphery of the user terminal equipment 1. The L third signal transceiving antennas 210 configured to receive network signals are in the same frequency band as network signals received by the K second signal transceiving antennas 310 means that, the L third signal transceiving antennas 210 operate in the sub-6G frequency band and the K second signal transceiving antennas 310 operate in the sub-6G frequency band.

Figure 55:
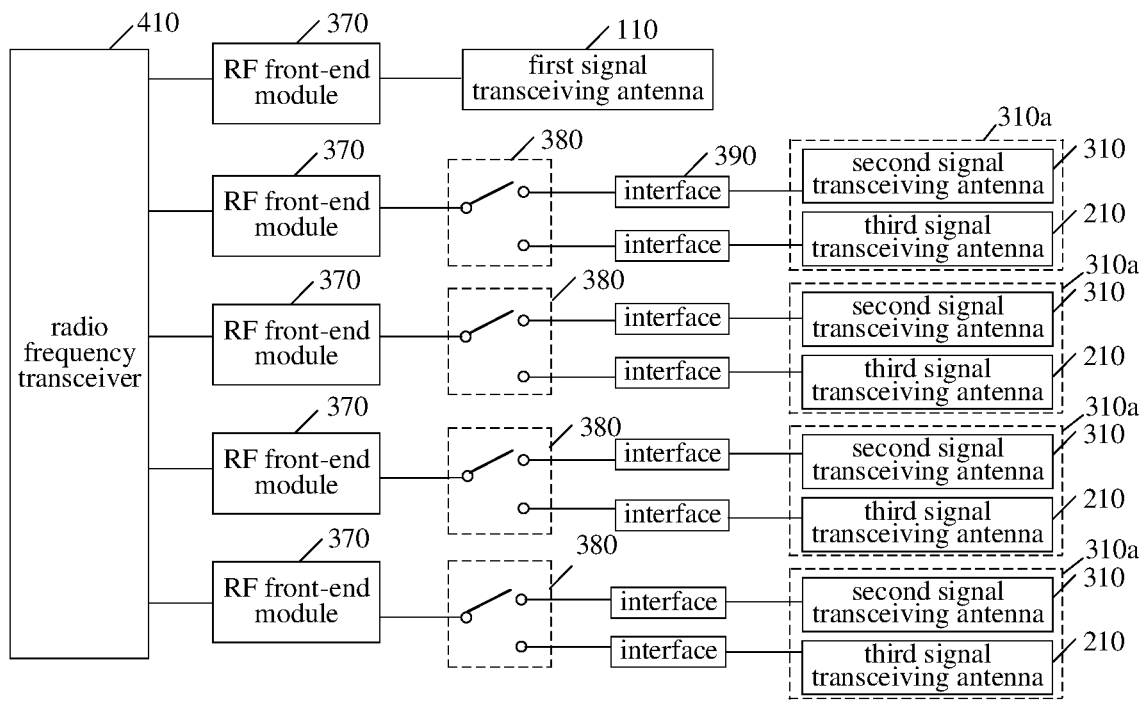
FIG. 55 is a circuit block diagram of a user terminal equipment according to at least one implementation of the disclosure.

FIG. 55 is a circuit block diagram of the user terminal equipment 1 according to at least one implementation of the disclosure. The circuit block diagram of the user terminal equipment 1 will be described below in combination with FIG. 51, FIG. 55, as well as above-mentioned drawings of the user terminal equipment 1 including the rotating assembly 14a and related descriptions.

The user terminal equipment 1 includes the rotating assembly 14a, the first signal transceiving antenna 110, the K second signal transceiving antennas 310, the L third signal transceiving antennas 210, multiple radio frequency (RF) front-end modules 370, multiple switching modules 380, multiple interfaces 390, and the processor 130.

The first signal transceiving antenna 110 is disposed on the rotating assembly 14a and configured to operate in a first frequency band.

K second signal transceiving antennas 310 are disposed on the rotating assembly 14a and configured to operate in a second frequency band.

L third signal transceiving antennas 210 are fixed to and surround the periphery of the user terminal equipment 1 and configured to operate in the second frequency band.

The multiple RF front-end modules 370 are configured to transmit and receive radio frequency signals through at least one of the first signal transceiving antenna 110, the K second signal transceiving antennas 310, or the L third signal transceiving antennas 210.

The K second signal transceiving antennas 310 and the L third signal transceiving antennas 210 are divided into multiple antenna groups 310a. One switching module 380 is coupled to one RF front-end module 370. Each switching module 380 is electrically coupled to one distinct RF front-end module 370.

The multiple interfaces 390 are electrically coupled to the multiple switching modules 380.

One antenna group 310a is electrically coupled to one switching module 380. Each antenna group 310a is electrically coupled to one distinct switching module 380. Each of the multiple antenna groups includes J second signal transceiving antennas 310 and P third signal transceiving antennas 210. In each of the multiple antenna groups 310, each of the J second signal transceiving antennas 310 is electrically coupled to one of the multiple interfaces 390, and each of the P third signal transceiving antennas 210 is electrically coupled to one of the multiple interfaces 390. For each of the multiple antenna groups 310a, each of the multiple switching modules 380 is configured to electrically couple a corresponding one of the J second signal transceiving antennas 310 to a corresponding one of the multiple RF front-end modules 370 to form a conductive path and a corresponding one of the P third signal transceiving antennas 210 to the corresponding one of the multiple RF front-end modules 370 to form another conductive path, and to switch between the conductive paths.

The processor 130 is configured to control rotation of the rotating assembly 14a to allow the first signal transceiving antenna 110 and the K second signal transceiving antennas 310 to receive signals from different directions, and to control the user terminal equipment 1 to operate in at least one of the first frequency band or the second frequency band according to at least one of signal quality of the first frequency band supported by the first signal transceiving antenna 110, signal quality of the second frequency band supported by the K second signal transceiving antennas 310, or signal quality of the second frequency band supported by the L third signal transceiving antennas 210.

Figure 53:
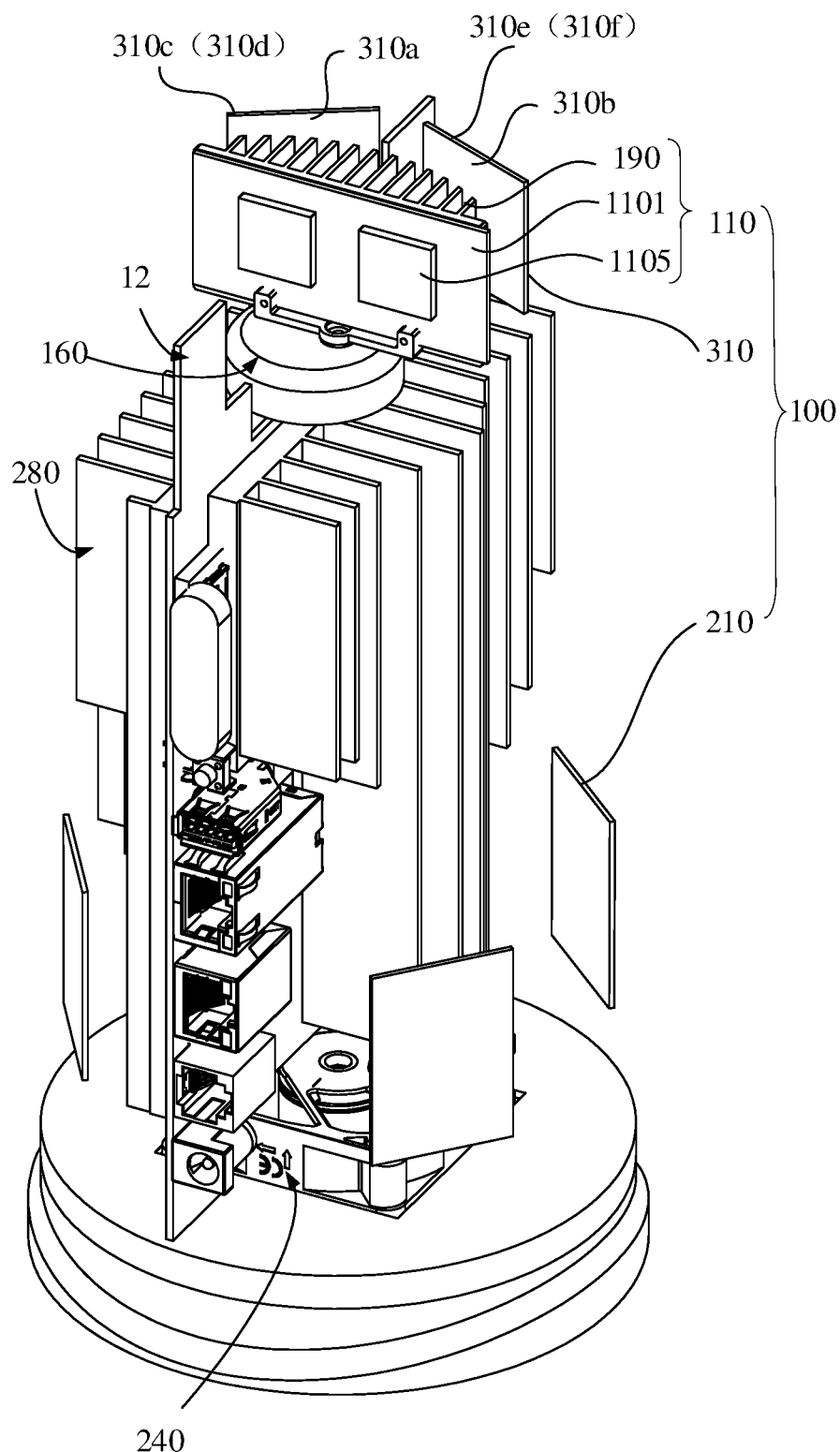
FIG. 53 is a schematic view of the user terminal equipment illustrated in FIG. 32 with the housing removed.
Figure 54:
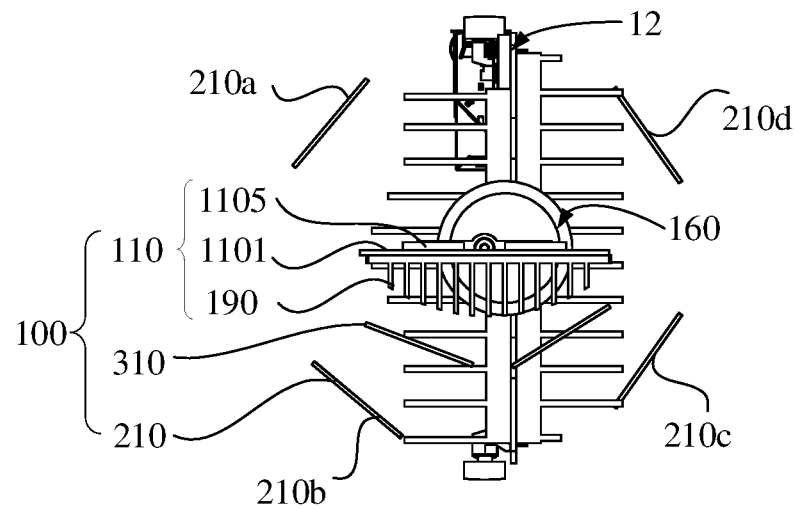
FIG. 54 is a top view of the user terminal equipment illustrated in FIG. 53 with some components removed.

Further, referring to FIG. 53 and FIG. 54, in at least one implementation, the third signal transceiving antenna 210 may further include a second signal transceiving antenna 310. The third signal transceiving antenna 210 is disposed close to one end of the mounting cavity of the housing 21. The third signal transceiving antenna 210 and the circuit board 12 are fixed relative to each other. The third signal transceiving antenna 210 includes more than two sub-6 GHz omnidirectional antennas. At least one sub-6 GHz omnidirectional antenna is disposed at each of the two opposite sides of the circuit board 12. For example, in at least one implementation illustrated in FIG. 54, the third signal transceiving antenna 210 includes a first antenna 210a, a second antenna 210b, a third antenna 210c, and a fourth antenna 210d. The first antenna 210a and the second antenna 210b are disposed at one side of the circuit board 12, the third antenna 210c and the fourth antenna 210d are disposed at the other side of the circuit board 12. The first antenna 210a, the second antenna 210b, the third antenna 210c, and the fourth antenna 210d are arranged sequentially in a counterclockwise direction. The centroids of the first antenna 210a, the second antenna 210b, the third antenna 210c, and the fourth antenna 210d are approximately aligned with each other. The third signal transceiving antenna 210 can be fixedly mounted to the housing 21 or the circuit board 12. The third signal transceiving antenna 210 is able to provide a beam scanning range in all horizontal directions. Alternatively, the number of sub-6 GHz antennas in the third signal transceiving antenna 210 can be varied.

The second signal transceiving antenna 310 is connected to the first signal transceiving antenna 110 and is disposed at the other end of the mounting cavity of the housing 21. The second signal transceiving antenna 310 is disposed on the side of the circuit board 1101 away from the millimeter wave antenna 1105 and can rotate with the first signal transceiving antenna 110. For example, in some implementations, the second signal transceiving antenna 310 is connected to the heat sink 190. Referring to FIG. 53, the second signal transceiving antenna 310 includes a first plate assembly 310a and a second plate assembly 310b. The first plate assembly 310a and the second plate assembly 310b are spaced apart and disposed at one side of the first signal transceiving antenna 110 that is opposite to a signal transceiving surface of the first signal transceiving antenna 110. An outward facing surface of the first plate assembly 310a and an outward facing surface of the second plate assembly 310b for transmitting and/or receiving electromagnetic wave signals are arranged to define an angle therebetween.

The first plate assembly 310a includes a fifth antenna 310c and a sixth antenna 310d isolated from the fifth antenna 310c. The second plate assembly 310b includes a seventh antenna 310e and an eighth antenna 310f isolated from the seventh antenna 310e. When the user terminal equipment 1 is operating, two antennas can be selected from the fifth antenna 310c, the sixth antenna 310d, the seventh antenna 310e, and the eighth antenna 310f to use together with the first antenna 210a, the second antenna 210b, the third antenna 210c, and the fourth antenna 210d, so as to improve antenna performance. Further, the fifth antenna 310c, the sixth antenna 310d, the seventh antenna 310e, and the eighth antenna 310f can be the same in structure. The first plate assembly 310a and the second plate assembly 310b can be the same in structure. The first plate assembly 310a and the second plate assembly 310b are arranged in parallel to the longitudinal direction of housing 21. The first plate assembly 310a and the second plate assembly 310b define an angle therebetween, so as to transmit and/or receive signals in various directions. Furthermore, a signal transceiving surface of the first plate assembly 310a and a signal transceiving surface of the second plate assembly 310b define an angle therebetween.

The user terminal equipment 1 can control the millimeter wave antenna 1105 and the second signal transceiving antenna 310 to rotate to perform 360-degree omnidirectional coverage. During rotating, the user terminal equipment 1 can measure information such as signal quality of 5G signals received by the millimeter wave antenna 1105 and the second signal transceiving antenna 310 at each rotation angle. According to the signal quality corresponding to each rotation angle, a target rotation angle of the millimeter wave antenna 1105 and the second signal transceiving antenna 310 can determined. Based on rotation angle information recorded by the detection module 168, the millimeter wave antenna 1105 and the second signal transceiving antenna 310 can be rotated back to the target rotation angle, so as to improve the antenna performance of the millimeter wave antenna 1105 and the second signal transceiving antenna 310.

Further, in some implementations, each of the first antenna 210a, the second antenna 210b, the third antenna 210c, and the fourth antenna 210d of the third signal transceiving antenna 210 of the user terminal equipment 1 is an omnidirectional NR antenna. Each of the fifth antenna 310c, the sixth antenna 310d, the seventh antenna 310e, and the eighth antenna 310f of the second signal transceiving antenna 310 is a directional NR antenna. The second signal transceiving antenna 310 can be controlled by the user terminal equipment 1 to rotate to achieve a 360-degree omnidirectional coverage rotation. During rotating, two antennas can be selected from the fifth antenna 310c, the sixth antenna 310d, the seventh antenna 310e, and the eighth antenna 310f to search and measure 5G signals, and to use together with the four omnidirectional NR antennas of the third signal transceiving antenna 210 to improve antenna performance.

As illustrated in FIG. 55, the K second signal transceiving antennas 310 include four second transceiving antennas 310. The L third signal transceiving antennas 210 include four third signal transceiving antennas 210. The RF front-end modules 370 include five RF front-end modules 370. In the five RF front-end modules 370, one RF front-end module 370 is electrically coupled to the first signal transceiving antenna 110, and the rest four RF front-end modules 370 each are electrically coupled to different respective one of the multiple switching modules 380. The multiple interfaces 390 include eight interfaces 390. Each antenna group 310a includes one second signal transceiving antenna 310 and one third signal transceiving antenna 210. In each antenna group 310a, each second signal transceiving antenna 310 is electrically coupled to one corresponding switching module 380 via one corresponding distinct interface 390, and each third signal transceiving antenna 210 is electrically coupled to the one corresponding switching module 380 via another one corresponding distinct interface 390.

In at least one implementation, the user terminal equipment 1 further includes a radio frequency transceiver 410. The radio frequency transceiver 410 is electrically coupled with the multiple RF front-end modules 370. The radio frequency transceiver 410 is configured to receive radio frequency signals output by the RF front-end modules 370, and convert the radio frequency signals received into baseband signals.

In this implementation, in each antenna group 310a, the second signal transceiving antenna 310 and the third signal transceiving antenna 210 each are operable to be electrically coupled to the some RF front-end module 370 via the same switching module 380 to form a different respective independent path. Thus, the RF front-end module 370 can transmit and/or receive radio frequency signals to/from the second signal transceiving antenna 310 and the third signal transceiving antenna 210 which each form a different respective path with the radio frequency front-end module 370, thereby ensuring independence of the different respective path when the RF front-end module 370 transmits and/or receives radio frequency signals to/from the second signal transceiving antenna 310 and the third signal transceiving antenna 210. Compared with RF signal transmission and reception where the second signal transceiving antenna 310 and the third signal transceiving antenna 210 are combined into one path, the signal attenuation small during the RF signal transmission and reception in this implementation, which is beneficial to improve communication quality of the user terminal equipment 1. Furthermore, in each antenna group 310a, one second signal transceiving antenna 310 and one third signal transceiving antenna 210 are operable to be electrically coupled to the same RF front-end module 370 through the same switching module 380, such that the second signal transceiving antenna 310 and the third signal transceiving antenna 210 in the same antenna group 310a cannot be electrically coupled to the same RF front-end module 370 at the same time. Since the second signal transceiving antenna 310 and the second signal transceiving antenna 310 are arranged at different positions, when the switching module 380 switches between the second signal transceiving antenna 310 and the third signal transceiving antenna 210 under control of the processor 130, there is a great variation in signal quality of the second frequency band supported by the second signal transceiving antenna 310 and that supported by the third signal transceiving antenna 210. As such, it is possible to quickly adjust the signal quality of the second frequency band supported by the second signal transceiving antenna 310 and the third signal transceiving antenna 210 by selecting the second signal transceiving antenna 310 or the third signal transceiving antenna 210 in the same antenna group 310a, thereby facilitating adjustment in operations of the user terminal equipment 1 in the second frequency band.

Figure 56:
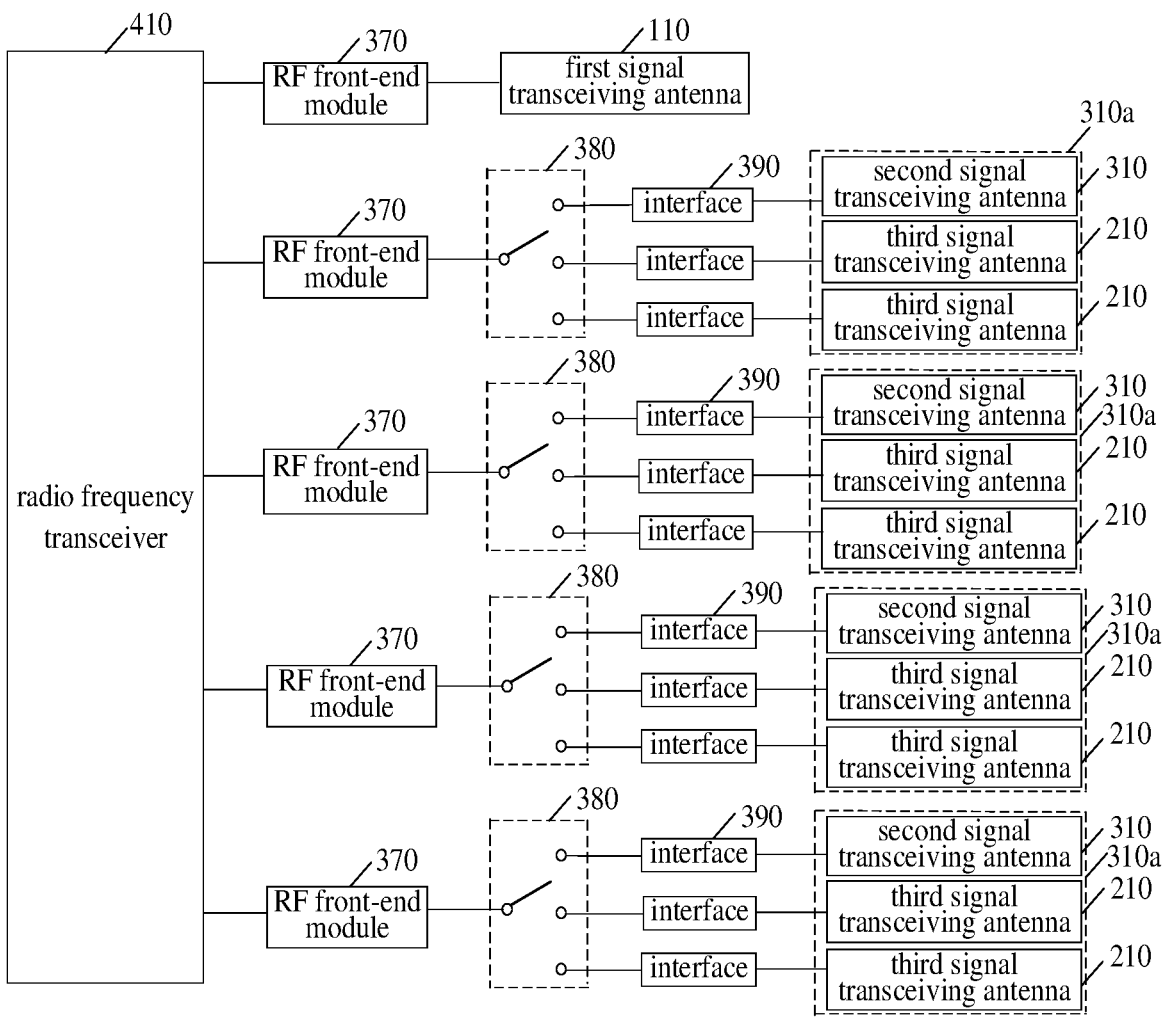
FIG. 56 is a circuit block diagram of a user terminal equipment according to at least one implementation of the disclosure.

FIG. 56 is a circuit block diagram of the user terminal equipment 1 according to at least one implementation of the disclosure. The circuit block diagram of the user terminal equipment 1 will be described below in combination with FIG. 52, FIG. 56, as well as above-mentioned drawings of the user terminal equipment 1 including the rotating assembly 14a and related descriptions. Difference between the user terminal equipment 1 in this implementation and the user terminal equipment 1 in the implementation illustrated in FIG. 55 lies in the following aspects. In this implementation, one antenna group 310a includes two third signal transceiving antennas 210, and the two third signal transceiving antennas 210 belonging to the same antenna group 310a are carried on different base plates 360. In other words, in this implementation, the K second signal transceiving antennas 310 include four second signal transceiving antennas 310, the L third signal transceiving antennas 210 include eight third signal transceiving antennas 210, and the RF front-end modules 370 include five RF front-end modules 370. One of the five RF front-end modules 370 is electrically coupled to the first signal transceiving antenna 110. Each of the rest four RF front-end modules 370 is electrically coupled to one switching module 380. The multiple interfaces 390 include twelve interfaces 390. Each antenna group 310a includes one second signal transceiving antenna 310 and two third signal transceiving antennas 210. In each antenna group 310a, the one second signal transceiving antenna 310 is coupled to one corresponding switching module 380 via one corresponding distinct interface 390, and each of the two third signal transceiving antennas 210 is coupled to the one corresponding switching module 380 via one corresponding distinct interface 390.

In this implementation, the two third signal transceiving antennas 210 belonging to the same antenna group 310a are carried on different base plates 360. When the switching module 380 switches between the two third signal transceiving antennas 210 under control of the processor 130, there is a great variation in signal quality of the third frequency band supported by the two third signal transceiving antennas 210. As such, it is beneficial to quickly adjust the signal quality of the third frequency band supported by the two third signal transceiving antennas 310 by selecting different third signal transceiving antennas 310 belonging to the same antenna group 310a, which in turn facilitates allowing the user terminal equipment 1 to operate in a state in which the third network signal has the strongest signal strength or has a signal strength greater than a preset value.

In at least one implementation, when the user terminal equipment 1 operates in the second frequency band, the processor 130 is configured to select Q antennas from the K second signal transceiving antennas 310 and the L third signal transceiving antennas 210 to realize a Q×Q MIMO antenna, where Q is even, and the Q antennas include any combination of second signal transceiving antennas 310 and third signal transceiving antennas 210.

In at least one implementation, the K second signal transceiving antennas 310 are four second signal transceiving antennas 310. The L third signal transceiving antennas 210 are four third signal transceiving antennas 210. Each of the multiple antenna groups 310a includes one second signal transceiving antenna 310 and one third signal transceiving antenna 210. The Q×Q MIMO antenna is 4×4 MIMO antenna. The user terminal equipment 1 includes four base plate 360 distributed around the periphery of the user terminal equipment 1. Each of the four base plates 360 carries one third signal transceiving antenna 210.

In at least one implementation, the K second signal transceiving antennas 310 are four second signal transceiving antennas 310. The L third signal transceiving antennas 310a are eight third signal transceiving antennas 210. Each of the multiple antenna groups 310a includes one second signal transceiving antenna 310 and two third signal transceiving antennas 210. The Q×Q MIMO antenna is 4×4 MIMO antenna. The user terminal equipment 1 includes four base plates 360 distributed around the periphery of the user terminal equipment 1. Each of the four base plates 360 carries two third signal transceiving antennas 210 belonging to different antenna groups 310a. In other words, the two third signal transceiving antennas 210 in the same antenna group 310a are disposed on different base plates 360.

In at least one implementation, the first signal transceiving antenna 110 is a millimeter wave antenna, and the second signal transceiving antenna 310 and the third signal transceiving antenna 210 are both sub-6G directional antennas.

Figure 57:
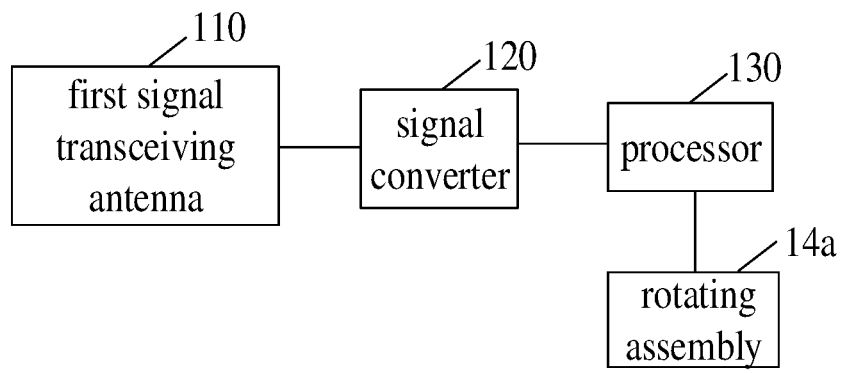
FIG. 57 is a circuit block diagram of a user terminal equipment according to implementations of the disclosure.

In at least one implementation, FIG. 57 is a circuit block diagram of the user terminal equipment 1 according to implementations of the disclosure. Referring to FIG. 57, the user terminal equipment 1 further includes the signal converter 120 and the processor 130. When the user terminal equipment 1 operates in the first frequency band rather than the second frequency band, the processor 130 is configured to control the rotating assembly 14a to drive the first signal transceiving antenna 110 to rotate to receive first network signals from different directions. The signal converter 120 is configured to convert the first network signal with a strongest signal strength among the first network signals received by the first signal transceiving antenna 110 from different directions into the second network signal.

Generally, the user terminal equipment 1 operates in millimeter wave mode or sub-6G mode. Whether the user terminal equipment 1 operates in millimeter wave mode or sub-6G mode is determined by a type of a base station in an environment where the user terminal equipment 1 resides. When the user terminal equipment 1 is in an environment in which only a 5G base station is available, the user terminal equipment 1 then operates in millimeter wave mode. At this time, the processor 130 controls the first signal transceiving antenna 110 to work, and controls the multiple second signal transceiving antennas 310 and the multiple third signal transceiving antennas 210 to not work. When the user terminal equipment 1 is in an environment in which only a sub-6G base station is available, the user terminal equipment 1 then operates in sub-6G mode. At this time, the processor 130 controls at least one of the multiple second signal transceiving antennas 310 or the multiple third signal transceiving antennas 210 to work, and controls the first signal transceiving antenna 110 to not work.

In at least one implementation, when the user terminal equipment 1 is in an environment in which both the 5G base station and the sub-6G base station are available, which one of the 5G base station and the sub-6G base station will be connected is determined according the load of the 5G base station and the sub-6G base station. For example, when the load of the 5G base station is small, the 5G base station issues a test instruction to allow the user terminal equipment 1 to access the 5G base station.

When the user terminal equipment 1 operates in the first frequency band rather than the second frequency band, the signal converter 120 converts the first network signal with the strongest signal strength received by the first signal transceiving antenna 110 into a second network signal. In this implementation, the signal converter 120 converts the first network signal with the strongest signal strength into the second network signal, thereby ensuring the signal strength of the second network signal, and in turn ensuring communication quality when the second network signal is used for communication.

Figure 58:
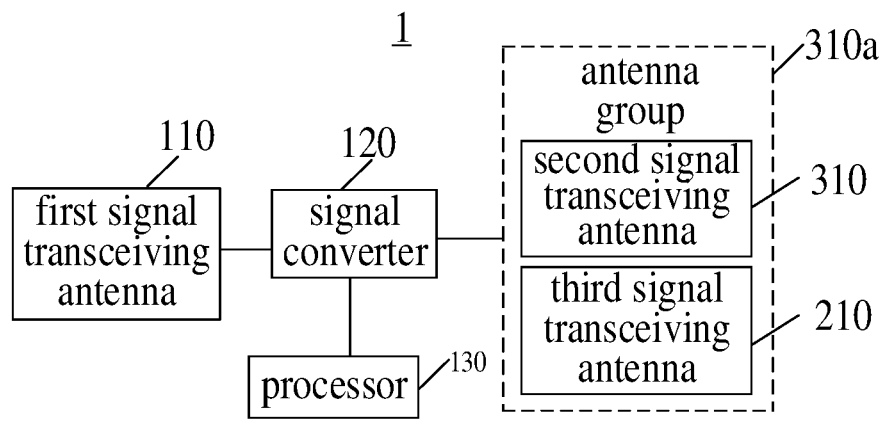
FIG. 58 is a circuit block diagram of a user terminal equipment according to implementations of the disclosure.

FIG. 58 is a circuit block diagram of the user terminal equipment 1 according to implementations of the disclosure. The user terminal equipment 1 further includes the signal converter 120. When the user terminal equipment 1 operates in the second frequency band rather than the first frequency band, the processor 130 is configured to select K third signal transceiving antennas 210 from the L third signal transceiving antennas 210, where signals received by the K third signal transceiving antennas 210 have a largest sum of signal strength among signals received by any other K third signal transceiving antennas 210 selected from the L third signal transceiving antennas 210. That is, the signals received by the K third signal transceiving antennas 210 have a larger sum of signal strengths than any K third signal transceiving antennas 210 in the L third signal transceiving antennas 210. The processor 130 is further configured to compare a sum of signal strength of the signals received by the K third signal transceiving antennas 210 with a sum of signal strength of signals received by the K second signal transceiving antennas 310 when the K second signal transceiving antennas 310 are located at a position where the signals received by the K second signal transceiving antennas 310 have a largest sum of signal strengths among signals received by the K second signal transceiving antennas 310 located at any other positions. When the sum of signal strength corresponding to the K third signal transceiving antennas 210 is greater than the sum of signal strength corresponding to the K second signal transceiving antennas 310, the signal converter 120 is configured to convert third network signals received by the K third signal transceiving antennas 210 into fourth network signals. When the sum of signal strength corresponding to the K third signal transceiving antennas 210 is less than the sum of the signal strengths corresponding to the K second signal transceiving antennas 21, the signal converter 120 is configured to convert third network signals received by the K second signal transceiving antennas 310 into fourth network signals. In the schematic diagram of this implementation, for illustrative purpose, one antenna group 310a is described.

As an option, the sum of the signal strengths of the K third signal transceiving antennas 210 is a first strength. The K second signal transceiving antennas 310 located at position PT1 have the largest sum of signal strength. When the K second signal transceiving antennas 310 are located at position PT1, the sum of the signal strengths of the K second signal transceiving antennas 310 is a second strength. The processor 130 compares the first strength with the second strength. When the first strength is greater than the second strength, the signal converter 120 is configured to convert the third network signals received by the K third signal transceiving antennas 210 into the fourth network signals.

When the first strength is less than the second strength, the signal converter 120 is configured to convert the third network signals received by the K second signal transceiving antennas 310 located at position PT1 into the fourth network signals.

In at least one implementation, referring to FIG. 58, the user terminal equipment 1 includes the radio frequency front-end module 320, the signal converter 120, and the processor 130. When the user terminal equipment 1 operates in the first frequency band and the second frequency band, the processor 130 is configured to control the rotating assembly 14a to drive the first signal transceiving antenna 110 to rotate to receive first network signals from different directions. The signal converter 120 is configured to convert a first network signal with a strongest signal strength among the first network signals received by the first signal transceiving antenna 110 from different directions into a second network signal. When the first signal transceiving antenna 110 is located at a position where the first network signal received by the first signal transceiving antenna has the strongest signal strength, the processor 130 is configured to control the K second signal transceiving antennas 310 to not work. The processor 130 is configured to select K third signal transceiving antennas 210 from the L third signal transceiving antennas 210, where signals received by the K third signal transceiving antenna 210 have a largest sum of signal strength among signals received by any other K third signal transceiving antennas 210 selected from the L third signal transceiving antennas 210. The signal converter 120 is configured to convert third network signals received by the K third signal transceiving antennas 210 into fourth network signals.

Since the second signal transceiving antennas 310 and the first signal transceiving antenna 110 are both disposed on the rotating assembly 14a, when the position of the first signal transceiving antenna 110 is determined, the positions of the second signal transceiving antennas 310 are also determined. Due to uncertainty of a base station that supports the second signal transceiving antennas 310, when the first signal transceiving antenna 110 is located at the position where the first network signal received by the first signal transceiving antenna 110 has the strongest signal strength, the second signal transceiving antennas 310 are not necessarily located at positions where network signals received by the second signal transceiving antennas 310 have the strongest signal strengths, and it is even unlikely that the second signal transceiving antennas 310 are located at the positions where the network signals received by the second signal transceiving antennas 310 have the strongest signal strengths. At this time, since the L third signal transceiving antennas 210 are arranged around the periphery of the user terminal equipment 1, some of the L third signal transceiving antennas 210 will receive signals with relatively strong signal strengths, regardless of a position of the base station supporting the second signal transceiving antennas 310. As such, when the first signal transceiving antenna 110 is located at the position where the first network signal received by the first signal transceiving antenna 110 has the strongest signal strength, the processor 130 is configured to control the second signal transceiving antennas 310 to not work and select K third signal transceiving antennas 210 from the L third signal transceiving antennas 210, where signals received by the K third signal transceiving antenna 210 have the largest sum of signal strength, which is beneficial for the user terminal equipment 1 to quickly select antennas that support the second frequency band, and in turn allows the user terminal equipment 1 to quickly convert the third network signals into the fourth network signals.

In at least one implementation, referring to FIG. 58, the user terminal equipment 1 includes the radio frequency front-end module 320, the signal converter 120, and the processor 130. When the user terminal equipment 1 operates in the first frequency band and the second frequency band, the processor 130 is configured to control the rotating assembly 14a to drive the first signal transceiving antenna 110 to rotate to receive first network signals from different directions. The signal converter 120 is configured to convert the first network signal with the strongest signal strength among the first network signals received by the first signal transceiving antenna 110 from different directions into the second network signal. When the first signal transceiving antenna 110 is located at a position where the first network signal received by the first signal transceiving antenna 110 has the strongest signal strength, the processor 130 is configured to select (K-X) second signal transceiving antennas 310 from the K second signal transceiving antennas 310 and X third signal transceiving antennas 210 from the L third signal transceiving antennas 210, where signals received by the (K-X) second signal transceiving antennas and the X third signal transceiving antennas have a largest sum of signal strength among signals received by any other K signal transceiving antennas selected from the K second signal transceiving antennas 310 and the L third signal transceiving antennas 210. The signal converter 120 is configured to convert third network signals received by the (K-X) second signal transceiving antennas 310 and the X third signal transceiving antennas 210 selected into four network signals.

In this implementation, the user terminal equipment 1 can simultaneously operate in the first frequency band and the second frequency band. For example, in stand-alone (SA) new radio carrier aggregation (NR CA) mode, the user terminal equipment 1 can operate in millimeter wave mode and sub-6G mode.

Since all of L third signal transceiving antennas 210 are fixed, when the user terminal equipment 1 is located at a stationary position, a signal strength of a signal received by each of the L third signal transceiving antennas 210 can be measured. When the processor 130 controls the rotating assembly 14a to rotate one revolution, the signal strengths of signals from various directions received by the K second signal transceiving antennas 310 can be measured. As such, the processor 130 can select (K-X) second signal transceiving antennas 310 and X third signal transceiving antennas 210 according to the signal strength of the signal received by each of the L third signal transceiving antennas 210 and the signal strengths of signals from various directions received by the K second signal transceiving antennas 310. A sum of the signal strengths of signals received by the (K-X) second signal transceiving antennas and the X third signal transceiving antennas is greater than a sum of signal strength of signals received by any other K second signal transceiving antennas 310, a sum of signal strength of signals received by any other K third signal transceiving antennas 210, and a sum of signal strength of signals received by any other second signal transceiving antennas 310 and any other third signal transceiving antennas 210 whose total number is K.

As an example, L equals to eight, X equals to four, and K equals to four. When the first signal transceiving antenna 110 is located at the position where the first network signal received by the first signal transceiving antenna 110 has the strongest signal strength, the processor 130 selects four antennas from the eight third signal transceiving antennas 210 and the four second signal transceiving antennas 310. A sum of signal strength of signals received by the four antennas selected is greater than a sum of signal strength of signals received by any four of twelve antennas (the twelve antennas include the eight third signal transceiving antennas 210 and the four second signal transceiving antennas 310). The four antennas selected may all be the third signal transceiving antenna 210, or may all be the second signal transceiving antenna 310. Alternatively, a part of the four antennas may be the third signal transceiving antenna 210, and the other part of the four antennas may be the second signal transceiving antenna 310, for example, the four antennas includes three third signal transceiving antennas 210 and one second signal transceiving antenna 310.

In combination with the user terminal equipment 1 provided according to any of the above identified implementations, a method for antenna selection is further provided according to the disclosure. In at least one implementation, the method for antenna selection is applicable to the user terminal equipment 1. The user terminal equipment 1 includes a first signal transceiving antenna 110, K second signal transceiving antennas 310, and L third signal transceiving antennas 210. The first signal transceiving antenna 110 and the K second signal transceiving antennas 310 are arranged on the same rotating assembly 14a and are rotatable. The first signal transceiving antenna 110 is configured to operate in a first frequency band, the K second signal transceiving antennas 310 and the L third signal transceiving antennas 210 are configured to operate in a second frequency band. The method includes the following.

The rotating assembly 14a is driven to rotate to allow the first signal transceiving antenna 110 to receive signals supporting communication in the first frequency band from various directions and to allow the K second signal transceiving antennas 310 to receive signals supporting communication in the second frequency band from various directions.

The user terminal equipment is controlled to operate in at least one of the first frequency band and the second frequency band.

In this implementation, a signal supporting first frequency band communication serves as the first network signal, and a signal supporting second frequency band communication serves as the third network cable signal.

In at least one implementation, when the user terminal equipment 1 operates in the first frequency band rather than the second frequency band, the method includes the following.

The first signal transceiving antenna 110 is controlled to rotate to receive first network signals from the various directions.

A first network signal with a strongest signal strength among the first network signals received by the first signal transceiving antenna 110 from the various directions is converted into a second network signal.

In at least one implementation, when the user terminal equipment 1 operates in the second frequency band rather than the first frequency band, the method includes the following.

K third signal transceiving antennas 210 are selected from the L third signal transceiving antennas 210, where signals received by the K third signal transceiving antennas 210 have a largest sum of signal strength among signals received by any other K third signal transceiving antennas 210 selected from the L third signal transceiving antennas 210.

A sum of signal strength of the signals received by the K third signal transceiving antennas 210 is compared with a sum of signal strength of signals received by the K second signal transceiving antennas 310 when the K second signal transceiving antennas 310 are located at a position where the signals received by the K second signal transceiving antennas 310 have a largest sum of signal strength among signals received by the K second signal transceiving antennas 310 located at any other positions.

Third network signals received by the K third signal transceiving antennas 210 are converted into fourth network signals, in response to the sum of signal strength corresponding to the K third signal transceiving antennas 210 being greater than the sum of signal strength corresponding to the K second signal transceiving antennas 310. The signal converter 120 is configured to convert the third network signals received by the K second signal transceiving antennas 310 into the fourth network signals, in response to the sum of signal strength corresponding to the K third signal transceiving antennas 210 being less than the sum of the signal strengths corresponding to the K second signal transceiving antennas 310.

In at least one implementation, when the user terminal equipment 1 operates in the second frequency band and the first frequency band, the method includes the following.

The rotating assembly 14a is controlled to drive the first signal transceiving antenna 110 to rotate to receive first network signals from different directions.

A first network signal with a strongest signal strength among the first network signals received by the first signal transceiving antenna from different directions is converted into a second network signal.

The K second signal transceiving antennas 310 are controlled to not work when the first signal transceiving antenna 110 is located at a position where the first network signal has a strongest signal strength, K third signal transceiving antennas 210 are selected from the L third signal transceiving antennas 210, and third network signals received by the K third signal transceiving antennas 210 are converted into fourth network signals, where signals received by the K third signal transceiving antennas 210 have a largest sum of signal strength among signals received by any other K third signal transceiving antennas 210 selected from the L third signal transceiving antennas 210.

In at least one implementation, when the user terminal equipment 1 operates in the second frequency band and the first frequency band, the method includes the following.

The rotating assembly 14a is controlled to drive the first signal transceiving antenna 110 to rotate to receive first network signals from different directions.

A first network signal with a strongest signal strength among the first network signals received by the first signal transceiving antenna from different directions is converted into a second network signal.

(K-X) second signal transceiving antennas 310 are selected from the K second signal transceiving antennas 310 and X third signal transceiving antennas 210 from the L third signal transceiving antennas 210, when the first signal transceiving antenna 110 is located at a position where the first network signal has the strongest signal strength, where signals received by the (K-X) second signal transceiving antennas 310 and the X third signal transceiving antennas 210 have a largest sum of signal strength among signals received by any other K signal transceiving antennas selected from the K second signal transceiving antennas 310 and the L third signal transceiving antennas 210. Third network signals received by the (K-X) second signal transceiving antennas and the X third signal transceiving antennas selected are converted into four network signals.

It is noted that, although 5G and Sub-6G mobile communications are mentioned in the background and the detailed description of the disclosure, the CPE is not limited to using 5G or sub-6G mobile communications. With the development of technology, the CPE can also use other forms of mobile communications. 5G and Sub-6G mobile communications mentioned in the background and the detailed description in the disclosure should not be construed as a limitation to the user terminal equipment 1 provided in the disclosure.

Although the implementations of the disclosure have been illustrated and described above, it is appreciated that the above implementations are exemplary and should not be construed as limitations to the disclosure. A person of ordinary skill in the art can make changes, modifications, substitutions, and modifications to the above implementations within the scope of the disclosure, and these improvements and modifications also fall within the protection scope of the disclosure.

What is claimed is:

1. A user terminal equipment, comprising a first signal transceiving antenna, K second signal transceiving antennas, a rotating assembly, and L third signal transceiving antennas, wherein
   the first signal transceiving antenna and the K second signal transceiving antennas are disposed on the rotating assembly and configured to be driven to rotate by the rotating assembly, wherein K is a positive integer;
   the first signal transceiving antenna is configured to operate in a first frequency band, the K second signal transceiving antennas are configured to operate in a second frequency band, wherein the first frequency band is different from the second frequency band; and
   the L third signal transceiving antennas are distributed around a periphery of the user terminal equipment, wherein L is a positive integer, and the L third signal transceiving antennas are configured to receive network signals that are in a same frequency band as network signals received by the K second signal transceiving antennas.

2. The user terminal equipment of claim 1, wherein
   the rotating assembly comprises a base, a holder rotatably connected with the base, and a driver;
   the driver is configured to receive a control signal and drive the holder to rotate relative to the base under control of the control signal; and
   the first signal transceiving antenna and the K second signal transceiving antennas are connected to the holder, and the first signal transceiving antenna is spaced apart from the K second signal transceiving antennas.

3. The user terminal equipment of claim 2, further comprising a heat sink, wherein the heat sink is disposed on one side of the first signal transceiving antenna, and the K second signal transceiving antennas are disposed on one side of the heat sink away from the first signal transceiving antenna.

4. The user terminal equipment of claim 3, further comprising a plurality of base plates which are arranged around the user terminal equipment and bonded to the heat sink via adhesives, wherein each of the plurality of base plates carries two second signal transceiving antennas.

5. The user terminal equipment of claim 3, further comprising a plurality of base plates and a plurality of carrying parts, wherein
   the K second signal transceiving antennas are carried by the plurality of base plates, and the plurality of base plates are carried by the plurality of carrying parts; and
   each of the plurality of carrying parts comprises a carrying body and a fixing portion, wherein the fixing portion is connected with the carrying body and fixed to the heat sink.

6. The user terminal equipment of claim 1, further comprising L third signal transceiving antennas, wherein
   the first signal transceiving antenna is disposed on a top of the user terminal equipment relative to the L third signal transceiving antennas, wherein L is greater than or equal to K.

7. The user terminal equipment of claim 1, further comprising:
   at least one Wi-Fi antenna radio frequency (RF) module and at least one 4G antenna RF module arranged at intervals along a longitudinal direction of the user terminal equipment; and
   a signal converter;
   wherein the first signal transceiving antenna is a millimeter wave antenna, each of the K second signal transceiving antennas and the L third signal transceiving antennas is a sub-6G antenna;
   the signal converter is configured to convert signals received by at least one of the at least one 4G antenna RF module, the first signal transceiving antenna, the K second signal transceiving antennas, or the L third signal transceiving antennas into Wi-Fi signals; and
   the at least one Wi-Fi antenna RF module is configured to transmit the Wi-Fi signals.

8. A user terminal equipment, comprising:
   a rotating assembly;
   a first signal transceiving antenna disposed on the rotating assembly and configured to operate in a first frequency band;
   K second signal transceiving antennas disposed on the rotating assembly and configured to operate in a second frequency band;
   L third signal transceiving antennas fixed to and surrounding a periphery of the user terminal equipment and configured to operate in the second frequency band;
   a plurality of radio frequency (RF) front-end modules configured to transmit and receive radio frequency signals through the first signal transceiving antenna and at least one of the K second signal transceiving antennas or the L third signal transceiving antennas;
   a plurality of switching modules with one switching module electrically coupled to one RF front-end module and each switching module electrically coupled to one distinct RF front-end module;
   a plurality of interfaces electrically coupled to the plurality of switching modules; and
   a processor configured to control rotation of the rotating assembly to allow the first signal transceiving antenna and the K second signal transceiving antennas to receive signals from different directions, and configured to control the user terminal equipment to operate in at least one of the first frequency band or the second frequency band according to at least one of signal quality of the first frequency band supported by the first signal transceiving antenna, signal quality of the second frequency band supported by the K second signal transceiving antennas, or signal quality of the second frequency band supported by the L third signal transceiving antennas;

wherein the K second signal transceiving antennas and the L third signal transceiving antennas are divided into a plurality of antenna groups, wherein one antenna group is electrically coupled to one switching module and each antenna group is electrically coupled to one distinct switching module, wherein each of the plurality of antenna groups comprises J second signal transceiving antennas and P third signal transceiving antennas; and in each of the plurality of antenna groups, each of the J second signal transceiving antennas is electrically coupled to one of the plurality of interfaces, each of the P third signal transceiving antennas is electrically coupled to one of the plurality of interfaces; for each of the plurality of antenna groups, each of the plurality of switching modules is configured to electrically couple a corresponding one of the J second signal transceiving antennas to a corresponding one of the plurality of RF front-end modules to form a conductive path and a corresponding one of the P third signal transceiving antennas to the corresponding one of the plurality of RF front-end modules to form another conductive path, and configured to switch between the conductive paths.

9. The user terminal equipment of claim 8, wherein when the user terminal equipment operates in the second frequency band, the processor is configured to select Q antennas from the K second signal transceiving antennas and the L third signal transceiving antennas to realize a Q×Q multi input multi output (MIMO) antenna, wherein Q is even, and the Q antennas comprises any combination of second signal transceiving antennas and third signal transceiving antennas.

10. The user terminal equipment of claim 9, wherein the K second signal transceiving antennas are four second signal transceiving antennas, and the L third signal transceiving antennas are four third signal transceiving antennas;

each of the plurality of antenna groups comprises one second signal transceiving antenna and one third signal transceiving antenna;

the Q×Q MIMO antenna is 4×4 MIMO antenna; and the user terminal equipment comprises four base plates distributed around a periphery of the user terminal equipment, and each of the four base plates carries one third signal transceiving antenna.

11. The user terminal equipment of claim 9, wherein the K second signal transceiving antennas are four second signal transceiving antennas, and the L third signal transceiving antennas are eight third signal transceiving antennas;

each of the plurality of antenna groups comprises one second signal transceiving antenna and two third signal transceiving antennas;

the Q×Q MIMO antenna is 4×4 MIMO antenna; and the user terminal equipment comprises four base plates distributed around a periphery of the user terminal equipment, each of the four base plates carries two third signal transceiving antennas belonging to different antenna groups.

12. The user terminal equipment of claim 8, further comprising a signal converter, wherein when the user terminal equipment operates in the first frequency band rather than the second frequency band, the processor is configured to control the rotating assembly to drive the first signal transceiving antenna to rotate to receive first network signals from different directions; and the signal converter is configured to convert a first network signal, which has a strongest signal strength among the first network signals received by the first signal transceiving antenna from different directions, into a second network signal.

13. The user terminal equipment of claim 8, further comprising a signal converter, wherein when the user terminal equipment operates in the second frequency band rather than the first frequency band, the processor is configured to select K third signal transceiving antennas from the L third signal transceiving antennas, wherein signals received by the K third signal transceiving antennas have a largest sum of signal strength among signals received by any other K third signal transceiving antennas selected from the L third signal transceiving antennas;

the processor is further configured to compare a sum of signal strength of the signals received by the K third signal transceiving antennas with a sum of signal strength of signals received by the K second signal transceiving antennas when the K second signal transceiving antennas are located at a position where the signals received by the K second signal transceiving antennas have a largest sum of signal strength among signals received by the K second signal transceiving antennas located at any other positions;

when the sum of signal strength corresponding to the K third signal transceiving antennas is greater than the sum of signal strength corresponding to the K second signal transceiving antennas, the signal converter is configured to convert third network signals received by the K third signal transceiving antennas into fourth network signals, and when the sum of signal strength corresponding to the K third signal transceiving antennas is less than the sum of the signal strengths corresponding to the K second signal transceiving antennas, the signal converter is configured to convert third network signals received by the K second signal transceiving antennas into fourth network signals.

14. The user terminal equipment of claim 8, further comprising a signal converter, wherein when the user terminal equipment operates in the first frequency band and the second frequency band, the signal converter is configured to convert a first network signal, which has a strongest signal strength among first network signals received by the first signal transceiving antenna from different directions, into a second network signal; and when the first signal transceiving antenna is located at a position where the first network signal received by the first signal transceiving antenna has the strongest signal strength, the processor is configured to control the K second signal transceiving antennas to not work and select K third signal transceiving antennas from the L third signal transceiving antennas, wherein signals received by the K third signal transceiving antenna have a largest sum of signal strength among signals received by any other K third signal transceiving antennas selected from the L third signal transceiving antennas, and the signal converter is configured to convert third network signals received by the K third signal transceiving antennas into fourth network signals.

15. The user terminal equipment of claim 8, comprising a signal converter, wherein when the user terminal equipment operates in the first frequency band and the second frequency band, the processor is configured to control the rotating assembly to drive the first signal transceiving antenna to rotate to receive first network signals from different directions;

when the first signal transceiving antenna is located at a position where the first network signal received by the first signal transceiving antenna has a strongest signal strength, the processor is configured to select (K-X) second signal transceiving antennas from the K second signal transceiving antennas and X third signal transceiving antennas from the L third signal transceiving antennas, wherein signals received by the (K-X) second signal transceiving antennas and the X third signal transceiving antennas have a largest sum of signal strength among signals received by any other K signal transceiving antennas selected from the K second signal transceiving antennas and the L third signal transceiving antennas, and the signal converter is configured to convert third network signals received by the (K-X) second signal transceiving antennas and the X third signal transceiving antennas selected into four network signals.

16. A method for antenna selection, applicable to a user terminal equipment, wherein the user terminal equipment comprises a first signal transceiving antenna, K second signal transceiving antennas, and L third signal transceiving antennas, wherein the first signal transceiving antenna and the K second signal transceiving antennas are arranged on the same rotating assembly and are rotatable, and wherein the first signal transceiving antenna is configured to operate in a first frequency band, the K second signal transceiving antennas and the L third signal transceiving antennas are configured to operate in a second frequency band; and the method comprises:

driving the rotating assembly to rotate to allow the first signal transceiving antenna to receive, from various directions, signals supporting communication in the first frequency band and to allow the K second signal transceiving antennas to receive, from various directions, signals supporting communication in the second frequency band; and controlling the user terminal equipment to operate in at least one of the first frequency band or the second frequency band according to at least one of quality of the signals supporting the first frequency band received by the first signal transceiving antenna, quality of the signals supporting the second frequency band received by the K second signal transceiving antennas, or quality of signals supporting the second frequency band received by the L third signal transceiving antennas.

17. The method of claim 16, wherein when the user terminal equipment operates in the first frequency band rather than the second frequency band, the method comprises:

controlling the first signal transceiving antenna to rotate to receive first network signals from the various directions; and converting a first network signal with a strongest signal strength among the first network signals received by the first signal transceiving antenna from the various directions into a second network signal.

18. The method of claim 16, wherein when the user terminal equipment operates in the second frequency band rather than the first frequency band, the method comprises:

selecting K third signal transceiving antennas from the L third signal transceiving antennas, wherein signals received by the K third signal transceiving antennas have a largest sum of signal strength among signals received by any other K third signal transceiving antennas selected from the L third signal transceiving antennas;

comparing a sum of signal strength of the K third signal transceiving antennas with a sum of signal strength of signals received by the K second signal transceiving antennas when the K second signal transceiving antennas are located at a position where the signals received by the K second signal transceiving antennas have a largest sum of signal strength among signals received by the K second signal transceiving antennas located at any other positions;

converting third network signals received by the K third signal transceiving antennas into fourth network signals, in response to the sum of signal strength corresponding to the K third signal transceiving antennas being greater than the sum of signal strength corresponding to the K second signal transceiving antennas; and converting, by the signal converter, the third network signals received by the K second signal transceiving antennas into the fourth network signals, in response to the sum of signal strength corresponding to the K third signal transceiving antennas being less than the sum of the signal strengths corresponding to the K second signal transceiving antennas.

19. The method of claim 16, wherein when the user terminal equipment operates in the second frequency band and the first frequency band, the method comprises:

controlling the rotating assembly to drive the first signal transceiving antenna to rotate to receive first network signals from different directions;

converting a first network signal with a strongest signal strength among the first network signals received by the first signal transceiving antenna from different directions into a second network signal; and controlling the K second signal transceiving antennas to not work when the first signal transceiving antenna is located at a position where the first network signal has a strongest signal strength, selecting K third signal transceiving antennas from the L third signal transceiving antennas, and converting third network signals received by the K third signal transceiving antennas into fourth network signals, wherein signals received by the K third signal transceiving antennas have a largest sum of signal strength among signals received by any other K third signal transceiving antennas selected from the L third signal transceiving antennas.

20. The method of claim 16, wherein when the user terminal equipment operates in the second frequency band and the first frequency band, the method comprises:

controlling the rotating assembly to drive the first signal transceiving antenna to rotate to receive first network signals from different directions;

converting a first network signal with a strongest signal strength among the first network signals received by the first signal transceiving antenna from different directions into a second network signal;

selecting (K-X) second signal transceiving antennas from the K second signal transceiving antennas and X third signal transceiving antennas from the L third signal transceiving antennas, when the first signal transceiving antenna is located at a position where the first network signal has the strongest signal strength, wherein signals received by the (K-X) second signal transceiving antennas and the X third signal transceiving antennas have a largest sum of signal strength among signals received by any other K third signal transceiving antennas selected from the L third signal transceiving antennas; and converting third network signals received by the (K-X) second signal transceiving antennas and the X third signal transceiving antennas selected into four network signals.

* * * * *